United States Patent
Daturi et al.

(10) Patent No.: US 12,318,753 B2
(45) Date of Patent: Jun. 3, 2025

(54) REGENERABLE VOC FILTERS WITH IMPROVED SELECTIVITY AND EFFICACY

(71) Applicants: École Nationale Supérieure d'Ingénieurs de Caen, Caen (FR); Université de Caen Normandie, Caen (FR); Centre National de la Recherche Scientifique, Paris (FR); École Supérieure de Physique et de Chimie Industrielles de la Ville de Paris, Paris (FR); École Normale Supérieure de Paris, Paris (FR); TEQOYA SAS, Villandraut (FR)

(72) Inventors: Marco Daturi, Epron (FR); Pierre Guitton, Paris (FR); Farid Nouar, Saint-Cyr-l'École (FR); Nicolas Sadovnik, Monterblanc (FR); Christian Serre, Plaisir (FR)

(73) Assignees: Ecole Nationale Superieure d'Ingénieurs de Caen, Caen (FR); Université de Caen Normandie, Caen (FR); Centre National de la Racherche Scientifique, Paris (FR); École Supérieure de Physique et de Chimie Industrielles de la Ville de Paris, Paris (FR)

( * ) Notice: Subject to any disclaimer, the term of this patent is extended or adjusted under 35 U.S.C. 154(b) by 668 days.

(21) Appl. No.: 17/774,430

(22) PCT Filed: Nov. 4, 2020

(86) PCT No.: PCT/EP2020/080974
§ 371 (c)(1),
(2) Date: May 4, 2022

(87) PCT Pub. No.: WO2021/089629
PCT Pub. Date: May 14, 2021

(65) Prior Publication Data
US 2023/0001380 A1    Jan. 5, 2023

(30) Foreign Application Priority Data
Nov. 4, 2019 (EP) .................................. 19306427

(51) Int. Cl.
*B01J 20/22*    (2006.01)
*B01D 53/72*    (2006.01)
(Continued)

(52) U.S. Cl.
CPC ............ *B01J 20/226* (2013.01); *B01D 53/72* (2013.01); *B01D 53/81* (2013.01); *B01D 53/96* (2013.01);
(Continued)

(58) Field of Classification Search
None
See application file for complete search history.

(56) References Cited

U.S. PATENT DOCUMENTS

2011/0048063 A1*  3/2011  Carruthers ........... B01J 20/3078
                                                      502/402
2011/0082024 A1*  4/2011  Liu ....................... B82Y 30/00
                                                      977/932
(Continued)

FOREIGN PATENT DOCUMENTS

FR        3043567 A1   5/2017
JP      2017527500 A   9/2017
(Continued)

OTHER PUBLICATIONS

Foreign Communication from a Related Counterpart Application, Japanese Decision of Refusal dated Feb. 27, 2025, Japanese Application No. 2022-526045 filed on Nov. 4, 2020.
(Continued)

*Primary Examiner* — John J Figueroa
(74) *Attorney, Agent, or Firm* — Conley Rose, P.C.

(57) ABSTRACT

The present invention relates, inter alia, to the use of porous crystalline solids constituted of a metal-organic framework (MOF) for the selective adsorption of aldehyde volatile organic compounds.

(Continued)

The MOF solids of the present invention can be used for the improved purification of dry or humid air, and for the manufacture of regenerable filters for air purification, particularly leak-free regenerable air filters.

18 Claims, 30 Drawing Sheets

(51) Int. Cl.
    *B01D 53/81*     (2006.01)
    *B01D 53/96*     (2006.01)
    *B01J 20/18*     (2006.01)
    *B01J 20/20*     (2006.01)
    *B01J 20/28*     (2006.01)
    *B01J 20/34*     (2006.01)

(52) U.S. Cl.
CPC .............. *B01J 20/18* (2013.01); *B01J 20/20* (2013.01); *B01J 20/28045* (2013.01); *B01J 20/28083* (2013.01); *B01J 20/3475* (2013.01); *B01D 2253/204* (2013.01); *B01D 2253/308* (2013.01); *B01D 2257/708* (2013.01)

(56) References Cited

U.S. PATENT DOCUMENTS

| | | | | |
|---|---|---|---|---|
| 2013/0061756 | A1* | 3/2013 | Hung | B01D 53/0438 96/126 |
| 2014/0213832 | A1 | 7/2014 | Gaab et al. | |
| 2019/0314760 | A1* | 10/2019 | Behan | B01D 53/8668 |

FOREIGN PATENT DOCUMENTS

| | | | |
|---|---|---|---|
| WO | 200907767 | A1 | 1/2009 |
| WO | 2009123484 | A1 | 10/2009 |
| WO | 2016037043 | A1 | 3/2016 |
| WO | 2017021658 | A1 | 2/2017 |
| WO | 2019010102 | A1 | 1/2019 |
| WO | 2019053048 | A1 | 3/2019 |
| WO | 2019152962 | A2 | 8/2019 |
| WO | 2019175717 | A1 | 9/2019 |
| WO | 2020113281 | A1 | 6/2020 |
| WO | 2021089629 | A1 | 5/2021 |

OTHER PUBLICATIONS

T. Lesage, et al., "Studying the NOx-trap mechanism over a Pt-Rh/Ba/Al2O3 catalyst by operando FT-IR spectroscopy" Phys. Chem. Chem. Phys. 5 (2003) pp. 4435-4440, DOI: 10.1039/b305874n.
"Purificateur d'air: maison, voiture, poussiere; cigarette—Blooow." [Online]. Available: https://www.blooow.com/le-fonctionnement/. [Accessed: May 1, 2019].
Ashrae Fundamentals Handbook, SI Edition, 2001, p. 24.5.
Rouquérol, F., et al. "Adsorption by powders and porous solids" Academic Press: San Diego, 1999, ISBN 0-12-598920-2.
L. Sarkisov, et al., "Computational structure characterisation tools in application to ordered and disordered porous materials" Molecular Simulation, Dec. 2011, vol. 37, pp. 1248-1257.
Permyakova, A., et al., "Design of salt-metal organic framework composites for seasonal heat storage applications" J. Mater. Chem. A, 5, pp. 12889-12898, 2017, DOI: 10.1039/x0xx00000x.
Cadiau, A., et al., "Design of Hydrophilic Metal Organic Framework Water Adsorbents for Heat Reallocation" Advanced Materials, 27, pp. 4775-4780, 2015, DOI: 10.1002/adma.201502418.
Permyakova, A., et al. Synthesis Optimization, Shaping, and Heat Reallocation Evaluation of the Hydrophilic Metal-Organic Framework MIL-160(AI). Chem. Sus. Chem., 10, pp. 1419-1426, 2017b.

M. Rose, et al., "MOF Processing by Electrospinning for Functional Textiles" Advanced Engineering Materials, 2011, 13, No. 4, pp. 356-360, DOI: 10.1002/adem.201000246.
R. Ostermann, at al., "Metal-organic framework nanofibers via electrospinning" Chem. Commun. 2011, 47, pp. 442-444, DOI: 10.1039/c0cc02271c.
J. Ren, et al., "Electrospun MOF nanofibers as hydrogen storage media" Int. J. Hydrogen Energy 2015, 40, pp. 9382-9387.
Wahiduzzaman, M.R. Khan, et al., "Processing and Performance of MOF (Metal Organic Framework)-Loaded PAN Nanofibrous Membrane for CO2 Adsorption" Journal of Materials Engineering and Performance, 2016, 25, pp. 1276-1283, DOI: 10.1007/s11665-016-1966-y.
Kim, P.-J., et al., "Separation of SF6 from SF6/N-2 mixture using metal-organic framework MIL-100(Fe) granule" Chemical Engineering Journal, 262, 2015, pp. 683-690.
Farhad Fathieh, et al., "Practical water production from desert air" Sci. Adv. 2018;4: eaat3198, pp. 1-9.
G. Férey, et al., "A Chromium Terephthalate-Based Solid with Unusually Large Pore Volume and Surface Area" Science 2005, 309, pp. 2040-2042.
Y. K. Hwang, et al., "Amine Grafting on Coordinatively Unsaturated Metal Centers of MOFs: Consequences for Catalysis and Metal Encapsulation" Angew. Chem. Int. Ed. Engl. 2008, 47, pp. 4144-4148, DOI: 10.1002/anie.200705998.
A. Demessence, et al., "Adsorption properties in high optical quality nanoZIF-8 thin films with tunable thickness", J . Mater. Chem., 2010, 20, pp. 7676-7681, DOI: 10.1039/c0jm00500b.
C. Gomes Silva, et al., "Water Stable Zr-Benzenedicarboxylate Metal-Organic Frameworks as Photocatalysts for Hydrogen Generation" Chem. Eur. J. 2010, 16, pp. 11133-11138.
M. A. Banares, et al., "Molecular structures of supported metal oxide catalysts under different environments" J. Raman Spectrosc., 2002, 33, pp. 359-380, DOI: 10.1002/jrs.866.
M. Thommes, et al., "Physisorption of gases, with special reference to the evaluation of surface area and pore size distribution (IUPAC Technical Report)" Pure Appl. Chem., 2015, 87(9-10), pp. 1051-1069, DOI 10.1515/pac-2014-1117.
K. Y. Cho, et al., "Synthesis of amine-functionalized ZIF-8 with 3-amino-1,2,4-triazole by postsynthetic modification for efficient CO2-selective adsorbents and beyond," J. Mater. Chem. A, vol. 6, No. 39, pp. 18912-18919, 2018, DOI: 10.1039/c8ta02797h.
H. Reinsch, et al., "Structures, sorption characteristics, and nonlinear optical properties of a new series of highly stable aluminum MOFs," Chem. Mater., vol. 25, No. 1, pp. 17-26, 2013, DOI: 10.1021/cm3025445.
Y. Fu, et al., "An amine-functionalized titanium metal-organic framework photocatalyst with visible-light-induced activity for CO2 reduction," Angew. Chemie—Int. Ed., vol. 51, No. 14, pp. 3364-3367, 2012, DOI: 10.1002/anie.201108357.
S.-N. Kim, et al., "Adsorption/catalytic properties of MIL-125 and NH2-MIL-125," Catalysis Today, vol. 204, pp. 85-93, Apr. 2013.
S. Bernt, et al., "Direct covalent post-synthetic chemical modification of Cr-MIL-101 using nitrating acid," Chem. Commun., vol. 47, No. 10, pp. 2838-2840, 2011, DOI: 10.1039/c0cc04526h.
J. Jacobsen, et al., "Systematic Investigations of the Transition between Framework Topologies in Ce/Zr-MOFs," Inorg. Chem., vol. 57, No. 20, pp. 12820-12826, 2018, DOI: 10.1021/acs.inorgchem.8b02019.
C. Wang, et al., "Applications of Water Stable Metal-Organic Frameworks," Chem. Soc. Rev., vol. 45, No. 18, pp. 5107-5134, 2016.
D. De Recherches, R. D. D. Scientifiques, and D. De Recherches, "Universite Versailles Saint—Quentin' E Cole D Octorale N ° 571 Sciences chimiques: molécules, matériaux, instrumentation et biosystèmes Chimie Par Mr Paul Rouschmeyer Nouveaux solides hybrides poreux luminescents à base de tétrazine," 2015.
E. Alvarez, "Traitement de l'air par des matériaux hybrides de type Metal Organic Frameworks," pp. 230, 2016.
S. Patra, et al., "Design of metal organic framework-enzyme based bioelectrodes as a novel and highly sensitive biosensing platform," J. Mater. Chem. B, vol. 3, No. 46, pp. 8983-8992, Nov. 2015, DOI: 10.1039/C5TB01412C.

(56) References Cited

OTHER PUBLICATIONS

S. Biswas, et al., "Enhanced selectivity of CO2 over CH4 in sulphonate-, carboxylate-and iodo-functionalized UiO-66 frameworks," Dalt. Trans., vol. 42, No. 13, p. 4730, Mar. 2013, DOI: 10.1039/c3dt32288b.

B. Van de Voorde, et al., "Isolation of Renewable Phenolics by Adsorption on Ultrastable Hydrophobic MIL-140 Metal-Organic Frameworks," ChemSusChem, vol. 8, No. 18, pp. 3159-3166, Sep. 2015, DOI : 10.1002/cssc.201500281.

E. Plessers, et al., "Zr-Based MOF-808 as Meerwein-Ponndorf-Verley Reduction Catalyst for Challenging Carbonyl Compounds," Catalysts, vol. 6, No. 7, p. 104, Jul. 2016, doi:10.3390/catal6070104.

P. A. Webb, "Introduction to Chemical Adsorption Analytical Techniques and their Applications to Catalysis" MIC Technical Publications, 2003;Jan. 13: 1-4.

Dedecker, K., et al., "Metal-Organic Frameworks for Cultural Heritage Preservation: The Case of Acetic Acid Removal" ACS Appl. Mater. Interfaces 10, 13886-13894 (2018).

S. Thomas, et al., "Modelling a reactor cell for operando IR studies: From qualitative to fully quantitative kinetic investigations" Catalysis Today, 2017, 283, pp. 176-184.

Y.-R. Lee, et al., "ZIF-8: A comparison of synthesis methods," Chem. Eng. J., vol. 271, pp. 276-280, Jul. 2015.

P. A. Redhead, "Thermal desorption of gases" Vacuum, 1962;12(5):274, pp. 203-211.

Foreign Communication from a Related Counterpart Application, International Search Report and Written Opinion dated Feb. 8, 2021, International Application No. PCT/EP2020/080974 filed on Nov. 4, 2020.

Kim, et al., "Adsorption of volatile organic compounds over MIL-125-NH2 ", Polyhedron, vol. 154 (2018) pp. 343-349, Aug. 16, 2018, 7 pages, XP055685560, ISSN: 0277-5387.

Hasan, et al., "Adsorption of naproxen and clofibric acid over a metal-organic framework MIL-101 functionalized with acidic and basic groups", Chemical Engineering Journal, vol. 219 (2013) pp. 537-544, Jan. 12, 2013, 8 pages, XP055686556, ISSN: 1385-8947.

Vikrant, et al., "Adsorption properties of advanced functional materials against gaseous formaldehyde", Environmental Research, Academic Press, vol. 178 (2019) Aug. 20, 2019, 15 pages, XP085832319, ISSN: 0013-9351.

\* cited by examiner

| Nom | Structure | Formula | Ligand | Porosity description | Structure description | Water behaviour | Specific surface area (m²/g) |
|---|---|---|---|---|---|---|---|
| MIL-100(Fe) | 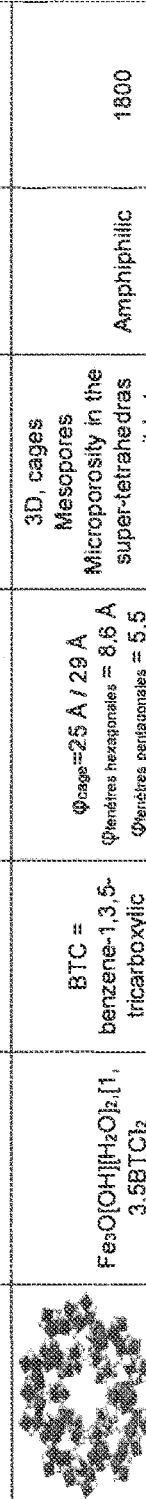 [33] | $Fe_3O[H][H_2O]_2[1,3,5BTC]_2$ | BTC = benzene-1,3,5-tricarboxylic acid | $\Phi_{cage} = 25$ Å / 29 Å $\Phi_{fenêtres\ hexagonales} = 8,6$ Å $\Phi_{fenêtres\ pentagonales} = 5,5$ Å | 3D, cages Mesopores Microporosity in the super-tetrahedras non accessible to $N_2$. Lewis acid sites. | Amphiphilic | 1800 |
| MIL-127(Fe) |  [34] | $Fe_6O_2(TazBz)_{1.5}X_2$ (X = Cl ou OH) | TazBz = 3,3',5,5'-azobenzenetetracarboxylic acid | $\Phi_{tunnels\ pentagonales} = 5\sim7$ Å | 3D, tunnels, bimodal microporosity and porosity. Lewis acid sites. | Amphiphilic | 1400 |
| UiO-66(Zr) / UiO-66(Zr)-NH₂ / UiO-66(Zr)-2(CF₃) | 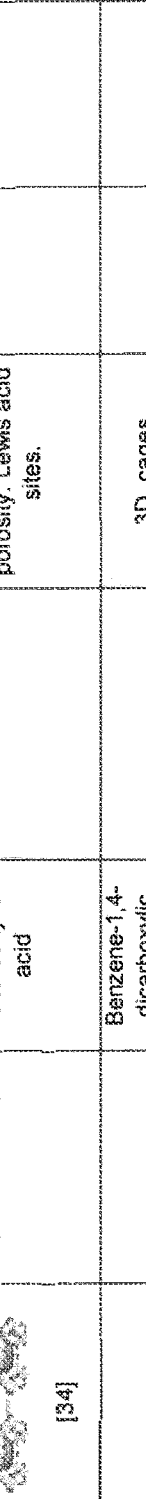 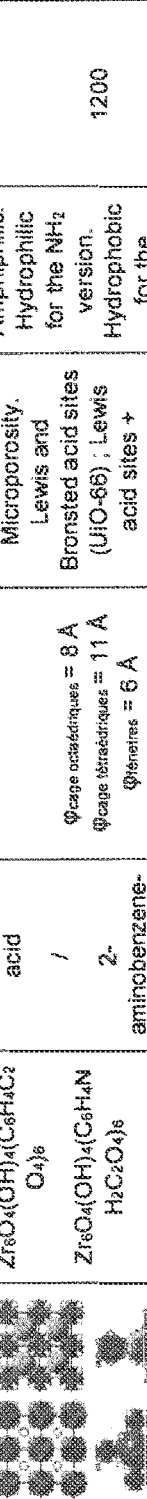 [35] | $Zr_6O_4(OH)_4(C_6H_4C_2O_4)_6$ $Zr_6O_4(OH)_4(C_6H_4N H_2C_2O_4)_6$ $Zr_6O_4(OH)_4(C_6H_2 CF_3C_2O_4)_6$ | Benzene-1,4-dicarboxylic acid / 2-aminobenzene-1,4-dicarboxylic acid / | $\Phi_{cage\ octaédriques} = 8$ Å $\Phi_{cage\ tétraédriques} = 11$ Å $\Phi_{fenêtres} = 6$ Å | 3D, cages Microporosity. Lewis and Brønsted acid sites (UiO-66); Lewis acid sites + Brønsted acid and basic sites (UiO-66-NH₂). | Amphiphilic. Hydrophilic for the NH₂ version. Hydrophobic for the version CF₃ version. | 1200 |

FIGURE 1 (1/4)

| | | | | | |
|---|---|---|---|---|---|
| MIL-53(Al)-FA / Basolite® A520 |  | Al(OH)[FA] | 2,5-Bis(trifluoromethyl)terephthalic acid FA = Fumaric acid (2E)-But-2-enedioic acid) | $\Phi_{pores} = 5.8$ Å | 1D tunnels microporosity. Bronsted acid sites. | Hydrophilic | 1000 |
| MIL-140B(Zr) |  [36] | ZrO[O$_2$C-C$_{12}$H$_6$-CO$_2$] | 2,6-naphthalene dicarboxylic acid | $\Phi_{pores} = 6-7$ Å | 1D, tunnels microporosity | Hydrophobic | 750 |
| MOF-808(Zr) |  [37] | Zr$_6$O$_4$(OH)$_4$(HCOO)$_6$(-CO$_2$)$_6$ | Benzene-1,3,5-tricarboxylic acid | $\Phi_{cage\ tétraédriques} = 4.8$ Å $\Phi_{cage\ adamantane} = 18$ Å | 3D, tunnels microporous. Lewis and Bronsted acid sites. | Hydrophilic | 800 |
| MIL-125(Ti)-NH$_2$ |  [38] | Ti$_8$O$_8$(OH)$_4$(C$_6$H$_3$C$_2$O$_4$NH$_2$)$_6$ | 2-Aminoterephthalic acid | $\Phi_{cage\ octaédriques} = 12.5$ Å $\Phi_{cage\ tétraédriques} = 6$ Å | 3D, cages Micro. Bronsted acid and basic sites. | Hydrophilic | 1300 |

FIGURE 1 (2/4)

| | | | | | |
|---|---|---|---|---|---|
| MIL-160(Al) [38] | [Al(OH)(O₂C-C₄H₂O-CO₂)] | Furane dicarboxylic acid | Φ_pores = 4-6 Å | 1D, tunnels Micro. Brønsted acid sites | Hydrophilic | 1200 |
| MIL-53(Al) / Basolite® A100 [32] | Al(OH)[O₂C-C₆H₄-CO₂] | Benzene-1,4-dicarboxylic acid | Φ_pores = 3-8 Å | 1D, tunnels Micro flexible. Brønsted acid sites | Amphiphilic | 1100-1500 |
| MIL-101(Cr) [37] | Cr₃O(H₂O)₂F(BDC)₃ | Benzene-1,4-dicarboxylic acid | Φ_cage pentagonales / hexagonales = 27 / 34 Å ; Φ_fenêtres pentagonales = 12 Å Φ_fenêtres hexagonales = 16 Å | 3D, cages Meso. Lewis acid sites. | Amphiphilic | 4100 |
| Al-3,5-PDA (MOF-303) | Al(OH)Pda(H₂O) | Pyrazole-3,5-dicarboxylic acid | Φ_pores = 6 Å | 1D, tunnels Micro. Lewis acid and basic sites. | Hydrophilic | >1300 |
| Zr-DUT-67-PZDC [PZDC = Pyrazole-3,5-dicarboxylic acid] [38] | Zr₆O₄(OH)₄(Pda)₆(OH)₄(H₂O)₄ | Pyrazole-3,5-dicarboxylic acid | Φ_pores = 16.6 Å / 8.8 Å | 3D. Lewis acid sites and Brønsted acid and basic sites | Hydrophilic | 1050 |

FIGURE 1 (3/4)

| | | | | | | |
|---|---|---|---|---|---|---|
| ZIF-8 (Basolite® Z1200) | 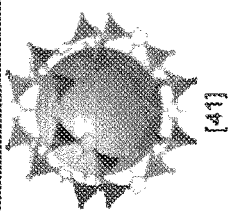 [41] | $C_6H_6N_4Zn$ | 2-Methyl-1H-imidazole | $\Phi_{fenêtres} = 5.7$ Å | 3D, cages Microporosity | Hydrophobic | 1550 |
| CAU-10[Al]-NH$_2$ | 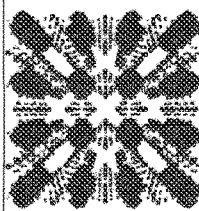 [26] | $Al(OH)(O_2C-C_6H_4NH_2-CO_2)$ | 5-Aminoisophthalic acid | $\Phi_{pores} = 3.4$ Å | 1D, tunnels Microporosity Brønsted acid and basic sites | Hydrophilic | 112 (weak N$_2$ accessibility) |
FIGURE 1 (4/4)

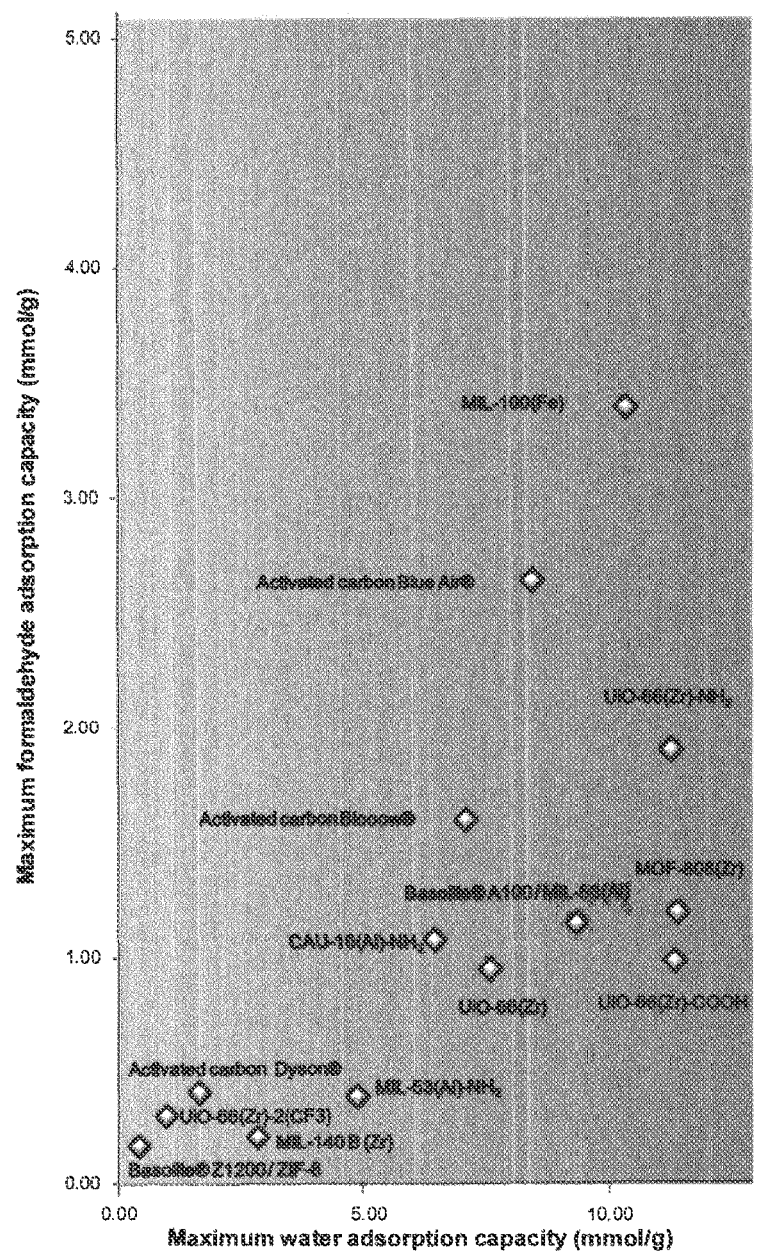
FIGURE 10 (1/2)

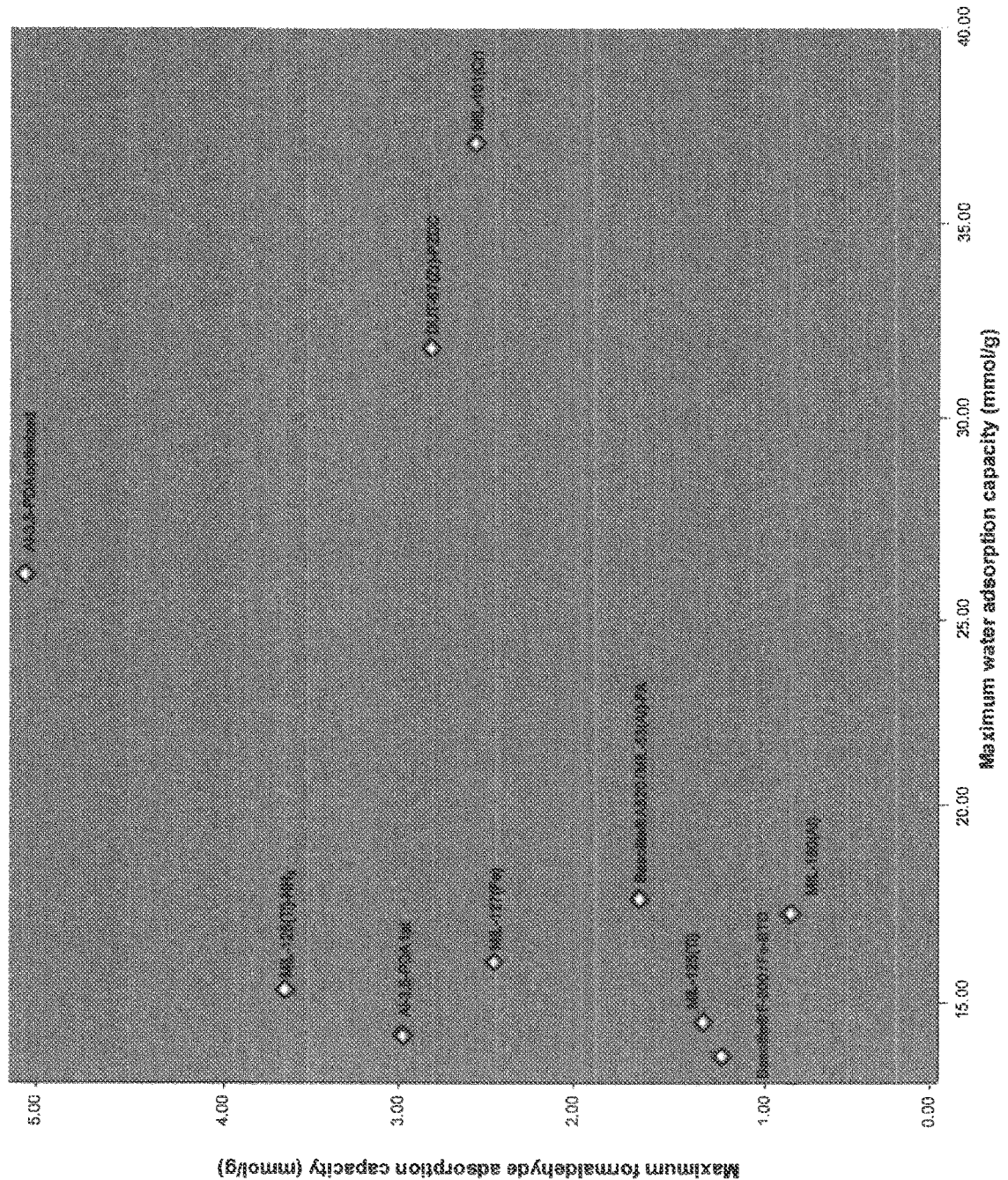

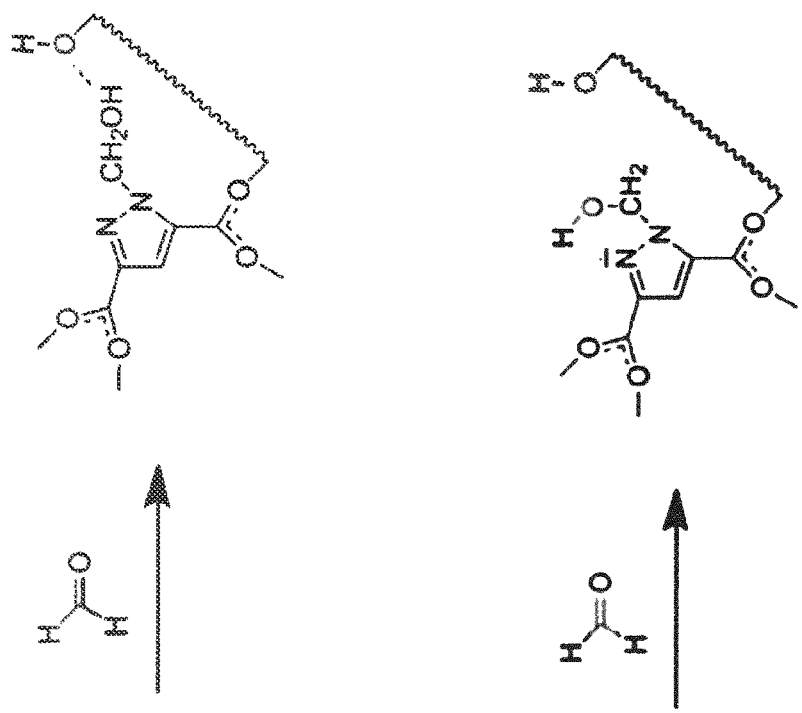
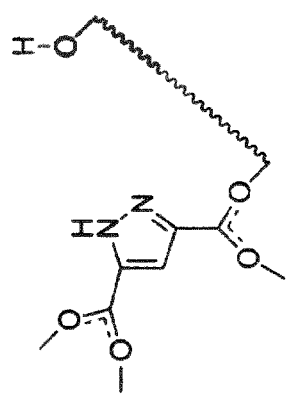
Figure 13A
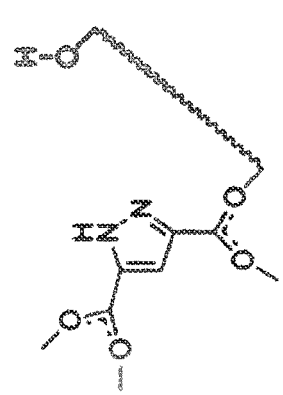
Figure 13B

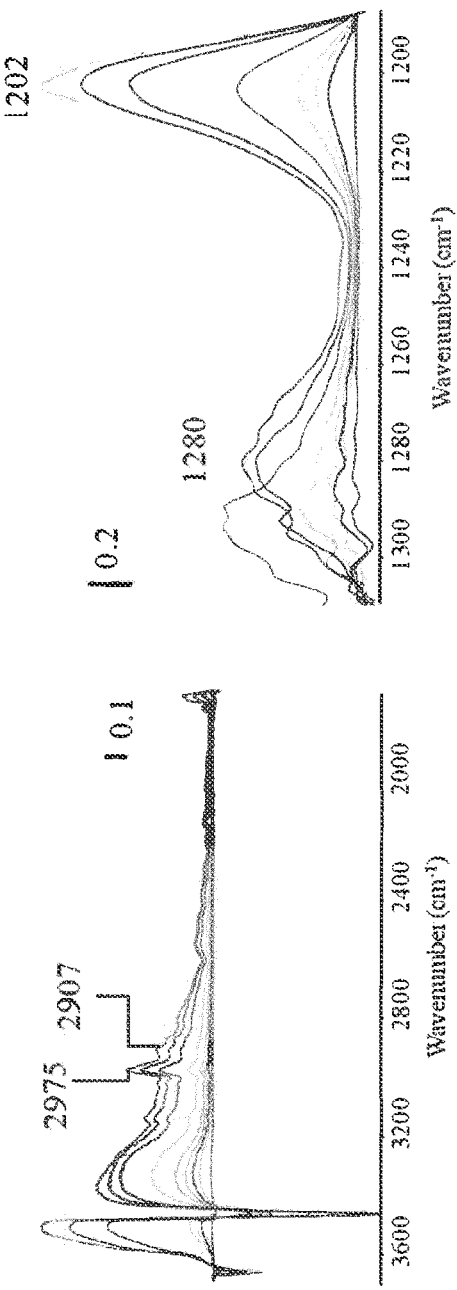
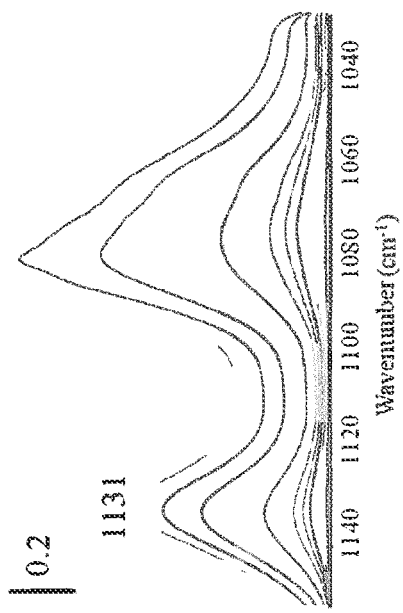
FIGURE 14A
FIGURE 14B
FIGURE 14C

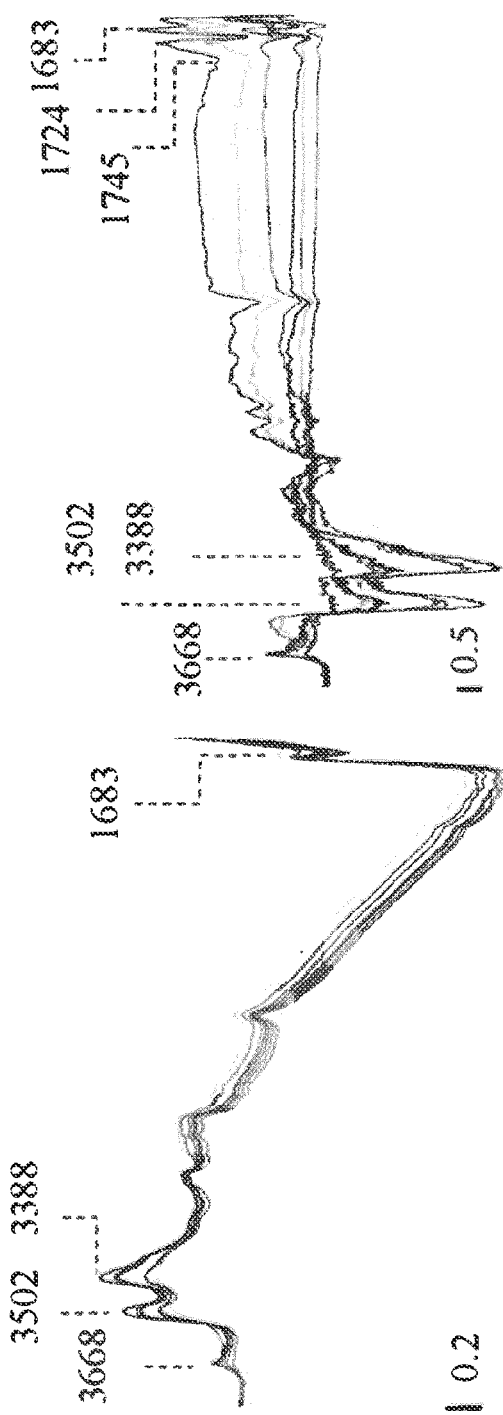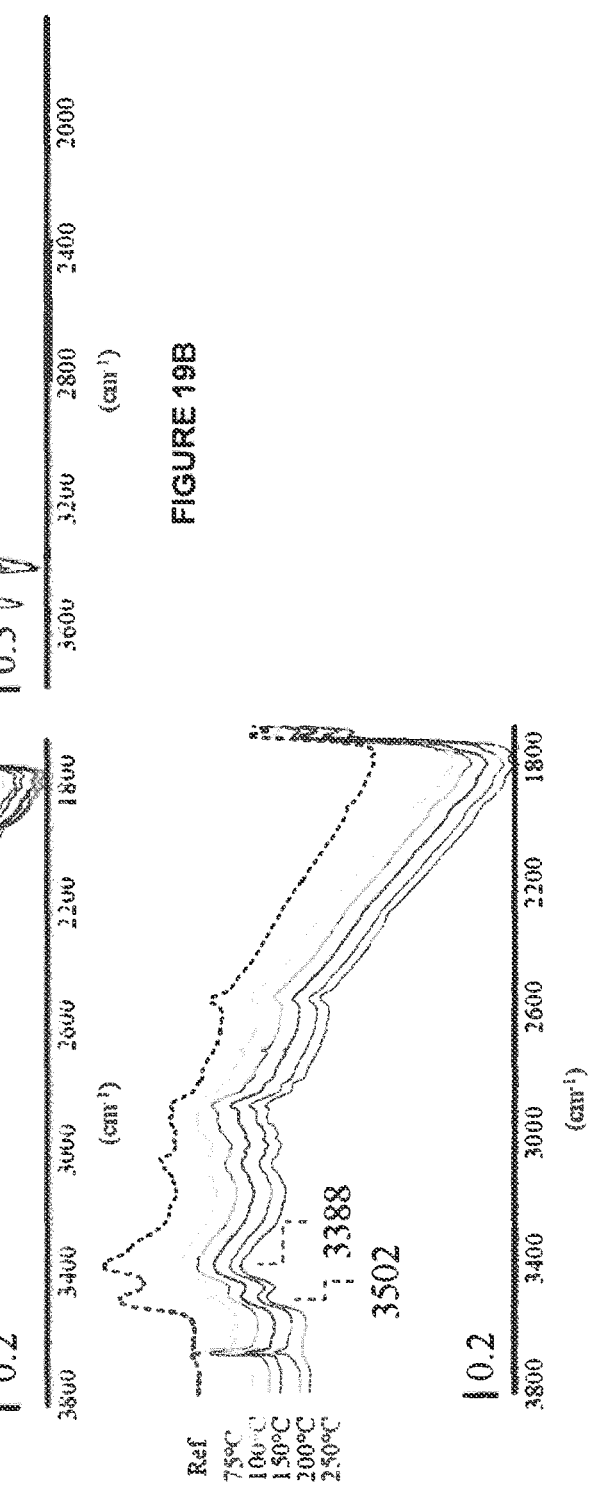
FIGURE 19A
FIGURE 19B
FIGURE 19C

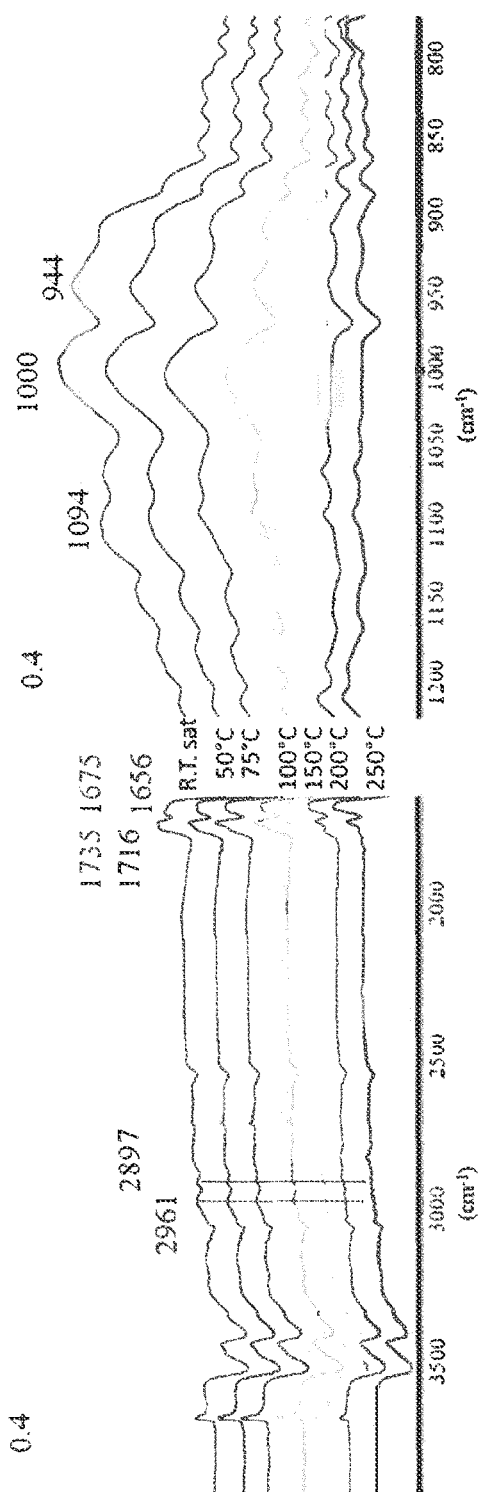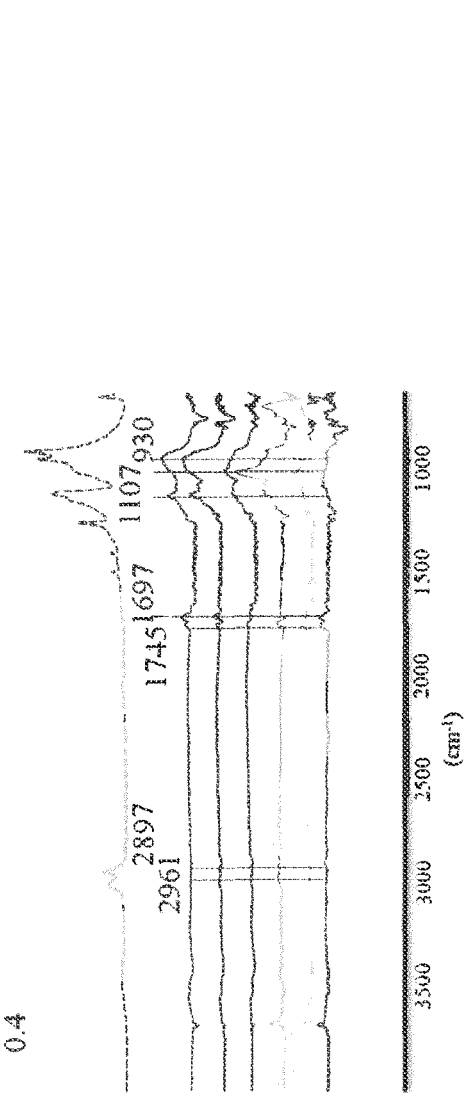
FIGURE 20A
FIGURE 20B
FIGURE 20C

REGENERABLE VOC FILTERS WITH IMPROVED SELECTIVITY AND EFFICACY

CROSS-REFERENCE TO RELATED APPLICATIONS

The present application is a filing under 35 U.S.C. 371 as the National Stage of International Application No. PCT/EP2020/080974, filed Nov. 4, 2020, entitled "REGENERABLE VOC FILTERS WITH IMPROVED SELECTIVITY AND EFFICACY," which claims priority to European Application No. 19306427.6 filed with the European Patent Office on Nov. 4, 2019, both of which are incorporated herein by reference in their entirety for all purposes.

FIELD OF THE INVENTION

The present invention relates, inter alia, to the use of porous crystalline solids constituted of a metal-organic framework (MOF) for the selective adsorption of aldehyde volatile organic compounds.

The MOF solids of the present invention can be used for the improved purification of dry or humid air, and for the manufacture of regenerable filters for air purification, particularly leak-free regenerable air filters.

The references in square brackets [X] refer to the list of references at the end of the examples.

BACKGROUND OF THE INVENTION

The air we breathe can be contaminated by pollutants, defined according to Article L220-2 of the French Environmental Code as "chemical, biological or physical agents, with harmful consequences likely to endanger human health, harm biological resources and ecosystems, influence climate change, damage material property, cause excessive odour nuisance".

Unlike outdoor air pollution, indoor air pollution remained relatively unknown until the 2000s. Yet individuals spend between 90% and 80% of their time in confined environments: housing, schools, workplaces or those intended to accommodate a public . . . . The quality of the air we breathe can have consequences on comfort and health, from simple discomfort or irritation to more dangerous and fatal consequences such as the appearance of allergies, asthma, lung cancer, poisoning, cardiovascular disease, chronic obstructive pulmonary disease, respiratory infections.

Air pollution is a major global health concern, as evidenced by the Sustainable Development Goals (SDOs), detailed in Agenda 2030 and established by UN Member States. These objectives define targets to be achieved by 2030, and include the following three SDOs for air pollution: (i) Reducing mortality from air pollution; (ii) Ensuring access to clean energy in housing; and (iii) Ensuring air quality in cities. In May 2018, the World Health Organization (WHO) published a critical assessment of air pollution: 7 million deaths each year due to exposure to ambient and domestic air pollution, or one in nine deaths worldwide caused by diseases related to air pollution. More than 90% of the world's population currently lives in areas where air pollution exceeds WHO limits.

Ambient and domestic air pollution is one of the leading causes of premature death (all deaths before age 65) worldwide. Although ambient and domestic air pollution is most often invisible and neglected as a risk, it has devastating consequences for the health of millions of people.

The quality of the air inside dwellings distinguishes from that of the outside air by pollutant concentrations that are generally much higher and by the presence of chemical substances that are not detected outside. For example, a gas chromatography analysis dating from 2007 identified nearly 20 VOCs in indoor air in 567 French main residences, revealing that the main volatile organic compounds are aldehydes and more particularly formaldehyde with the highest concentration, followed by aromatic compounds: toluene and xylene.

Formaldehyde, also known as methanal, is a highly toxic and carcinogenic volatile organic compound (VOC). Although gaseous sources of formaldehyde emit less and less pollutant over time, the vapours of this harmful substance can take weeks and sometimes even months or years to completely disappear. In addition, formaldehyde is spontaneously emitted during any combustion phenomenon (fires, tobacco smoke, vehicle emissions in garage/parking and such) and during human activities (cooking, wood-burning stoves, vegetal waste burning).

From a technological point of view, there are currently several technologies on the market to address the problems of indoor air pollution. French company Air-Serenity uses a technology based on the use of air treatment filter cartridges designed to remove chemical compounds, particles and micro-organisms in a single pass. More precisely, this technology uses a HEPA F7 filter to capture fine particles, adsorbent sponges to capture volatile organic compounds (VOCs), and a cold plasma for regeneration. Specifically, cold plasma is used to regenerate the "sponge" by reacting VOCs with ozone and radicals emitted by the plasma (to form $CO_2$ and $H_2O$ at the end of the reaction chain). The regeneration frequency is daily. This regeneration is not perfect and probably wears out the sponge, in any case the cartridge must be replaced at least annually.

To date, this technology is not available for general public use: at the end of its life it is sent back to the supplier for replacement by the consumer. In addition, several scientific studies have shown that plasma treatment rarely produces $CO_2$ and water only; more often, it gives rise to radical species that do not react completely, and are potentially dangerous. This technology therefore presents risks.

The company Beewair uses the DBD-lyse process (dielectric barrier discharge generating free radicals) to crack harmful molecules (viruses, bacteria, VOCs, etc.) in a reactor, then recompose them by mineralization into stable molecules present in the air (nitrogen, oxygen, water, etc.). The advantage is that there are no disposable cartridges; however, the technology is relatively expensive compared to a filter-based purification system, and it lacks efficiency in mineralization. There are many companies such as Austin (American company), Blueair, IQair and major brands of household appliances, whose filtration system is based on a coupling of HEPA filters of activated carbon and zeolites, with a fan to force the passage of air through these filters.

The company INOVAME presents a purification technology that allows formaldehyde to be targeted, using a formulation of activated carbons and acetoacetamide [1, 2].

However, existing filters suffer a number of important drawbacks. They are not very selective, and tend to saturate quickly in the presence of high humidity levels, with reduced performance over time. In addition, existing filters tend to release pollutants that are concentrated within the filter, when the concentration of the absorbate is higher than that of the pollutant in the filtered air. They also must be changed frequently and disposed of as sensitive materials at the end of their life cycle, then must be replaced by a new filter (hence with consumption of raw material).

Existing adsorbant materials used in air filters lack a leak-free capture capacity, (i.e. they typically release formaldehyde under normal ambient conditions). They do not offer sufficient selectivity to ensure formaldehyde capture over other VOCs (capturing other VOCs can prevent formaldehyde capture). Finally, they do not allow regeneration without damaging their structures and chemical compositions (e.g., degradation and/or removal of grafted amine within the adsorbant structure). To our knowledge, there are no regenerable/recyclable air filters/purifiers adapted for domestic use for VOC capture. Conventional filters systematically require a return to the supplier for a specific treatment: either thermal treatment (by raising the temperature to about 800° C.), or a chemical treatment (typically at low temperature (about 100° C.) using a solvent with a high pH).

However, these methods suffer serious drawbacks in that they incur a loss of material as well as significant energy costs.

Therefore, there remains a need for the development of a material and air purification system that selectively captures aldehydes, such as formaldehyde and/or acetaldehyde, and that combines the following attractive properties:
- filtration selectivity and high adsorption capacity (to avoid accelerated saturation phenomena)
- adsorption stability under representative environmental conditions (to avoid release/leakage phenomena)
- recyclability of the filter according to a protocol applicable to domestic and professional use (to avoid expensive consumables, often causing poor performance of air purifiers)

BRIEF DESCRIPTION OF THE DRAWINGS

FIG. 1: lists exemplary MOFs tested for selective aldehyde adsorption within the context of the present invention, and their properties and physicochemical characteristics.

FIG. 10: shows a graph of the co-adsorption of formaldehyde and water at 23° C., carried out in Example 5 (on the ordinate is the maximum formaldehyde adsorption capacity (mmol/g), on the abscissa is the maximum water adsorption capacity (mmol/g)), under a flow of 20 cc/min composed of 20% $O_2$, 90% RH and 415 ppm formaldehyde at 23° C.

FIGS. 13A and 13B: shows a reaction scheme between formaldehyde; pyrazole linker and $\mu_2$—OH hydroxyl groups of inorganic infinites chains of the framework and the remaining nitrogen from pyrazole linker. For clarity only one pyrazole linker and hydroxyl groups are schematically represented FIGS. 14A-C: shows a background subtracted FT-IR spectra obtained during the adsorption of formaldehyde on DUT-67(Zr)-PZDC 14a) in the range from 3675 to 1700 $cm^{-1}$, 14b) from 1350 to 1180 $cm^{-1}$, 14c) from 1160 to 1020 $cm^{-1}$.

FIGS. 19A-C: shows the adsorption of formaldehyde on UiO-66(Zr)—$NH_2$ sample. 19a) Direct FT-IR spectra recorded upon formaldehyde adsorption on UiO-66(Zr)—$NH_2$ in the spectral region of 3800-1600 $cm^{-1}$; 19b) background subtracted FT-IR spectra recorded upon formaldehyde adsorption on UiO-66(Zr)—$NH_2$ in the spectral region of 3800-1600 $cm^{-1}$; 19c) Direct FT-IR spectra recorded upon UiO-66(Zr)—$NH_2$ thermal regeneration in the spectral region of 3800-1600 $cm^{-1}$.

FIGS. 20A-C: shows the 20a) background subtracted FT-IR spectra recorded upon thermal regeneration on UiO-66(Zr)—$NH_2$ sample in the spectral region of 3750-1652 $cm^{-1}$. 20b) Background subtracted FT-IR spectra recorded upon thermal regeneration on UiO-66(Zr)—$NH_2$ sample in the spectral region of 1203-869 $cm^{-1}$. 20c) [From top to bottom], incremental subtraction between background subtracted FT-IR spectra (dashed FT-IR spectrum: poly(oxymethylene)).

function of $$\frac{1}{T_m}$$

plot used in Example 7 j)

DEFINITIONS

Figure 2:
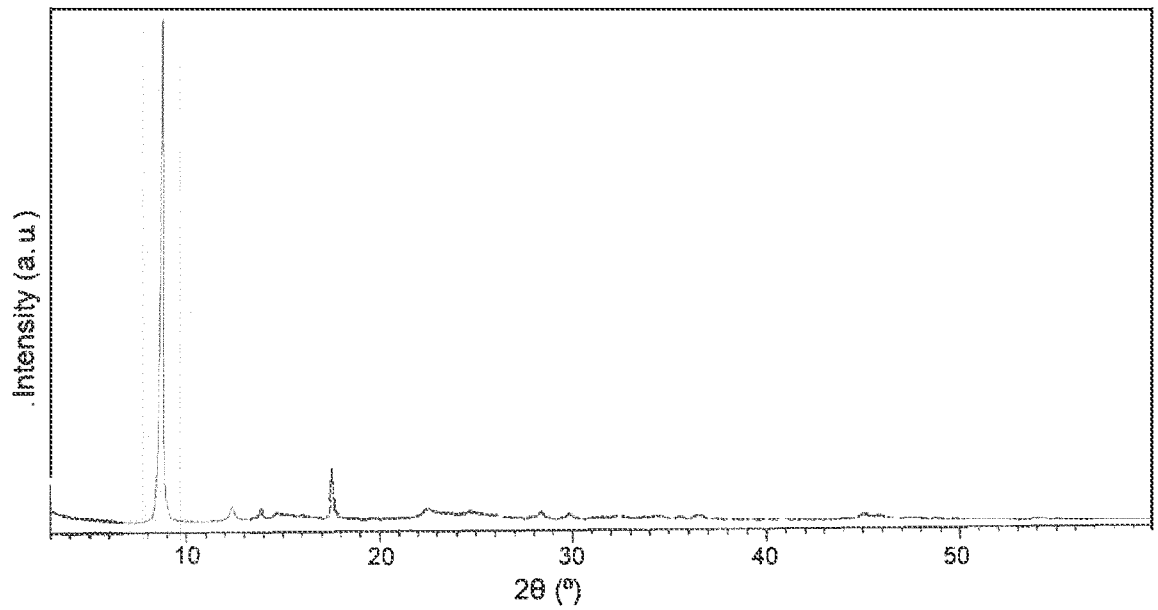
FIG. 2: shows a PXRD pattern of Al-3,5-PDA prepared in Example 1.1, performed at room temperature.
Figure 3:
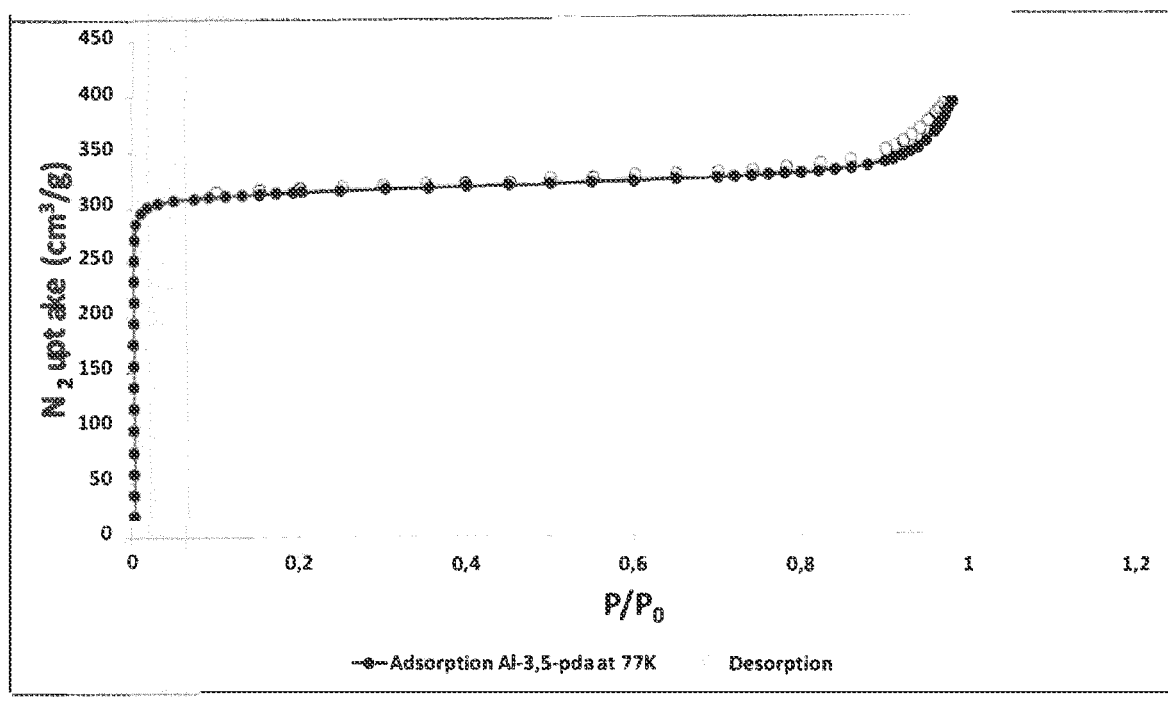
FIG. 3: shows nitrogen adsorption isotherm of Al-3,5-PDA prepared in Example 1.1, performed at 77K, which indicates a type I isotherm, and shows a microporous material, with a specific surface area (BET) around 1343 $m^2/g$ and pore volume of 0.49 $cm^3/g$.
Figure 4:
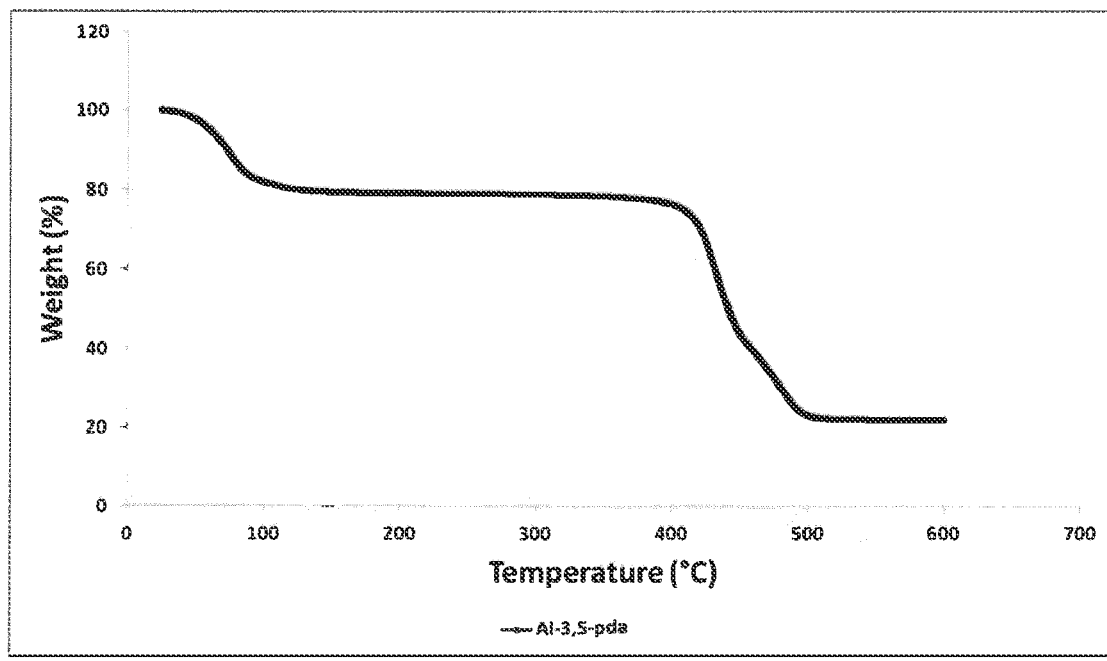
FIG. 4: shows TGA curve of Al-3,5-PDA prepared in Example 1.1, showing water loss from 25° C. to 100° C. and the degradation of the Al-3,5-PDA from 350° C. Thermogravimetric analysis (performed under $O_2$ at 2° C./min) shows two weight losses: the first one from 25° C. to 100° C. corresponds to the loss of water trapped in the micropores; the second weight loss shows the degradation of the material starting from 350° C. and being complete at 500° C.
Figure 5:
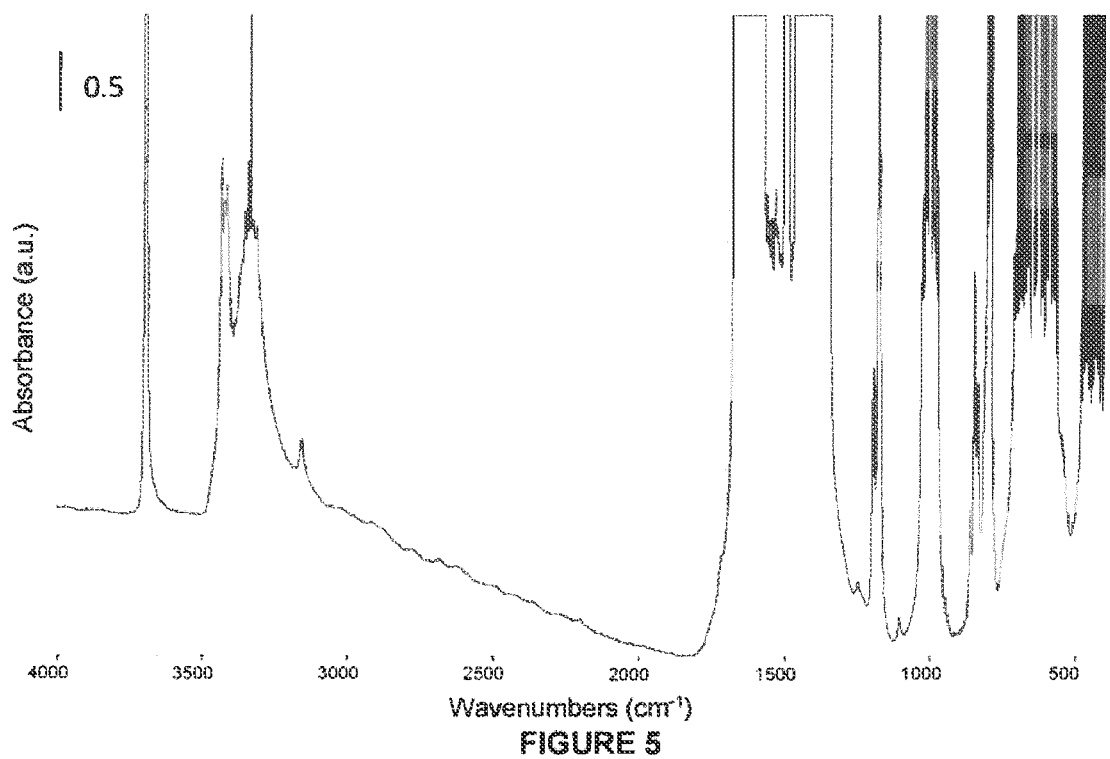
FIG. 5: shows FT-IR spectra of Al-3,5-PDA prepared in Example 1.1 (the upper part of the spectra is cut off; this corresponds to the saturation of the MCT detector (Mercury-Cadmium-Telluride)). FT-IR analysis shows the presence of carboxylate groups bonded to aluminum (pics between 1680 and 1335 $cm^{-1}$); hydroxy groups (—OH) (3692 $cm^{-1}$); —NH groups (3330 $cm^{-1}$); =C—H groups (3160 $cm^{-1}$).
Figure 6:
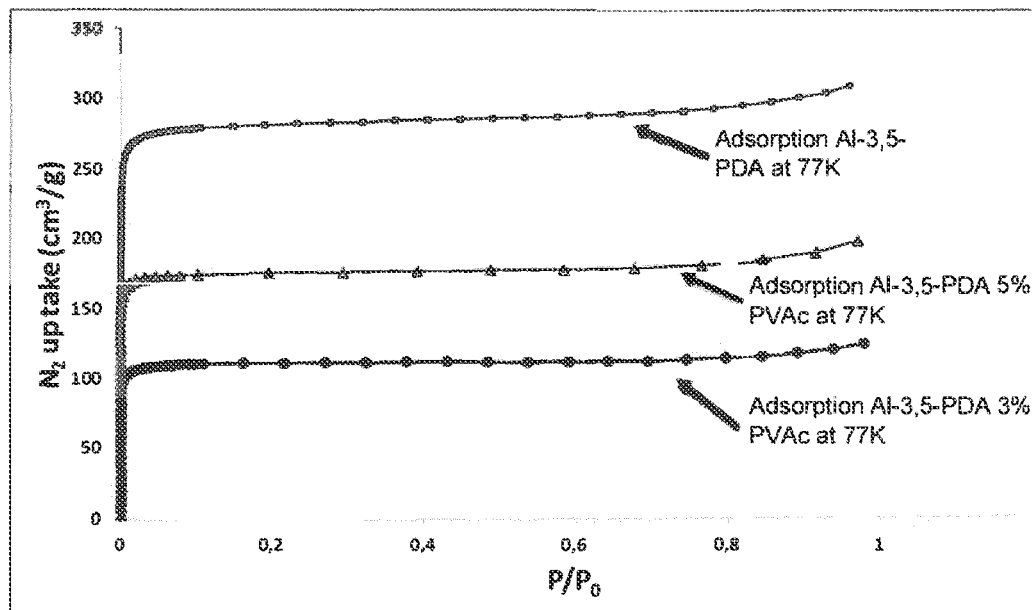
FIG. 6: shows nitrogen adsorption and desorption of the shaped MOF with polyvinyl acetate as binder prepared in Example 3, performed at 77K.
Figure 7:
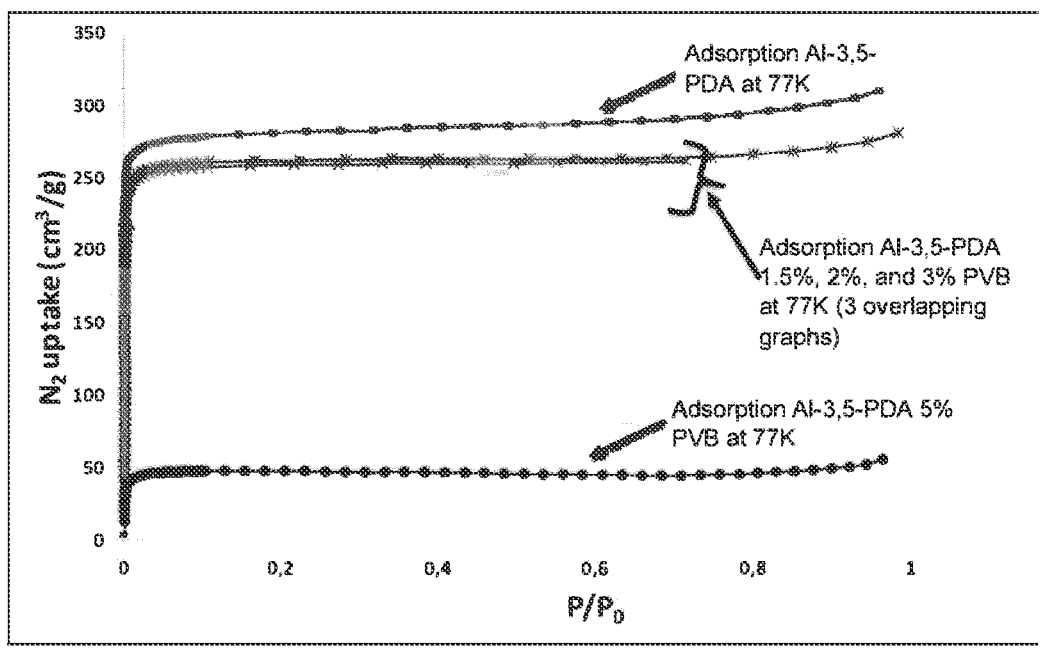
FIG. 7: shows nitrogen adsorption and desorption of the shaped MOF with polyvinyl butyralas binder prepared in Example 3, performed at 77K.

To facilitate an understanding of the present invention, a number of terms and phrases are defined below:

As used herein other than the claims, the terms "a," "an," "the," and/or "said" means one or more.

As used herein in the claim(s), when used in conjunction with the words "comprise," "comprises" and/or "comprising," the words "a," "an," "the," and/or "said" may mean one or more than one. As used herein and in the claims, the terms "having," "has," "is," "have," "including," "includes," and/or "include" has the same meaning as "comprising," "comprises," and "comprise." As used herein and in the claims "another" may mean at least a second or more.

The phrase "a combination thereof" "a mixture thereof" and such like following a listing, the use of "and/or" as part of a listing, a listing in a table, the use of "etc." as part of a listing, the phrase "such as," and/or a listing within brackets with "e.g.," or i.e., refers to any combination (e.g., any sub-set) of a set of listed components, and combinations and/or mixtures of related species and/or embodiments described herein though not directly placed in such a listing are also contemplated.

Such related and/or like genera(s), sub-genera(s), specie(s), and/or embodiment(s) described herein are contemplated both in the form of an individual component that may be claimed, as well as a mixture and/or a combination that may be described in the claims as "at least one selected from," "a mixture thereof" and/or "a combination thereof."

In general, the term "substituted" whether preceded by the term "optionally" or not, and substituents contained in formulae of this invention, refer to the replacement of hydrogen radicals in a given structure with the radical of a specified substituent. When more than one position in any given structure may be substituted with more than one substituent selected from a specified group, the substituent may be either the same or different at every position. As used herein, the term "substituted" is contemplated to include all permissible substituents of organic compounds.

As used herein, the term "alkyl", refers to straight and branched C1-C10alkyl groups. An analogous convention applies to other generic terms such as "alkenyl", "alkynyl" and the like. As used herein, "lower alkyl" is used to indicate those alkyl groups (substituted, unsubstituted, branched or unbranched) having about 1-6 carbon atoms. Illustrative alkyl groups include, but are not limited to, for example, methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl and the like.

The term "heteroaliphatic", as used herein, refers to aliphatic moieties in which one or more carbon atoms in the main chain have been substituted with a heteroatom. Thus, a heteroaliphatic group refers to an aliphatic chain which contains one or more oxygen, sulfur, nitrogen, phosphorus or silicon atoms, i.e., in place of carbon atoms. Heteroaliphatic moieties may be branched or linear unbranched. An analogous convention applies to other generic terms such as "heteroalkyl", "heteroalkenyl", "heteroalkynyl" and the like.

The term "heterocyclic" or "heterocycle", as used herein, refers to compounds which combine the properties of heteroaliphatic and cyclic compounds and include but are not limited to saturated and unsaturated mono- or polycyclic heterocycles such as morpholino, pyrrolidinyl, furanyl, thiofuranyl, pyrrolyl etc., which are optionally substituted with one or more functional groups, as defined herein. In certain embodiments, the term "heterocyclic" refers to a non-aromatic 5-, 6- or 7-membered ring or a polycyclic group, including, but not limited to a bi- or tri-cyclic group comprising fused six-membered rings having between one and three heteroatoms independently selected from oxygen, sulfur and nitrogen, wherein (i) each 5-membered ring has 0 to 2 double bonds and each 6-membered ring has 0 to 2 double bonds, (ii) the nitrogen and sulfur heteroatoms may optionally be oxidized, (iii) the nitrogen heteroatom may optionally be quaternized, and (iv) any of the above heterocyclic rings may be fused to an aryl or heteroaryl ring. Representative heterocycles include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl.

In general, the term "aromatic" or "aryl", as used herein, refers to stable substituted or unsubstituted unsaturated mono- or polycyclic hydrocarbon moieties having preferably 3-14 carbon atoms, comprising at least one ring satisfying Hückle's rule for aromaticity. Examples of aromatic moieties include, but are not limited to, phenyl, indanyl, indenyl, naphthyl, phenanthryl and anthracyl.

As used herein, the term "independently" refers to the fact that the substituents, atoms or moieties to which these terms refer, are selected from the list of variables independently from each other (i.e., they may be identical or the same).

As used herein, "about" refers to any inherent measurement error or a rounding of digits for a value (e.g., a measured value, calculated value such as a ratio), and thus the term "about" may be used with any value and/or range. As used herein, the term "about" can refer to a variation of ±5% of the value specified. For example, "about 50" percent can in some embodiments carry a variation from 45 to 55 percent. For integer ranges, the term "about" can include one or two integers greater than and/or less than a recited integer. Unless indicated otherwise herein, the term "about" is intended to include values, e.g., weight %, temperatures, proximate to the recited range that are equivalent in terms of the functionality of the relevant individual ingredient, the composition, or the embodiment.

As used herein, the term "and/or" means any one of the items, any combination of the items, or all of the items with which this term is associated.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible subranges and combinations of subranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to," "at least," "greater than," "less than," "more than," "or more," and the like, include the number recited and such terms refer to ranges that can be subsequently broken down into subranges as discussed above. In the same manner, all ratios recited herein also include all subratios falling within the broader ratio.

Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

As used herein, the term "solid" refers to any type of crystalline material. Said solid may be, for example, in the form of crystals, powder or particles of varied forms, for example of spherical, lamellar, etc. form. The particles may be in the form of nanoparticles.

As used herein, "humid environment" means an atmosphere environment comprising water vapor.

It can be the air with water vapor. The amount of water vapor present in the environment, e.g. air, increases as the temperature increases. The differences in the amount of water vapor in a parcel of air can be quite large. For example, a parcel of air that is near saturation may contain 28 grams of water per cubic meter of air at 30° C., but only 8 grams of water per cubic meter of air at 8° C.

Water vapor or vapour or aqueous vapor is the gaseous phase of water. It is one state of water within the hydrosphere. Under typical atmospheric conditions, water vapor is continuously generated by evaporation and removed by condensation. The vapor content of air may be measured with devices known as hygrometers. In the present invention, the amount of water vapor in the environment, e.g. air, may be from above dry air to saturation, for example from 10 to 30° C., for example at room temperature, i.e. at a temperature between 18° C. and 28° C. As used herein, the term "above normal humid environment" refers to a humidity level of an environment, as defined above, that is above the conventionally accepted threshold for normal humid environment for human comfort. This "normal humidity" threshold is typically around 25-30% relative humidity (cf. Ashrae Fundamentals Handbook, SI Edition, 2001, p. 24.5. [3]). In the context of the present invention, an above normal humid environment refers to >60% relative humidity, still preferably ≥70% relative humidity, still preferably ≥80% relative humidity, up to 100% relative humidity. Indoor environments such as museums, galleries, libraries, and archival collections are conventionally associated with above normal relative humidity levels around 40% RH.

MOFs are constructed from bridging organic ligands, also named "linkers" or "linker" or "spacers" or "spacer" that remain intact throughout the synthesis, these ligands acting as linkers in the network of the obtained MOF structure. As used herein, the term "ligand" or "linker" or "spacer" refers to a ligand coordinated to at least two metals, which participates in providing distance between these metals and in forming empty spaces or pores, named also "core" in the MOF.

As used herein, the term "average pore size" will be understood to refer to the MOF pore size (or pore diameter), as conventionally used in the art, as calculated by the nitrogen adsorption/desorption isotherm method at –196° C. under $10^5$ Pa (1 bar).

As used herein, the term "water-stable MOF" refers to those MOFs that do not exhibit structural breakdown under exposure to water. MOF water stability may be assessed by determining if a MOF structure stays stable in a water stability test. This is typically done through the comparison of the typical chemical features between post-exposure samples and pristine samples. The chemical features can be the powder X-ray diffraction (PXRD) pattern and BET surface area on the basis of gas adsorption capacity, which could well suggest whether the MOF loses its crystallinity or structural porosity after the exposure to water content. Generally, MOF structures are susceptible to the attack by water molecules, which would lead to ligand displacement, phase changes, and/or structural decomposition. A water-stable MOF structure is robust enough to prevent the intrusion of water molecules into the MOF framework, and the consequent loss in crystallinity and overall porosity. See Wang et al. 2016 [31]. A MOF is thus water-stable when, after being exposed to a gaseous environment with 50% relative humidity (RH) for 24 hours at 100° C. and atmospheric pressure, or after being placed in water at 100 C for 12 hours the MOF cristal structure (as measured by X-Ray diffraction pattern or IR spectroscopy) and average pore size (as calculated by the nitrogen adsorption/desorption isotherm method at –196° C. under 105 Pa (1 bar)) remains unchanged within experimental error.

As used herein, the expressions "hydrophilic MOF" or "MOF with a hydrophilic core", and conversely "hydrophobic MOF" or "MOF with a hydrophobic core", do not depart from the conventional meaning of these terms in the field of MOFs.

The hydrophilic/hydrophobic character of a MOF is directly related to the organic ligand of a MOF. A hydrophilic MOF, will present hydrophilic ligands that are attracted to water molecules; typically, ligands with a polar group which allows creating hydrogen bonds with water or a polar solvent (ex: —$NH_2$; —OH; —$NO_2$). In contrast, hydrophobic MOFs, will present organic ligands that are not attracted to water (ex: —$CH_3$). The steric hindrance around MOF metal sites that can interact with water can also increase the hydrophobicity of a material. This may involve the use of ligands functionalized with alkyl groups or by densification of the inorganic part. A vapor phase water sorption experiment allows to distinguish between MOFs with hydrophilic or hydrophobic character. A hydrophilic material will present a type I isotherm (microporous material) with massive adsorption at low partial pressure. A rather hydrophobic material will present a type V isotherm, with a significant adsorption for an intermediate partial pressure ($0.2<P/P_0<0.6$), due to the capillary condensation in the pores. The extreme case of the super-hydrophobic material will show a total absence of adsorption of water, whatever the partial pressure. See reference [32] As used herein, the term «regenerable» when used to qualify an air filter/purifier according to the invention, refers to the ability of the filter/purifier, after having reached saturation and undergone a regeneration process as described herein, to retain >0%, preferably ≥25%, more preferably ≥50%, yet more preferably ≥75%, most preferably ≥99% of its adsorption/filtering capacity, after at least one regeneration cycle, preferably after 2, 3, 4, 5, 7, 8, 9, more preferably after 10 regeneration cycles or more. A filter may be thermally regenerable and/or regenerable by washing with water and/or a hydroalcoholic solution. The filter may be regenerable durably and with low energy consumption by thermodesorption at low temperature and/or by washing in water or a hydroalcoholic solution.

The filter may be thermally regenerable. As such, the filter may be regenerable durably and with low energy consumption by thermodesorption at low temperature of the filter to a 75%, preferably 90%, of its adsorption/filtering capacity after at least one regeneration cycle, by heating said filter to a temperature a 70° C., preferably from 75 to 250° C. and more preferably below 100° C. Thermal regeneration of the filter may be carried out under inert gaz or primary vacuum (for example ~$10^{-2}$ bar).

The filter may be regenerable by washing with water and/or a hydroalcoholic solution. As such, the filter may be regenerable durably and with low energy consumption by cleaning with water and/or a hydroalcoholic solution at room temperature. Preferably the filter may be regenerable to ≥75%, preferably 90%, of its adsorption/filtering capacity after at least one regeneration cycle, by cleaning with water and/or a hydroalcoholic solution at room temperature.

DETAILED DESCRIPTION OF CERTAIN PREFERRED EMBODIMENTS OF THE INVENTION

As noted above, there is a dire need for the development of a material and air purification system that selectively and efficiently captures aldehydes, such as formaldehydes, from air in the presence of other VOC pollutants, that is leak-free and that is readily recyclable/regenerable by users in domestic and professional settings alike.

In this context, there is provided herein the use of a porous water-stable Metal-Organic Framework (MOF) material, for the selective adsorption of aldehyde volatile organic compounds, such as formaldehyde and/or acetaldehyde from a gaseous environment, such as air, which may contain further pollutants other than the aldehyde volatile organic compounds, the water-stable MOF material comprising an average pore size <40 Å, preferably <10 Å, and a hydrophilic core formed by basic groups and hydrogen-bond accepting or donating oxygenated species in the MOF framework, wherein the basic groups are covalently bound to the MOF framework. As such, there is provided a method for the selective adsorption of aldehyde volatile organic compounds, such as formaldehyde and/or acetaldehyde from a gaseous environment, such as air, which may contain further pollutants other than the aldehyde volatile organic compounds, comprising contacting said gaseous environment, such as air, with a water-stable MOF material comprising an average pore size <40 Å, preferably <10 Å, and a hydrophilic core formed by basic groups and hydrogen-bond accepting or donating oxygenated species in the MOF framework, wherein the basic groups are covalently bound to the MOF framework.

In another aspect, there is provided the use of a porous water-stable Metal-Organic Framework (MOF) material, alone or mixed with other porous materials such as other MOFs, zeolites, and/or activated carbon, for the improved purification of dry or humid air, the water-stable MOF material comprising an average pore size <40 Å, preferably <10 Å, and a hydrophilic core formed by basic groups and hydrogen-bond accepting or donating oxygenated species in the water-stable MOF framework, wherein the basic groups are covalently bound to the water-stable MOF framework. As such, there is provided a method for purifying dry or humid air, comprising contacting the air to be purified with a water-stable MOF material comprising an average pore size <40 Å, preferably <10 Å, and a hydrophilic core formed by basic groups and hydrogen-bond accepting or donating oxygenated species in the MOF framework, wherein the basic groups are covalently bound to the MOF framework. The use/method may be carried out at a temperature range from 10 to 50° C., typically at ambient temperature.

In yet another aspect, the present invention provides the use of a porous water-stable Metal-Organic Framework (MOF) material, for the manufacture of a regenerable filter for air purification, comprising an average pore size <40 Å, for example <10 Å, and a hydrophilic core formed by basic groups and hydrogen-bond accepting or donating oxygenated species in the water-stable MOF framework, wherein the basic groups are covalently bound to the MOF framework. As such, there is provided a method for manufacturing a regenerable filter for air purification, comprising coating a suitable support with a water-stable MOF material comprising an average pore size <40 Å, for example <10 Å and a hydrophilic core formed by basic groups and hydrogen-bond accepting or donating oxygenated species in the MOF framework, wherein the basic groups are covalently bound to the MOF framework.

In each of the above aspects and throughout the present document, the gaseous environment (e.g., air) may be dry or humid (i.e., ranging from 0% to 100% relative humidity). For example, it may be air with 15 to 95% relative humidity. The gaseous environment may for example be air with a normal humid level for human comfort (about 25-30% relative humidity). The gaseous environment may for example be air above normal humid level for human comfort ("above normal humid environment"). As such, in each of the above aspects and throughout the present document, the gaseous environment may be air with >30% relative humidity, for example ≥35% relative humidity, for example ≥40% relative humidity, up to 100% relative humidity.

In each of the above aspects and throughout the present document, the water-stable MOF material may have a minimum average pore size ≥3 Å (for example ≥4 Å) to accommodate the kinetic diameter of formaldehyde. As such, the average pore size (D) of the water-stable MOFs useable in the context of the invention may be 3 Å≤D<40 Å. Preferably it may be 4 Å≤D<10 Å.

The pore size distribution of MOFs can be calculated from the adsorption isotherms of some gases, like nitrogen gas. The distribution does not give a single value of pore size, but the distribution of volumes associated to each pore size (pore diameter or pore width, depending on the geometry of the pore). Accordingly, the nitrogen adsorption/desorption isotherm method (−196° C.) is meant to encompass the various possible pore geometries of the MOF material 'e.g., tetrahedral, octahedral). MOF usually have well defined pore sizes, and the distribution is usually narrow. Hence, the nitrogen adsorption/desorption isotherm method (−196° C.) is particularly adapted to average pore size determination in MOF materials. Methods for measuring MOF average pore sizes are well documented in the literature. There are several methods to do this type of calculation and some recommendations are given for example by IUPAC (cf. Thommes et al., IUPAC Technical Report, Pure Appl. Chem., 2015, 87(9-10), 1051-1069). [24] Cf. also Rouquérol, F.; Rouquérol, J.; Sing, K. Adsorption by powders and porous solids; Academic Press: San Diego, 1999, which gives a much wider discussion on this topic. [4]

Alternatively, maximum and limiting pore sizes may be estimated from crystallographic data by simulating the filling of the pores with gas molecules (L. Sarkisov and A. Harrison, Mol. Simul., 2011, 37, 1248-1257 [5]) that allow the calculation of average pore sizes. Briefly, from diffraction patterns (X-ray pattern is the most common), a crystal structure of the MOF may be determined. There are currently several computational methods proposed in the literature to estimate the pore size (cages and windows) and surface area from a well-defined crystal structure. These computational methods are essentially based on the simulation of the adsorption of a probe molecule on the surface of the pores. Reference [5] describes a method and reports a computer program to determine the most probable pore sizes, and hence the MOF average pore size. Regardless of the method used, if properly applied, they agree within experimental error. Nevertheless, in the context of the present invention, all values of MOF average pore size mentioned in the present document are based on the nitrogen adsorption/desorption isotherm method (at −196° C.) under 105 Pa (1 bar).

In each of the above aspects, the use/method may be carried out under the conventional temperature range used in the field of air filter/purification systems. For example, the use may be carried out between 10 and 50° C.

Advantageously, the water-stable Metal-Organic Framework (MOF) material may be used alone or may be in mechanical mixture with other porous materials (other MOFs different from the water-stable MOF material, zeolites, carbon).

In each of the above aspects and throughout the present document, the fact that "basic groups are covalently bound to the MOF framework" means that these basic functions are not bound to the metal sites of the MOF. Rather, the basic groups/functions are covalently bound to the ligands making up the MOF framework. As such, the basic groups/functions present in the MOF framework are therefore more sustainable to capture aldehydes and stable upon thermal and/or solvent regeneration. Indeed, in the case of basic groups/functions bound to the metal sites of the MOF, there is a risk of removing them during water and/or thermal regeneration.

Advantageously, in each of the above aspects, the regenerable filter may be leak-free with respect to aldehyde volatile organic compounds. In other words, in addition to selectively adsorb aldehydes in the presence of other VOCs and/or in humid air, the MOFs useable in the context of the present invention have the ability to retain aldehydes, such as formaldehyde and/or acetaldehyde, with maximum efficiency from the first passage of contaminated air through the filter, without releasing the aldehydes even when the filter is saturated and/or even when the temperature increases (typical working temperature envisaged is the range 10-50° C.).

As used herein, the term "leak-free" when referring to the regenerable filters of the invention, refers to the ability of the filter to retain 100% of the aldehyde(s) adsorbed under atmospheric pressure (1 atm, 101325 Pa) and under a working temperature in the range 10-50° C. The later may apply even when the contaminated air flow through the filter at a space velocity ≤60000 h$^{-1}$. For example, in the case of formaldehyde, the leak-free adsorption capacity of an adsorbent corresponds to the amount of formaldehyde adsorbed by the adsorbent with a 100% filtering action in formaldehyde (no formaldehyde molecules are detected at the outlet of the filter cell containing the adsorbent material). In other words, the "leak-free adsorption capacity" of an adsorbent material corresponds to the absence of risk of aldehyde release over time. A conventional adsorbent, such as activated carbon, can release the stored pollutants, depending on the ambient conditions (temperature, humidity, aldehyde concentration in the air). In contrast, the MOF adsorbent according to the invention, such as Al-3,5-PDA, will not do so, under normal ambient conditions, until the leak-free storage capacity is exceeded. The leak-free adsorption capacity of an adsorbent can be determined using an operando cell, coupled with mass spectrometry and IR spectroscopy, such as that described in the Examples section.

Metal Atoms

The MOF metal may be selected from any metal that promotes water stability and that is capable of leading to a MOF whose basic part is not bound to the metal. Advantageously, the MOF metal may be selected from tri and tetravalent metals from the rare earth metals (Sc, Y, Tb, Gd, Ce, Ln, La), Ti, Zr, Fe, Al or Cr; preferably Sc, Y, Ln, La, Ti, Zr, Fe, Al or Cr; preferably Ti, Zr, Fe, Al or Cr; more preferably Fe, Al, Ti or Zr, most preferably Al or Zr Ligands Generally speaking, the ligands of the water-stable MOF framework may be selected from di-, tri- or tetra-carboxylate ligands; preferably di-carboxylate ligands. The ligands may bear basic groups covalently attached thereto (e.g., —NH$_2$ groups covalently grafted on the linker) or embedded within the ligand itself (e.g., —NH— groups contained in pyrrazolyl nucleus). The basic groups may be covalently bound to the ligands, but without binding between the basic groups and the MOF metal sites. The basic groups may preferably be embedded within the ligands, but there is no binding between the basic groups and the MOF metal sites. The basic groups may for example be in the form of formiate, carboxylate, —NH$_2$ or —NH— groups, preferably —NH$_2$ or —NH— groups. Thus, the ligands of the water-stable MOF framework may also be selected from N-heterocyclic ligands, but without binding between the basic groups and the MOF metal sites. When the N atom(s) constituting the N-heterocycle of the ligand is/are involved in binding to the MOF metal sites, then the N-heterocyclic ligand may bear at least one additional basic group (e.g., formiate, carboxylate, —NH$_2$ or —NH— groups, preferably —NH$_2$ or —NH— groups, most preferably —NH$_2$ group) which is not involved in binding to the MOF metal sites, such as an amino-imidazolate ligands.

Ligand Best Mode

The best mode of carrying out the invention involves MOFs having ligands with basic groups embedded within the ligands (for example, —NH— groups contained in pyrrazolyl nucleus), without binding between the basic groups and the MOF metal sites. This excludes the less preferred variants described in the present disclosure where the basic groups can be formiate, carboxylate, or —NH$_2$ groups, preferably —NH$_2$ group covalently grafted onto the MOF ligands (i.e; aliphatic, heterocyclic or aromatic ligands on which is covalently attached a substituent bearing at least one formiate, carboxylate, or —NH$_2$ group, preferably NH$_2$ group). The best mode therefore excludes amino-aromatic metal carboxylate MOFs (i.e., MOF materials with aromatic ligands bearing NH$_2$ groups covalently grafted on the ligands) such as UiO-66(Zr)—NH$_2$/MIL-125(Ti)—NH$_2$/MIL-101(Cr)-ED; and amino-heterocyclic metal carboxylate MOFs (i.e., MOF materials with heterocyclic ligands bearing NH$_2$ groups covalently grafted on the ligands) such as MOFs built with amino-imidazolate ligands (e.g., 2-amino-imidazolate, 4-amino-imidazolate or 5-amino-imidazolate ligands described elsewhere in the present disclosure). For example, the ligands according to the best mode may be N-containing heterocycles comprising N and/or NH groups, preferably a —N—NH— group, embedded within the heterocyclic structure (i.e., the N and/or NH groups belong to the heterocyclic ring structure). Examples of such N-containing heterocyclic structures include pyridinyl, piperazinyl, tetrazolyl, pyrazolyl, triazolyl, pyrrolyl, imidazolyl moieties.

As discussed previously, the basic groups/functions present in the N-containing heterocyclic ligands, preferably in the form of —N— or —NH— groups, preferably a —N—NH— group, embedded within the heterocyclic ring (i.e., the N and/or NH groups belong to the heterocyclic ring structure), without binding between the basic groups and the MOF metal sites, are more sustainable to capture aldehydes and are stable upon thermal and/or solvent regeneration. Indeed, in the case of basic groups/functions bound to the metal sites of the MOF, there is a risk of removing them during water and/or thermal regeneration. In addition, such MOFs having N-containing heterocyclic ligands comprising N and/or NH groups, preferably a —N—NH— group, embedded within the heterocyclic structure have the advantage of being water-stable as compared to MOFs bearing at least one additional basic group covalently grafted onto the ligand (e.g., formate, carboxylate, or —NH$_2$ groups, preferably-NH$_2$ group) which is not involved in binding to the MOF metal sites, such as an amino-imidazolate ligands.

According to the best mode, the N-containing heterocyclic ligands having —N— and/or —NH— groups, preferably a —N—NH— group, embedded within the heterocyclic ring can be polycarboxylate ligands bearing N-containing heterocyclic ligands having —N— or —NH— groups, preferably a —N—NH— group, embedded within the heterocyclic ring, without binding between the —N— or —NH— basic groups and the MOF metal sites. The ligands are bound to the MOF metal sites (thereby forming the MOF three-dimensional structure), via the carboxylate groups. Such ligands may be selected from di-, tri- or tetra-carboxylate ligands, as permitted by the structure of the N-containing heterocyclic ring; preferably di-carboxylate ligands. For example, the ligands may be pyridinyl, piperazinyl, pyrazolyl, triazolyl, pyrrolyl, imidazolyl rings bearing at least two carboxylate groups covalently bound thereto. For example, the ligand may be pyrazole-3,5-dicarboxylate, pyrazole-3,4-dicarboxylate, imidazole-4,5-dicarboxylate, imidazole-2,4-dicarboxylate, pyrrole-2,5-dicarboxylate, pyrrole-2,4-dicarboxylate, pyrrole-2,3-dicarboxylate, pyrrole-3,4-dicarboxylate, pyrazine-2,5-dicarboxylate, pyrazine-2,3-dicarboxylate, pyridine-2,5-dicarboxylate, pyridine-2,6-dicarboxylate, pyridine-2,3-dicarboxylate, pyridine-2,4-dicarboxylate, pyridine-3,4-dicarboxylate, pyridine-3,5-dicarboxylate, 1,2,3-Triazole-4,5-dicarboxylate, or 1,2,4-Triazole-3,5-dicarboxylate.

For example, the N-containing heterocyclic polycarboxylate ligand may be an N-containing heterocyclic dicarboxylate ligand such as:

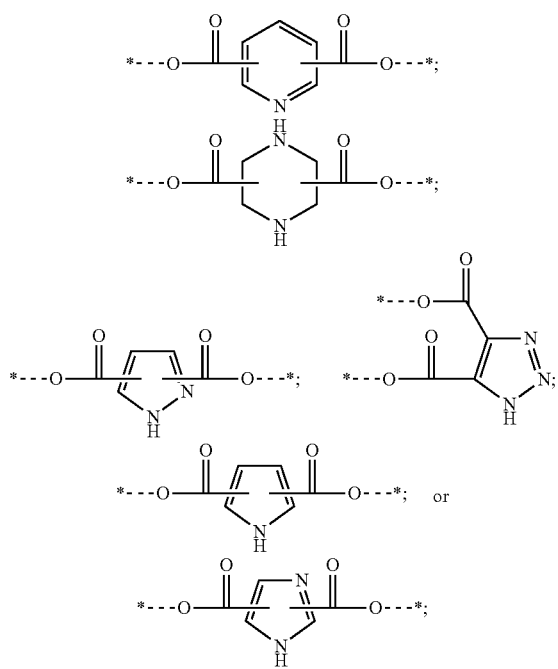

wherein * denotes binding to the MOF metal sites.

When the N-containing heterocyclic ring can only afford one carboxylate substituent for binding to the MOF metal site, one of the N atoms present on the N-containing heterocyclic ring can be involved in MOF metal site binding, so long as at least one other N of the heterocycle does not bind to the MOF metal sites. For example, the ligands may be a tetrazolyl carboxylate such as

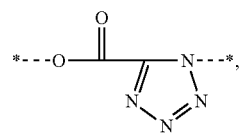

wherein * denotes binding to the MOF metal sites. In the tetrazolyl carboxylate ligand above, the carboxylate group and one N atom are involved in MOF metal site binding, while three basic N atoms embedded within the tetrazolyl heterocycle remain available for aldehyde VOC adsorption.

In another variant, the N-containing heterocyclic ligands having —N— and/or —NH— groups, preferably a —N—NH— group, embedded within the heterocyclic ring can be covalently grafted onto a polycarboxylate ligand, or a heterocyclic ligand whose heteroatoms are involved in MOF binding. For example, the MOF ligand may be selected from di-, tri- or tetra-carboxylate ligands; preferably di-carboxylate ligands, which bear a substituent comprising an N-containing heterocyclic ring having —N— and/or —NH— groups, preferably a —N—NH— group, embedded within the heterocyclic ring, which are not involved in binding to the metal sites. For example, such ligand may have the structure:

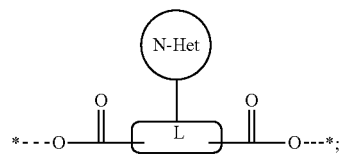

wherein * denotes binding to the MOF metal sites;

N-Het represents an N-containing heterocyclic ligands having —N— and/or —NH— groups, preferably a —N—NH— group, embedded within the heterocyclic ring, without binding to the MOF metals sites (such as pyridinyl, piperazinyl, tetrazolyl, pyrazolyl, triazolyl, pyrrolyl, imidazolyl rings), and L represents a dicarboxylate ligand typically used in MOFs, where L may be an aliphatic or aromatic radical.

Alternatively, the MOF ligand may be a heterocycle involved in binding to the MOF metal sites, which additionally bears a substituent comprising an N-containing heterocyclic ring having —N— and/or —NH— groups, preferably a —N—NH— group, embedded within the heterocyclic ring, which are not involved in binding to the metal sites. For example, such ligand may have the structure:

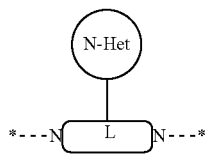

wherein * denotes binding to the MOF metal sites;

N-Het represents an N-containing heterocyclic ligands having —N— and/or —NH— groups, preferably a —N—NH— group, embedded within the heterocyclic ring, without binding to the MOF metals sites (such as pyridinyl, piperazinyl, tetrazolyl, pyrazolyl, triazolyl, pyrrolyl, imidazolyl rings), and L represents a heterocyclic ligand typically used in MOFs, bound to the MOF metal sites via two N atoms (such as an imidazolyl ring in ZIF-type MOFs).

In the best mode, the ligands of the water-stable MOF framework may be selected from di-, tri- or tetra-carboxylate ligands; preferably di-carboxylate ligands. Preferably, the ligands may bear basic groups (—N or —NH— groups, for example a —N—NH— group, contained in pyridyl or azolyl nucleus) embedded within the ligand itself or covalently attached/grafted thereto. Examples of azolyl nuclei include the N-heterocycles mentioned previously, namely pyridine, piperazine, tetrazole, pyrrole, imidazole, triazole, pyrazol. Most preferably, the basic groups are embedded within the ligands, but there is no binding between the basic groups and the MOF metal sites. The basic groups may be in the form of —N or —NH— groups, preferably —N—NH— or —NH— groups, selected from N-heterocyclic ligands with no binding between the basic groups and the MOF metal sites. Thus, the ligands of the water-stable MOF framework may also be selected from N-heterocyclic polycarboxylate ligands.

Advantageously, still according to the best mode, the ligands of the water-stable MOF framework may be selected from di-, tri- or tetra-carboxylate ligands; preferably di-carboxylate ligands, bearing basic groups being part of the ligand itself, or alternatively as heterocycles (e.g., —N— and/or —NH— groups contained in pyridyl or azolyl nucleus, preferably a —N—NH— group) covalently attached to the organic spacer without binding any metal. In other words, the MOF ligands may be N-heterocyclic groups connected to the metal sites via carboxylate groups, the N-heterocycles comprising N and/or NH groups, preferably a —N—NH— group, not involved in binding to MOF metal sites. Alternatively, the MOF ligands may be a ligand conventionally used in MOFs, on which is covalently attached/grafted an N-heterocyclic groups comprising N and/or NH groups, preferably a —N—NH— group, not involved in binding to MOF metal sites (for example 1,3 BDC-Pyrazole where BDC=benzenedicarboxylate).

The conventional MOF linker may be a $C_4$-$C_{16}$ polycarboxylate alkyl linkers (such as di-, tri- or tetracarboxylate or carboxylic acid linkers, for example $C_2H_2(CO_2^-)_2$(fumarate), $C_2H_4(CO_2^-)_2$ (succinate), $C_3H_6(CO_2^-)_2$ (glutarate), $(C_4H_4)(CO_2^-)_2$ (muconate), $C_4He(CO_2^-)_2$ (adipate)).

The conventional MOF linker may be a $C_6$-$C_{24}$ aromatic polycarboxylate linker, such as benzyl or naphtyl di-, tri- or tetracarboxylate. Advantageously, the $C_6$-$C_{24}$ aromatic polycarboxylate linkers, such as benzyl or naphtyl di-, tri- or tetracarboxylate may be selected from the group comprising $C_6H_4(CO_2^-)_2$ (terephtalate), $C_{10}H_6(CO_2^-)_2$ (naphtalene-2,6-dicarboxylate), $C_{12}H_8(CO_2^-)_2$ (biphenyl-4,4'-dicarboxylate), $C_6H_3(CO_2^-)_3$ (benzene-1,2,4-tricarboxylate), $C_6H_3(CO_2^-)_3$ (benzene-1,3,5-tricarboxylate), $C_{24}H_{15}(CO_2^-)_3$ (benzene-1,3,5-tribenzoate), $C_6H_2(CO_2^-)_4$(benzene-1,2,4,5-tetracarboxylate, $C_{10}H_4(CO_2^-)_4$ (naphtalene-2,3,6,7-tetracarboxylate), $C_{10}H_4(CO_2^-)_4$ (naphtalene-1,4,5,8-tetracarboxylate), $C_{12}He(CO_2-)_4$ (biphenyl-3,5,3',5'-tetracarboxylate), and modified analogues selected from 2-methyl terephtalate, 2,5-dimethyl terephtalate, tetramethyl terepthalate, perfluoromethyl terephtalate, diperfluoromethyl terephtalate, 2-chloroterephtalate, 2-bromoterephtalate, 2,5 tetrafluoroterephtalate, tetrafluoroterephtalate, dimethyl-4,4'-biphenyldicarboxylate, tetramethyl-4,4'-biphenyldicarboxylate, dicarboxy-4,4'-biphenyldicarboxylate, azobenzene dicarboxylate, or azobenzene tetracarboxylate.

The above-listed $C_4$-$C_{16}$ polycarboxylate alkyl linkers and $C_6$-$C_{24}$ aromatic polycarboxylate linkers may be chemically modified to covalently bind —N or —NH— containing heterocyclic groups (basic groups).

The MOF ligand may be any N-containing heterocyclic polycarboxylate linker, wherein the N-heterocycle comprises a —N—NH— group as part of the ring structure, which is not involved in binding with the MOF metal sites. For example the N-heterocycle may be a pyrrole, diazole (e.g. pyrazole or imidazole), triazole, or tetrazole, bearing at least two carboxylate groups for binding to the MOF metal sites. The MOF ligand may be an N-containing heterocyclic polycarboxylate linker, in the form of a 5- or 6-membered N-containing heterocyclic group, such as imidazole, pyrrole, pyrazole, diazole, triazole, tetrazole either as organic spacers or alternatively attached covalently on the organic spacer of a polycarboxylate ligand. Preferably, an N-containing heterocyclic linker may be present in the water-stable MOF framework in the form of N-heterocyclic polycarboxylate ligands, bearing at least one basic group covalently attached thereto, preferably embedded within the ligand itself (e.g. —N— and/or —NH—).

Preferably, the —N or —NH— groups may be present in the water-stable MOF framework in the form of N-heterocyclic polycarboxylate ligands. For example, the ligands may be pyrazole-3,5-dicarboxylate.

Advantageously, the hydrogen-bond accepting or donating oxygenated species in the water-stable MOF framework are present in the form of oxo-clusters, oxo-hydroxo clusters, and/or OH.

Ligands Less Preferred Variants:

The ligands may bear basic groups covalently attached thereto (e.g., —$NH_2$ groups covalently grafted on the linker), as opposed to the best mode where the basic groups (e.g., N and/or NH groups, preferably a —N—NH— group) are embedded within the ligand itself (N-heterocyclic ligand). According to the less preferred variant, the basic groups may be in the form of formiate, carboxylate, or —$NH_2$ groups, for example —$NH_2$ groups (i.e; aliphatic, heterocyclic or aromatic ligands on which is covalently attached a substituent bearing at least one formiate, carboxylate, or —$NH_2$ group, preferably —$NH_2$ group). Thus, the ligands of the water-stable MOF framework may also be selected from N-heterocyclic ligands where the N atom(s) constituting the N-heterocycle of the ligand is/are involved in binding to the MOF metal sites, and where the N-heterocyclic ligand may bear at least one additional basic group covalently grafted thereon (e.g., formiate, carboxylate, or —$NH_2$ groups, preferably —$NH_2$ groups,) which is not involved in binding to the MOF metal sites, such as an amino-imidazolate ligands (i.e., $NH_2$— imidazolate ligands).

The MOF linker may be a $C_4$-$C_{16}$ polycarboxylate alkyl linker or a $C_6$-$C_{24}$ aromatic polycarboxylate linker, as described above, albeit additionally bearing at least one basic group, such as formiate, carboxylate, or —$NH_2$ groups, covalently attached to the linkers (i.e., as a substituent, as opposed to the best mode where the basic groups (e.g., N and/or NH groups, preferably a —N—NH— group) are embedded within the ligand itself such as N-heterocyclic ligands).

The above-listed $C_4$-$C_{16}$ polycarboxylate alkyl linkers and $C_6$-$C_{24}$ aromatic polycarboxylate linkers may be chemically modified to covalently bind/graft formiate, carboxylate, or —$NH_2$ groups (basic groups).

Alternatively, a tri-carboxylate ligand may be used, which binds to the MOF metal sites only via two of the three carboxylate groups, the third remaining available (carboxylate basic group available for VOC capture). This is the case for UiO-66(Zr)—(COOH) [also called/named UiO-66(Zr)-BTC] and UiO-66(Zr)—(COOH)$_2$.

The MOF linker may be an N-containing heterocyclicinker where the N atom(s) constituting the N-heterocycle of the ligand is/are involved in binding to the MOF metal sites, for example $C_3$ N-containing heterocyclic linker, such as imidazolate ligands; additionally bearing at least one basic group covalently attached thereto (e.g., at least one basic group selected from formiate, carboxylate, or —$NH_2$, preferably at least one —$NH_2$ group is further grafted on the N-containing heterocyclic linker). For example, the N-containing heterocyclic linker may be 2-amino-imidazolate, 4-amino-imidazolate or 5-amino-imidazolate:

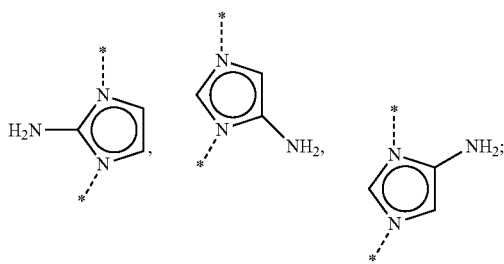

wherein * denotes binding to the MOF metal sites.

Preferably, the —$NH_2$ groups may be present in the water-stable MOF framework in the form of N-heterocyclic polycarboxylate ligands. For example, the MOF ligands may be aromatic polycarboxylate ligands bearing at least one —$NH_2$ group, such as 2-aminoterephthalate, 2-amino-1,4-benzenedicarboxylate, 5-aminoisophthalate or 5-amino-1,3-benzenedicarboxylate.

Advantageously, the hydrogen-bond accepting or donating oxygenated species in the water-stable MOF framework are present in the form of oxo-clusters, oxo-hydroxo clusters, and/or OH.

MOFs

The MOF material may be selected from any MOF known in the art having the requisite properties:
average pore size (D)<40 Å, for example <10 Å, preferably 3 Å≤D<10 Å
hydrophilic core formed by basic groups and hydrogen-bond accepting or donating oxygenated species
hydrogen-bond accepting or donating oxygenated species in the MOF framework, preferably in the form of oxo-clusters, oxo-hydroxo clusters, and/or OH groups Heterocyclic basic groups covalently bound to the MOF ligands, without binding to the MOF metal sites Advantageously, the basic groups participating in forming the MOF hydrophilic core are available basic groups embedded within N-containing heterocyclic ligands, preferably in the form of —N— and/or —NH— moieties, not involved in binding to the MOF metal sites, as described in the best mode of the present disclosure.

Surprisingly, the combination of the above properties has been found by the inventors to achieve all the desired technical effects that were sought for the development of an improved air purification system that selectively captures aldehydes, such as formaldehyde and/or acetaldehyde. The achieved technical effects, which constitute a marked improvement over air purification systems known in the art, include:
a water-stable MOF material;
filtration selectivity and high adsorption capacity (to avoid accelerated saturation phenomena);
adsorption stability under representative environmental conditions (to avoid release/leakage phenomena); and
easy recyclability of the filter according to a protocol readily accessible to domestic and professional users (to avoid expensive consumables, often causing poor performance of air purifiers).

In general, the MOF may be selected from any one of the following crystalline structures: MIL-100, MIL-127, UiO-66, MIL-53, MOF-808, MIL-125, MIL-160, MIL-101, ZIF-8, PDA-type MOF materials such as DUT-67 type structures or CAU-10.

Within the above-listed MOF crystalline structures, some of them may be hydrophobic/amphiphilic and have no basic groups in the structure (e.g., MIL-100(Fe), MIL-53(Al)). Others may be hydrophilic but have no basic groups in the structure (e.g., MIL-160). Yet others may be hydrophilic but have basic groups in the ligand structure bound to the metal sites (e.g., ZIF-8 where the nitrogen atoms of the imidazolate ligand are involved in bonding with Zn atoms of the MOF framework). These MOFs, as such, would not be suitable for reducing to practice the present invention. However, an $NH_2$-modified version of these MOFs, or a version where a polar functional group is covalently grafted on the ligand, may be used, although this variant is not preferred. Specifically, the introduction of an additional polar basic group (in the form of formiate, carboxylate (e.g., fumarate), —$NH_2$ groups) on the ligand of these MOFs may have the effect of:
for all the above-listed MOFs that may be initially hydrophobic/amphiphilic (prior to the chemical functionalization of the MOF ligands with a polar basic group), rendering the MOFs sufficiently hydrophilic for application within the present invention;
for all the above-listed MOFs that may be initially lacking basic groups in the structure (prior to the chemical functionalization of the MOF ligands with a polar basic group), equipping the MOFs with basic groups, which would in turn be available for VOC capture;
for all the above-listed MOFs that may initially have basic groups in the structure engaged in binding with the MOF metal sites (prior to further chemical functionalization of the MOF ligands with a polar basic group), equipping the MOFs with available basic groups, which would in turn be accessible for VOC capture.

In general, MOF crystalline structures include UiO-66-$NH_2$, MIL-53-FA, MOF-808-$NH_2$, MIL-125-$NH_2$, MIL-101-$NH_2$, ZIF-8-$NH_2$, Al-3,5-PDA, DUT-67-PZDC, CAU-10-$NH_2$. CAU-10-pyridine, and CAU-10-pyrazine; or a mixture of two or more of the above; preferably Al-3,5-PDA, MIL-125-$NH_2$, UiO-66-$NH_2$ and CAU-10-$NH_2$.

In general, the MOF may be selected from any one of the following crystalline structures: UiO-66-$NH_2$, MIL-53-FA, MOF-808-$NH_2$, MIL-125-$NH_2$, MIL-101-$NH_2$, ZIF-8-$NH_2$, Al-3,5-PDA, DUT-67-PZDC, CAU-10-$NH_2$. CAU-10-pyridine, or CAU-10-pyrazine; or a mixture of two or more of the above; preferably Al-3,5-PDA, MIL-125-$NH_2$, UiO-66-$NH_2$ and CAU-10-$NH_2$; and (when the recited MOF crystalline structure opens the possibility of having different types of metal atoms) the MOF metal (the metal ion, and/or the metal of the metal oxide and/or metal hydroxide) may be selected from tri and tetravalent metals from the rare earth metals (Sc, Y, Tb, Gd, Ce, Ln, La), Ti, Zr, Fe, Al or Cr; preferably Sc, Y, Ln, La, Ti, Zr, Fe, Al or Cr; preferably Ti, Zr, Fe, Al or Cr; more preferably Fe, Al, Ti or Zr, most preferably Al or Zr.

In general, the MOF may be selected from any one of the following: UiO-66(Zr)—$NH_2$, MIL-53(Al)-FA ("FA" stands for fumarate), MOF-808(Zr)—$NH_2$, MIL-125(Ti)—$NH_2$, MIL-101(Cr)—$NH_2$, ZIF-8-$NH_2$, Al-3,5-PDA ("MOF-303"), DUT-67(Zr)-PZDC ("PZDC" stands for Pyrazole-3,5-dicarboxylate), CAU-10(Al)—$NH_2$, CAU-10(Al)-pyridine, or CAU-10(Al)-pyrazine, or a mixture of two or more of the above. Preferably, the MOF material may be selected from Al-3,5-PDA, MIL-125(Ti)—$NH_2$, UiO-66(Zr)—$NH_2$ or CAU-10(Al)—$NH_2$. or a mixture of two or more of the above.

Methods for $NH_2$-functionalizing MOFs are known. For example, for $NH_2$-functionalizing ZIF-8, the reader may refer to: K. Y. Cho et al., "Synthesis of amine-functionalized ZIF-8 with 3-amino-1,2,4-triazole by postsynthetic modification for efficient C02-selective adsorbents and beyond," *J. Mater. Chem.* A, vol. 6, no. 39, pp. 18912-18919, 2018. [25]

MOF Best Mode:

However, in the best mode of carrying out the invention, preferred MOF crystalline structures in connection with the best mode ligands described supra include UiO-66, MIL-53, MIL-68, MIL-125, MIL-101, CAU-10, MIL-160, PDA-type MOF materials such as MOF-303, MOF-573 or DUT-67; preferably UiO-66, MIL-53, MIL-68, MIL-101, CAU-10, or PDA-type MOF materials such as MOF-303, MOF-573 or DUT-67; more preferably PDA-type MOF materials such as MOF-303, MOF-573 or DUT-67 type structures.

Within the above-listed MOF crystalline structures for the best mode, some of them may be hydrophobic/amphiphilic and have no basic groups in the structure (e.g., MIL-101 (Cr), MIL-53(Al)). Others may be hydrophilic but have no basic groups in the structure (e.g., MIL-160). These MOFs, as such, would not be suitable for reducing to practice the present invention. However, an $NH_2$-modified version of these MOFs, or a version where a polar functional group is covalently grafted on the ligand, would be suitable within the context of the present invention. Specifically, the introduction of an additional polar basic group (in the form of —N or —NH— groups) on the ligand of these MOFs would have the effect of for all the above-listed MOFs that may be initially hydrophobic/amphiphilic (prior to the chemical functionalization of the MOF ligands with a polar basic group), rendering the MOFs sufficiently hydrophilic for application within the present invention;

for all the above-listed MOFs that may be initially lacking basic groups in the structure (prior to the chemical functionalization of the MOF ligands with a polar basic group), equipping the MOFs with basic groups, which would in turn be available for VOC capture;

for all the above-listed MOFs that may initially have basic groups in the structure engaged in binding with the MOF metal sites (prior to further chemical functionalization of the MOF ligands with a polar basic group), equipping the MOFs with available basic groups, which would in turn be accessible for VOC capture.

Preferred MOF crystalline structures for carrying out the best mode include Al-3,5-PDA (MOF-303 or MOF-573), DUT-67-PZDC, CAU-10-pyridine, CAU-10-pyrrole, and CAU-10-pyrazine; or a mixture of two or more of the above; preferably Al-3,5-PDA.

Advantageously, the MOF according to the best mode may be selected from any one of the following crystalline structures: Al-3,5-PDA, DUT-67-PZDC, CAU-10-pyridine, CAU-10-pyrrole or CAU-10-pyrazine; or a mixture of two or more of the above; preferably Al-3,5-PDA; and (when the recited MOF crystalline structure opens the possibility of having different types of metal atoms) the MOF metal (the metal ion, and/or the metal of the metal oxide and/or metal hydroxide) may be selected from tri and tetravalent metals from the rare earth metals (Sc, Y, Ln), Ti, Zr, Fe, Al or Cr; preferably Ti, Zr, Fe, Al or Cr; most preferably Al or Zr.

Advantageously, the MOF according to the best mode may be selected from any one of the following: Al-3,5-PDA ("MOF-303" or MOF-573), DUT-67(Zr)-PZDC ("PZDC" stands for Pyrazole-3,5-dicarboxylate), CAU-10(Al)-pyridine, CAU-10(Al)-pyrrole or CAU-10(Al)-pyrazine, or a mixture of two or more of the above. Preferably, the MOF material may be Al-3,5-PDA.

MOF Literature

The MOFs in general, and the MOF materials mentioned in the various embodiments described in the context of this invention are known, and their synthesis and characterization have been reported in the literature. In this regard, reference may be made in particular to document WO 2019/053048. [6]

MIL-160(Al) is a known Metal Organic Framework reported for example in WO 2016/186454, as well as synthetic methods of its preparation. The crystal system of MIL-160(Al) obtained by X-ray diffraction analysis was calculated to have a tetragonal space group of I41md, a lattice length of a and b axis of 20.9902(1) Å and c axis of 10.70801(9) Å, and a unit cell volume of 4717.85(6) Å<3> (cf. FIGS. 1 and 2 in WO 2016/186454). MIL-160(Al) or Al(OH)[$O_2$C—$C_4H_2$O—$CO_2$] is composed by helical cis corner-shaping chains of $AlO_4(OH)_2$ octahedra connected by 2,5-furandicarboxylate groups as ligand. All the octahedra are surrounded by oxygen atoms from four ligands and two hydroxyl groups. The —OH ions are in cis-position and linked to the Al centers to create chains. These helical chains run along the c-axis. The ligands are connected to four octahedra from two chains together. This forms a 3D structure demarcating square-shaped sinusoidal one-dimensional channels of approximately 5-6 Å in diameter (Permyakova et al., 2017a [7]). The BET area and micropore volume are respectively 1070±20 $m^2$/g and 0.398±0.005 $cm^3$/g as reported by Cadiau et al., 2015 [8] while Permyakova et al., 2017b [9] reported a value of 0.46 $cm^3$/g for the pore volume.

DUT-67(Zr)-PZDC is a known Metal Organic Framework reported for example by J. Jacobsen et al., 2018. [30]

Methods for $NH_2$-functionalizing CAU-10 are known. For example, the reader may refer to the work by H. Reinsch et al., 2013. [26] For CAU-10(Al)-pyridine and CAU-10 (Al)-pyrazine, the reader may refer to the report by Cadiau et al., 2015 [40], which describes a method for preparing CAU-10(Al)-pyridine. CAU-10(Al)-pyrazine may be prepared by a method analogous to that of CAU-10(Al)-pyridine described in reference [40]. CAU-10(Al)-pyrazine and CAU-10(Al)-pyridine correspond to CAU-10(Al) with the ligand pyrazine-2,6-dicarboxylic acid and pyridine 2,6-pyridinedicarboxilic acid, respectively.

For MIL-125(Ti)—$NH_2$, the reader may refer to the reports by Y. Fu et al., 2012 [27]; and S.-N. Kim et al., 2013, [28] which describe methods for its preparation.

Advantageously, the MOF may preferably be under a form allowing a large exchange surface between the MOF and the environment where the volatile organic compounds, particularly aldehydes, have to be captured by adsorption. For example, the MOF may be in any conventional form in which an adsorbent can be used for sorption/desorption purposes, for example, but not limited to nanoparticles, powder, membrane, granules or in the form of a composite material, embedded in or applied to the surface of a sheet of paper or a polymer or fibre. For example, document WO2009/123484 [10] published in October 2009 discloses a useful process for producing polyurethane foam filter material with adsorption capabilities that can be used to support the MOF to carry out the present invention. Other examples are the electrospinning of polymer containing MOF particles disclosed in documents M. Rose et al. Adv. Eng. Mater. 2011, 13, 356-360 [11], R. Ostermann at al. Chem. Commun. 2011, 47, 442-444 [12], J. Ren et al. Int. J. Hydrogen Energy 2015, 40, 9382-9387 [13] and M. R. Khan et al. J. Mater. Eng. Perform. 2016, 25, 1276-1283 [14] that give final composite fiber materials with supported MOF that simplify the application of MOF for the adsorption of volatile organic compounds.

MOF Shaping

Whatever the method of preparation, the MOFs that can be used in the reduction to practice of air filters/purifiers according to the present invention may be obtained in the form of powder, nanoparticles or shaped bodies.

Advantageously, the MOF can be in the form of nanoparticles. Methods for preparing MOF materials in the form of nanoparticles are well known. The reader may refer in particular to the teachings of document WO 2009/07767 [15]. The MOF nanoparticles may then be shaped into "shaped bodies", as further described below.

Advantageously, the MOFs usable in the context of the present invention can be shaped into "shaped bodies" (e. g. in the form of pellets, spheres or granules of different shapes/geometries). The producing of MOF shaped bodies may be effected by any suitable methods known in the art. For example, these known methods include extrusion or tableting. For example, these known methods include extrusion, slip casting, spark plasma sintering or compaction. In exemplary embodiments, such method may comprise kneading of the MOF either alone or together with at least one binder and/or at least one pasting agent and/or at least one template compound to give a mixture; shaping of the resulting mixture by means of at least one suitable method such as extrusion; optional washing and/or drying and/or calcination of the extrudate; optional finishing treatment. The reader may refer to US 2014/0213832 [16] and Permyakova A. et al. (2017b) [9] for general teaching about shaping of MOFs via granulations. Additional teaching may be found in Kim et al. (2015). [17] In the production of shaped bodies, further materials such as binders, lubricants or other additives may be mixed with the MOF.

The possible geometries of these shaped MOF bodies are subject to essentially no restrictions. Examples are, inter alia, pellets such as circular pellets, pills, spheres, granules, extrudates such as rods, honeycombs, grids or hollow bodies. Preferably the MOF may be converted into spherical particles, preferably 1-10 mm diameter particles, preferably 1-7 mm diameter particles, more preferably 1-5 mm diameter particles, most preferably 1-2 mm diameter particles.

In another variant, the MOF material may be deposited on a support with filtering capacities, such as ceramic filters, glass fibres, paper. The MOF may also be deposited on a support, such as a plate, a honeycomb shaped support, a grid, or any shape used in air purification filters.

Advantageously, the resulting shaped MOF will be stable in water (i. e. beads or other shaped bodies do not turn into powder when in contact with water). This water stability of the shaped bodies comes in addition to the structural water-stability of the MOF itself from a structural point of view (at the molecular level). MOF shaped bodies are said to be water-stable if they do no disaggregate into powder when in contact with water.

The MOFs usable in the context of the present invention may be used as such as adsorbents in the air filters/purifiers according to the invention, either alone or with other adsorbents or additional materials (i.e. additives usually used in the manufacture of adsorbent beds, such as binders, lubricants or other additives used in the preparation of shaped bodies).

In yet another aspect, the present invention provides a process for purifying air, comprising contacting the air to be purified with a porous water-stable Metal-Organic Framework (MOF) material comprising an average pore size <40 Å, preferably <10 Å, and a hydrophilic core formed by basic groups and hydrogen-bond accepting or donating oxygenated species in the MOF framework, wherein the basic groups are covalently bound to the MOF framework. The MOF may be as defined in any variant described in the present document. In a more preferred variant, the MOF may be as defined in any variant according to the best mode of carrying out the invention (cf. sections "Ligand best mode" and "MOF best mode" described above). Advantageously, the water-stable MOF may be coated on a support in the form of a plate, a honeycomb shaped support, a grid, or any shape used in air purification filters. Advantageously, the water-stable MOF may be in the form of a shaped body, such as pellets such as circular pellets, beads, spheres, granules, extrudates such as rods, honeycombs, grids or hollow bodies. Advantageously, the dimension of the shaped MOF body particles may range from 1-10 mm diameter particles, preferably 1-7 mm diameter particles, more preferably 1-5 mm diameter particles, most preferably 1-2 mm diameter particles. Advantageously, the water-stable MOF may be made into a shaped body using binders, lubricants or other additives conventionally used in the preparation of adsorbent shaped bodies. The nature and quantity of binders may be defined to best confer water-stability to the resulting shaped MOF. For example, a polymer binder such as polyvinyl butyral or acetate, may be used, as opposed to graphite which may be detrimental to water-stability and/or BET specific surface area. For example, water stability of the body (MOF+binder) may be achieved by using a polymer binder with wt % between 1 and 10 wt %, preferably between 1-5 wt %, most preferably between 1-3 wt %, based on the total weight MOF+binder. Advantageously, the binder nature and quantity used will also help to achieve acceptable specific surface area.

Again, polymer binders such as polyvinyl butyral or polyvinyl acetate may be helpful in that regard, preferably between 1-5 wt %, most preferably between 1-3 wt %, yet more preferably between 1.5-3 wt %, based on the total weight MOF+binder.

Advantageously, the shaped water-stable MOF may be contained in the cavities of a hollow support, such as a honeycomb shaped support. As such, a filter/purification device may comprising a hollow support, such as a honeycomb shaped support, filled with shaped bodies of a MOF of interest, having the requisite properties stated before.

Advantageously, the air purifying process may further comprise a step of soaking the MOF material in water and/or a hydro alcoholic solution at room temperature for a suitable amount of time, to easily regenerate the water-stable adsorbent MOF material. For example, the process may be for purifying indoor air, such as in domestic houses, office space, workshops, cabins/passenger compartments of transport vehicles such as cars, coaches, buses, metro, trains, planes, boats.

In yet another aspect, the present invention provides a process for the preparation of a porous water stable Metal-Organic Framework (MOF) material, with improved properties, comprising an average pore size <40 Å, preferably <10 Å, and a hydrophilic core formed by basic groups and hydrogen-bond accepting or donating oxygenated species in the MOF framework, wherein the basic groups are covalently bound to the MOF framework;

the process comprising at least one reaction step (i) of reacting in a suitable solvent system, preferably green solvents, preferably water:

at least one metal precursor selected from any one of Sc, Y, Ln, La, Ti, Zr, Fe, Al or Cr-cluster containing compounds; preferably Ti, Zr, Fe, Al or Cr; more preferably Fe, Al, Ti or Zr-cluster, most preferably Al or Zr-cluster containing compounds, such as $ZrCl_4$, $ZrOCl_2$, $ZrOSO_4$, $Zr(SO_4)_2$, Zr hydroxyl-carbonate, $ZrO(NO_3)_2$, $Zr(NO_3)_4$, $Zr(OR_4)_4$, $AlCl_3$, $Al(NO_3)_3$, $Al_2(SO_4)_3$, $Al(OH)_3$, $Al_2O_3$, $Al(OR_4)_3$ as well as their corresponding hydrates; wherein $R_4$, $R_5$, and $R_6$, for each occurrence, independently represent H, $CO_2$, acyl such as Ac, or a linear or branched $C_{1-10}$ alkyl or $C_{6-10}$ aryl moiety; wherein each of the foregoing aryl moieties may be, individually, further substituted with one or more linear or branched $C_{1-6}$ alkyl or $C_{6-10}$ aryl moieties; and wherein each of the foregoing alkyl moieties may preferably be acyclic;

a ligand precursor L' optionally bearing at least one basic group selected from a formiate, carboxylate, —$NH_2$ or —NH— moiety covalently bound to it wherein the at least one basic group does not bind to the MOF metal sites. In the best mode, the ligand precursor L' is preferably a precursor ligand with N and/or NH basic groups, preferably a —N—NH— group, embedded within the ligands (for example, —NH— groups contained in pyrrazolyl nucleus) such as the N-heterocycles described in the section "Ligand best mode". In a preferred variant, the ligand precursor L' may be the polycarboxylic acid counterpart of the polycarboxylate ligand L as defined in any variant according to the best mode of carrying out the invention (cf. sections "Ligand best mode" described above) or any other suitable precursor ligand that can lead to the corresponding carboxylate groups for binding to the MOF metal sites. Examples of ligand precursors according to the best mode include:

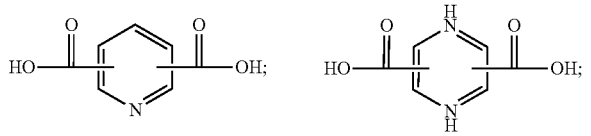

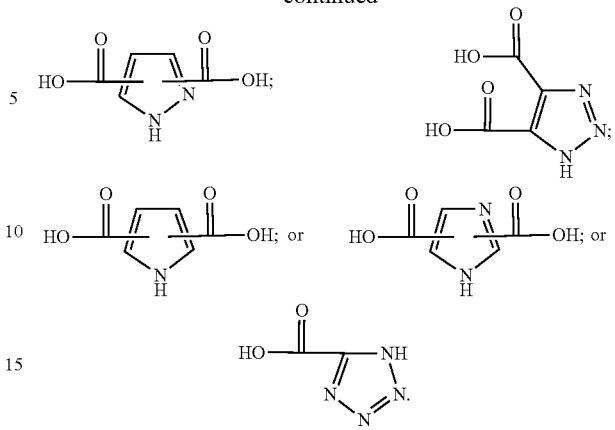

For example, the ligand precursor L' according to the best mode may be pyrazole-3,5-dicarboxylic acid, pyrazole-3,4-dicarboxylic acid, imidazole-4,5-dicarboxylic acid, imidazole-2,4-dicarboxylic acid, pyrrole-2,5-dicarboxylic acid, pyrrole-2,4-dicarboxylic acid, pyrrole-2,3-dicarboxylic acid, pyrrole-3,4-dicarboxylic acid, pyrazine-2,5-dicarboxylic acid, pyrazine-2,3-dicarboxylic acid, pyridine-2,5-dicarboxylic acid, pyridine-2,6-dicarboxylic acid, pyridine-2,3-dicarboxylic acid, pyridine-2,4-dicarboxylic acid, pyridine-3,4-dicarboxylic acid, pyridine-3,5-dicarboxylic acid, 1,2,3-Triazole-4,5-dicarboxylic acid, or 1,2,4-Triazole-3,5-dicarboxylic acid.

As discussed above, the ligand precursor L' used in the MOF synthesis may already bear at least one basic group selected from formiate, carboxylate, —$NH_2$ covalently bound to it, or an N and/or —NH— group embedded within the ligand itself (e.g., as part of a N-heterocycle). Preferably, the recited basic groups end up not being involved in binding with the MOF metal sites, once the MOF synthesis is complete and the MOF scaffold/framework is formed. As such, at least a basic groups in the form of formiate, carboxylate, —$NH_2$ or —NH— moiety is concomitantly introduced in the MOF framework during the MOF synthesis. Most preferably, according to the best mode, at least a basic group in the form of —N or —NH— moiety, preferably a —N—NH— group, is concomitantly introduced in the MOF framework during the MOF synthesis.

Advantageously, the ligand precursor L' bearing at least one basic group, as recited above, may be one that leads to a polycarboxylate ligand L in the MOF framework, once the MOF synthesis is complete. The MOF ligand L may be any one of the MOF ligands described generally and any variant herein. In a more preferred variant, the MOF ligand L may be as defined in any variant according to the best mode of carrying out the invention (cf. sections "Ligand best mode" described above).

In general, the precursor ligand L' may be:
(i) a $C_4$-$C_{16}$ polycarboxylic acid alkyl precursor ligand (such as di-, tri- or tetracarboxylic acid precursor ligands, for example $C_2H_2(CO_2H)_2$ (fumaric acid), $C_2H_4(CO_2H)_2$ (succinic acid), $C_3H_6(CO_2H)_2$ (glutaric acid), $(C_4H_4)(CO_2H)_2$ (muconic acid), $C_4H_8(CO_2H)_2$ (adipic acid)), additionally bearing at least one basic group, such as formiate, carboxylate, or —$NH_2$ groups, covalently attached to the linkers; or other suitable ligand precursor that can lead to the corresponding carboxylate ligand;

(ii) a $C_6$-$C_{24}$ aromatic polycarboxylic acid precursor ligand, such as benzyl or naphtyl di-, tri- or tetracarboxylic acid; additionally bearing basic groups, such as formiate, carboxylate, or —$NH_2$ groups, preferably bearing at least one —$NH_2$ group, covalently attached to the linkers; such as 2-aminoterephthalic acid, 2-amino-1,4-benzenedicarboxylic acid or 5-aminoisophthalic acid or 5-amino-1,3-benzenedicarboxylic acid; or other suitable ligand precursor that can lead to the corresponding carboxylate ligand;

(iii) an N-heterocyclic polycarboxylic acid precursor ligand, such as pyrazole-3,5-dicarboxylic acid, or other suitable ligand precursor that can lead to the corresponding carboxylate ligand; or (iv) an N-containing heterocyclic precursor ligand, for example $C_3$ N-containing heterocyclic precursor ligand, such as imidazole-type precursor ligands; additionally bearing at least one basic group covalently attached to the heterocyclic ring (e.g., at least one basic group selected from formiate, carboxylate, or —$NH_2$ groups, preferably at least one —$NH_2$ group is further grafted on the N-containing heterocyclic precursor ligand). For example, the N-containing heterocyclic precursor ligand may be 2-amino-imidazole, 4-amino-imidazole or 5-amino-imidazole. This would be the case for example for ZIF-8-$NH_2$, where the two N atoms constituting the imidazolyl heterocycle are involved in binding with the ZIF-8-$NH_2$ metal sites (Zr atoms), whereas the "free"-$NH_2$ group grafted on the imidazolyl radical does not bind to Zr and therefore remains accessible for capturing aldehyde VOCs, such as formaldehyde and/or acetaldehyde.

Introduction of Basic Group Post MOF Synthesis

In another variant, the ligand precursor L' used in the MOF synthesis does not bear a formiate, carboxylate, or —$NH_2$ moiety covalently bound to it. In that case, basic groups in the form of formiate, carboxylate, or —$NH_2$ moiety may introduced in the MOF framework post-synthesis.

Methods for post-synthesis modifications of MOFs are known. These include chemical modification/functionalization of the ligand once the MOF is formed, or introduction of the desired functional groups via a change of ligand post-synthesis of the MOF. For example, for chemical modification/functionalization of the ligand on the MOF, the reader may refer to the work by S. Bernt et al., 2011. [29] For MOF functionalization via a change of ligand post MOF synthesis, the reader may refer to the work reported by K. Y. Cho et al., 2018. [25] Accordingly, wherein the ligand precursor L' does not bear at least one formiate, carboxylate, or —$NH_2$ moiety covalently bound to it, then the process may further comprise a step of functionalizing the MOF, post-synthesis, with at least one formiate, carboxylate, or —$NH_2$ moiety; by ligand exchange or by covalent grafting of the formiate, carboxylate, or —$NH_2$ moiety on the MOF ligand.

Precursor Ligand L' Best Mode:

In a most preferred variant, the precursor ligand L' may be a precursor of the ligand L as defined in any variant according to the best mode of carrying out the invention (cf. sections "Ligand best mode" described above), that is L' may be any suitable precursor ligand that can lead to the corresponding ligand L during MOF synthesis for binding to the MOF metal sites. For example the ligand precursor L' may be:

(i) an N-heterocycle selected from diazoles (e.g. pyrazole), triazoles, or tetrazoles, bearing at least two carboxylic acid groups or other suitable precursor groups that can lead to the corresponding carboxylate groups for binding to the MOF metal sites. The N-heterocycle may be any one of the N-heterocylic structures described in the section "Ligand best mode"; for example, the precursor ligand may be pyrazole-3,5-dicarboxylic acid;

(ii) a $C_4$-$C_{16}$ polycarboxylic acid alkyl precursor ligand (such as di-, tri- or tetracarboxylic acid precursor ligands, for example $C_2H_2(CO_2H)_2$ (fumaric acid), $C_2H_4(CO_2H)_2$ (succinic acid), $C_3H_6(CO_2H)_2$ (glutaric acid), $(C_4H_4)(CO_2H)_2$ (muconic acid), $C_4H_8(CO_2H)_2$ (adipic acid)), or other suitable ligand precursor that can lead to the corresponding carboxylate ligand, the ligand precursor additionally bearing at least one N-heterocycle selected from diazoles (e.g. pyrazole), triazoles, or tetrazoles, preferably comprising a —N—NH— group within the ring structure, the N-heterocycle covalently attached to the ligand precursor, wherein the N atoms of the N-heterocyle are not involved in binding to the MOF metal sites;

(iii) a $C_6$-$C_{24}$ aromatic polycarboxylic acid precursor ligand, such as benzyl or naphtyl di-, tri- or tetracarboxylic acid; the ligand precursor additionally bearing at least one N-heterocycle selected from diazoles (e.g. pyrazole), triazoles, or tetrazoles, preferably comprising a —N—NH— group within the ring structure, the N-heterocycle covalently attached to the ligand precursor, wherein the N atoms of the N-heterocycle are not involved in binding to the MOF metal sites;

(iv) an heterocyclic precursor ligand whose heteroatoms are meant to bind to the MOF metal sites, for example $C_3$ N-containing heterocyclic precursor ligand, such as imidazole-type precursor ligands; the heterocyclic precursor ligand additionally bearing at least one N-heterocycle selected from diazoles (e.g. pyrazole), triazoles, or tetrazoles, preferably comprising a —N—NH— group within the ring structure, the N-heterocycle covalently attached/grafted to the heterocyclic precursor ligand, wherein the N atoms of the attached/grafted N-heterocycle are not involved in binding to the MOF metal sites.

The MOF synthesis may be carried out using any method for MOF synthesis known in the art. For example, a solvothermal process, mechanical process, microwave process may be used. Advantageously, the reaction may be carried out under reflux conditions. Advantageously, the reaction may be carried out for 12 to 24 hours under reflux conditions.

The molar ratio metal precursor/ligand precursor (ratio M/L) may be adjusted depending on the end MOF that is intended to be prepared (i.e., depending on the MOF structure that is targeted). For example, a molar ratio M/L=1 to 1.2 may be used for MOF-303, UiO-66-$NH_2$ and MIL-101-EN. A molar ratio M/L=0.10 to 0.15 may be used for ZIF-8. A molar ratio M/L=0.30 to 0.40 may be used for MIL-140B.

Advantages

One of the great advantages of the MOFs described above is that they are specifically designed to selectively remove/capture harmful aldehyde VOCs (volatile organic compounds), preferably short-chain aldehyde VOCs (i.e., 6 carbon atoms or less), for example C1-C2 aldehyde VOCs such as formaldehyde and/or acetaldehyde, from the air at very low concentrations, even in the presence of a high concentration of water vapour (humid air) and/or in the presence of other VOCs. Short-chain aldehyde VOCs include C6-aldehydes such as hexanal, which is very much used in aromas and perfumes. Typical other short-chain aldehyde VOCs include formaldehyde, acetaldehyde, propionaldehyde, acrolein, benzaldehyde, isopental, pentanal, valeraldehyde, isovaleraldehyde, butanal and isobutyraldehyde (C4). In a typical indoor environment, formaldehyde and acetaldehyde are preponderant short-chain aldehyde VOCs, with traces of propionaldehyde, acrolein (C3), benzaldehyde (C6), isopental, pentanal, valeraldehyde and isovaleraldehyde (C5), butanal and isobutyraldehyde (C4). In terms of most important aldehyde VOC concentrations present in indoor air, C1-C3 aldehyde VOCs represent the bulk of short-chain aldehyde VOCs (outside of specialty indoor spaces with specifically controlled gaseous environment where the VOC composition may differ). Therefore, the present invention is especially useful to the selective capture of short-chain aldehyde VOCs, such as C1-C3 aldehyde VOCs, over other VOCs (e.g., non-aldehyde VOCs) and water that may be present in surrounding air, even in abnormally humid gaseous environments (i.e. with above-normal relative humidity). As porous materials, MOFs in general have already been used as adsorbent and/or filter materials. However, the MOFs described in this document, for the implementation of the present invention, especially the MOFs described according to the best mode, constitute a very particular selection of the MOF family. They are able to effectively and selectively remove aldehyde VOCs, preferably short-chain aldehyde VOCs as described above, at low concentrations from indoor air, even in abnormally humid gaseous environments (i.e. with above-normal relative humidity), and in the presence of other VOCs (e.g., non-aldehyde VOCs). In porous materials such as MOFs in general, the competing adsorption of water (polar molecule) typically hinders the use of generic MOFs to adsorb polar volatile organic compounds, such as aldehydes, that are present in the air in very low concentrations. The presence of water strongly influences the adsorption of polar VOCs when the concentration of VOCs to be removed is very low.

The MOFs that can be used in this invention, as described in this document, especially the MOFs described according to the best mode, significantly improve the elimination/capture of aldehyde VOCs, preferably short-chain aldehyde VOCs, present in very low concentrations (both in absolute and relative pressure) even in the presence of high concentrations of water vapour. They are therefore MOFs specially designed chemically and structurally for the improved adsorption of aldehyde volatile organic compounds, even in cases when the aldehyde VOCs are present at low concentrations in humid environments (e.g. with above normal relative humidity).

Thus, the MOFs used in the present invention generally have good water stability and allow selective adsorption of aldehyde volatile organic compounds, preferably short-chain aldehyde VOCs, at very low concentrations. For example, aldehyde selective adsorption may occur at aldehyde concentrations as low as 1 ppb, or even lower. In general, the MOFs useable in the context of the present invention allow selective adsorption of aldehyde volatile organic compounds present in dry or humid air (i.e., ranging from 0% to 100% relative humidity) at a concentration in the order of 1 ppb and 500 ppm, or even 1 ppb to 100 ppm, below, at, or above normal humid level for human comfort (for example below 25% relative humidity, at about 25-30% relative humidity, or >30% relative humidity, for example ≥35% relative humidity, for example ≥40% relative humidity, up to 100% relative humidity). Aldehyde VOCs, especially short-chain aldehyde VOCs are selectively captures/adsorbed, meaning that the specific selection of MOFs described in this document, especially the MOFs described according to the best mode, preferentially capture/adsorb aldehyde VOCs, especially short-chain aldehyde VOCs, over other VOCs (e.g., non-aldehyde VOCs) and water that may be present in surrounding air, even in abnormally humid gaseous environments (i.e. with above-normal relative humidity).

One stark advantage of the water-stable MOFs for use according to the present invention, especially the MOFs described according to the best mode, is that the captured VOCs, in particular aldehydes such as short-chain aldehyde VOCs, are not released from the MOF material, even as the temperature increases (typical working temperature envisaged is the range 10-50° C.), and/or even as the MOF material reaches saturation. Stated otherwise, the originality of the present invention does not lie only in the selective capture of aldehydes from the surrounding dry or humid air in the presence of other pollutants, but also in the ability to nog release the adsorbed aldehydes, even when the temperature increases (within the typical working range of 10-40° C., preferably 10-50° C. The difference between the MOF material according to the invention and existing materials (activated carbons, zeolites) is that the "leak-free" storage capacity is not null and is sufficiently large for widespread use commercially. The "no leak" characteristics of the filter according to the present invention present a stark advantage over existing filters i.e. the ability to retain aldehydes, for example short-chain aldehyde VOCs such as formaldehyde and/or acetaldehyde, with maximum efficiency from the first passage of contaminated air through the filter, without releasing the aldehydes if the filter is saturated. These two characteristics are completely lacking in existing air filter/purification systems, notably carbon filters.

In particular, the presence of other species (typically aromatic VOCs such as toluene) does not affect the absorption capacity of the MOFs useable in the context of the present invention with respect to aldehyde VOCs, nor its selectivity. This is yet another stark advantage over activated carbon-based filters/purifiers which get quickly poisoned by molecules such as toluene (See comparative tests, notably with BlueAir® brand activated carbon, and an activated carbon/acetoacetamide formulation from the Blooow® brand, detailed in the Examples).

The fact that the MOFs envisaged in the context of the present invention selectively adsorb aldehydes, such as formaldehyde and/or acetaldehyde, which are polar organic compounds typically soluble in water at the concentrations that are being considered (concentrations of VOCs in air), offers yet another great advantage in that the MOFs may be regenerated by immersion in water. Optionally, a common consumer product additive, such as an alcohol, could be added to the water to improve the regeneration of the MOF.

A such, in yet another aspect, the present invention provides a regenerable filter for air purification, comprising a porous water-stable Metal-Organic Framework (MOF) material comprising an average pore size <40 Å, preferably <10 Å, and a hydrophilic core formed by basic groups and hydrogen-bond accepting or donating oxygenated species in the MOF framework, wherein the basic groups are covalently bound to the MOF framework; wherein the filter may be regenerated by cleaning with water and/or a hydro alcoholic solution. The MOF may be as defined in any variant described in the present document. Particularly preferred MOFs are those described above according to the best mode (cf. sections "Ligand best mode" and "MOF best mode").

In yet another aspect, the present invention provides an air purification system comprising a regenerable filter as defined above.

Based on what is observed in the case of Al-3.5-PDA in terms of interaction between formaldehyde and active sites (See Examples, notably Example 7), MOFs according to the best mode described in the present disclosure are believed to be regenerable. MOFs according to the best mode have N-containing heterocyclic ligands having available at least one basic group embedded within the ligand itself, preferably in the form of —N— and/or —NH— moieties, not involved in binding to the MOF metal sites. Such ligands are believed to have similar interactions (it has been shown that this in the case of the pyrazolate MOFs Al-3.5-PDA and DUT-67(Zr)-PZDC as well as in the case of imidazole) during the adsorption of formaldehyde with the active sites (here the N—N—H groups).

Naturally, regeneration is conditioned on bringing sufficient energy to the system to break the interactions formed (the desorption energy is of the order of 86 KJ/mol in the case of the interaction between formaldehyde and the —N—NH— groups of the pyrazole ligand). As discussed previously, the MOFs according to the best mode may be regenerated thermally and/or by washing with water and/or a hydroalcoholic solution. This is possible because in the MOFs according to the best mode, the energy brought to the system for regeneration does not significantly deteriorate the structure and active sites of the MOFs. In particular, MOFs according to the best mode described herein have one or both the following properties:

thermal stability of the structure of the MOFs and active sites in the temperature range considered for thermal regeneration; and/or stability of the structure and active sites in water for regeneration by washing.

Also, it has been found that formaldehyde adsorption does not significantly (if at all) degrade the structure and active sites of the MOFs according to the best mode.

In summary, regenerability of the MOFs according to the best mode is based on the finding that the MOFs according to the best mode, as described herein, have a minimum thermal stability range of the order of 100° C. for the structure and active sites, in addition to structural stability and active sites in water or aqueous solvent.

Other advantages may also emerge to those skilled in the art upon reading the examples below, with reference to the attached figures, which are provided as non-limiting illustrations.

EQUIVALENTS

The representative examples that follow are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. It should further be appreciated that the contents of those cited references are incorporated herein by reference to help illustrate the state of the art.

The following examples contain important additional information, exemplification and guidance that can be adapted to the practice of this invention in its various embodiments and the equivalents thereof.

EXEMPLIFICATION

The MOF materials and compositions of this invention and their preparation can be understood further by the examples that illustrate some of the processes by which these MOF materials and compositions are prepared or used. It will be appreciated, however, that these examples do not limit the invention. Variations of the invention, now known or further developed, are considered to fall within the scope of the present invention as described herein and as hereinafter claimed.

Example 1: Materials Synthesis 1.1. Al-3.5-PDA:

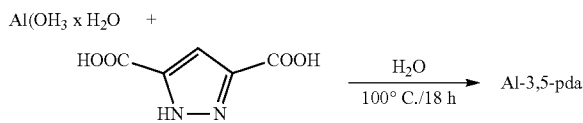

Gram-scale procedure: 6.00 mmol of 3.5-pyrazoledicarboxylic acid monohydrate and 6.00 mmol of $Al(OH)_3H_2O$ are introduced into a 100 ml flask (M/L ratio equal to 1). 60 mL of distilled water is added, and then the mixture is placed at 100° C. under stirring for 18 hours. After filtration, the white solid is washed in 60 ml of distilled water during 5 hours at 100° C., then filtered again and dried in an oven at 100° C. for 2 hours. (Specific surface area (BET) around 1343 $m^2/g$ and pore volume of 0.49 $cm^3/g$) (Yield: 1.47 g of Al-3,5-PDA considering 44% of water loss leads to 54% yield based on the linker).

Scale-up procedure: 156 g (2 mol) of aluminium hydroxide ($Al(OH)_3 \times H_2O$) and 347 g (2 mol) of 1H-pyrazole-3,5-dicarboxylic acid and 20 litres of distilled water are raised to 100° C. under stirring. A white solid is recovered after 18 hours of reaction by filtration on Büchner. The solid is replaced in 20 litres of distilled water for 5 hours, then filtered again.

Synthesis according to the protocol detailed in Farhad Fathieh et al. (Sci. Adv. 2018; 4: eaat3198, pages 1-9. [18]): 5.2 g Aluminum chloride hexahydrate ($AlCl_3*6H_2O$, 21.54 mmol) and 3.75 g 3,5-Pyrazoledicarboxylic acid monohydrate ($H_2PZDC$, 21.54 mmol) were dissolved in 360 mL water in a 500 mL glass jar, 15 mL NaOH aqueous solution (1.3 g, 32.5 mmol) was added to the mixture dropwise under stirring. The vial was then sealed and heated in 100° C. isothermal oven for 24 h. BET specific surface=1380 $m^2/g$; Pore volume=0.55 $cm^3/g$.

1.2. MIL-101(Cr)-ED (MIL-101(Cr) with Grafted Ethylenediamine Groups on the MOF Metals Sites)—

Comparative Example

MIL-101(Cr) was obtained via a hydrothermal treatment of a mixture of terephthalic acid (166 mg, 1 mmol), Cr$(NO_3)_3.9H_2O$ (400 mg, 1 mmol), HF (0.2 mL, 1 mmol) and deionized water (4.8 mL, 265 mmol) heated up to 220° C. for 8 h as disclosed in document G. Férey, et al. Science 2005, 309, 2040-2042 [19]. After cooling down the autoclave, a green powder can be removed and washed. Removing the large excess of unreacted terephthalic acid from the powder is performed by following this purification process. First, with a glass filter whose the pore size is between 40 and 100 μm, the solution is filtered off twice to remove insoluble terephthalic acid from the solution. Then, the product is put into an autoclave to be washed with ethanol at 80° C. for 24 h. After this step, the solid is mixed into a solution of 1M of $NH_4F$ at 70° C. for 24 h followed by a filtration and a wash with hot water. The resulting product is then dried overnight at 150° C.

After dehydration of 0.5 g of MIL-101(Cr) heated at 150° C. for 12 h, the solid was suspended in 30 mL of anhydrous toluene, as disclosed in document Y. K. Hwang, et al. Angew. Chem. Int. Ed. Engl. 2008, 47, 4144-4148 [20]. Ethylenediamine (0.05 mL, 0.75 mmol) was then added to the suspension and stirred under reflux for 12 h. After the reaction, the material was filtered out, washed with deionized water and ethanol, and dried at room temperature (i.e. in the present examples at a temperature between 18° C. and 28° C.).

Functionalizing MIL-101(Cr) with ED increases the formaldehyde adsorption capacity vs. MIL-101(Cr) (Leak-free and total adsorption). However, during regeneration by immersion in water and/or a hydro alcoholic solution, there is a high risk of the ED that is grafted onto the metal sites being removed. For that reason, MIL-101(Cr)-ED is not desirable in the context of the invention. Furthermore, MIL-101(Cr)-ED does not fall within the claimed invention because (i) it has a porosity greater than 10 ångström and also because (ii) ED is grafted on open metal sites and not on the organic ligands.

1.3. MIL-101(Cr)—$NH_2$ (MIL-101(Cr) with Grafted $NH_2$ Groups on the Ligands)—Example Provided as Reference Only MIL-101(Cr)—$NH_2$ may be prepared from MIL-101(Cr) via MIL-101(Cr)—$NO_2$, for example according to the method reported by S. Bernt, et al. [29]

In contrast to MIL-101(Cr)-ED, MIL-101(Cr)—$NH_2$ may be used because of its hydrophilic nature, and the presence of basic groups ($NH_2$) on the ligands, that are not bound to the MOF metal sites, and are therefore available to capture VOCs, such as aldehydes (e.g., formaldehyde and/or acetaldehyde). However, this is not a preferred variant.

1.4. ZIF-8—Comparative Example $Zn(NO_3)_2 \cdot 6H_2O$ (2.933 g, 9.87 mmol) was first solubilized in 200 mL of methanol. The same operation was carried out for the ligand by putting 2-methylimidazole (6.489 g, 79.04 mmol) into 200 mL of methanol, as disclosed in document A. Demessence et al., Adsorption properties in high optical quality nanoZIF-8 thin films with tunable thickness, J. Mater. Chem., 2010, 20, 7676-7681 [21]. After the solubilization of the species, the solution with the metal was quickly poured into the ligand mixture under stirring at room temperature (i.e. in the present examples at a temperature between 18° C. and 28° C.). Slowly, the solution became less translucent. After 1 h, the reaction was stopped and the solid was separated from the liquid by centrifugation for 15 min at 20000 rpm. The particles were then washed with absolute ethanol and centrifuged three times to remove the excess of unreacted salt and ligand. The solid was then dried at room temperature (i.e. in the present examples at a temperature between 18° C. and 28° C.) overnight.

1.5. ZIF-8-$NH_2$ (ZIF-8 with Grafted $NH_2$ Groups on the Imidazolate Ligands) Example Provided as Reference Only ZIF-8-$NH_2$ may be prepared from ZIF-8, as reported by Cho et al. [25]

In contrast to ZIF-8 whose basic nitrogen atoms on the imidazolate ligand are involved in binding to the Zr metal sites, ZIF-8-$NH_2$ may be used because of the presence of an additional basic group ($NH_2$) on the ligands, that is not bound to the MOF metal sites, and is therefore available to capture VOCs, such as aldehydes (e.g., formaldehyde and/or acetaldehyde). However, this is not a preferred variant.

1.6. UIO-66Zr)—$NH_2$: Example Provided as Reference Only

A solution composed of $ZrCl_4$ (233 mg, 1 mmol) and 2-aminoterephthalic acid (181 mg, 1 mmol) was prepared in 3 mL of DMF and put into a 23 mL Teflon liner, as disclosed in document C. Gomes Silva, et al. Chem. Eur. J. 2010, 16, 11133-11138 [22]. The mixture was heated in oven at 100° C. for 24 h. The solid was then recovered after filtration and treated with DMF. The material was then left in DMF at room temperature (i.e. in the present examples at a temperature between 18° C. and 28° C.) overnight under stirring. After a new filtration, the solid was washed twice with THF and dried at room temperature (i.e. in the present examples at a temperature between 18° C. and 28° C.). However, this is not a preferred variant.

1.7. MIL-140B(Zr)—Comparative Example

In a 500 mL round-bottom flask, $ZrCl_4$ (2.77 g, 11.9 mmol), 2,6-naphthalenedicarboxylic acid (7.08 g, 32.8 mmol) and acetic acid (25.5 mL, 450 mmol) were mixed in 430 mL of DMF and kept under reflux for 7 h. The solution was then filtrated and the resulting solid was washed with 200 mL of DMF at 120° C. for 2 h 30 followed with filtration and a last wash with 400 mL of MeOH for 12 h to get after filtration the material of interest, MIL-140B.

Example 2: Materials Characterization

Three series of analysis have been carried out to confirm the obtention of, and to characterize, the various materials synthetized in Example 1:
Nitrogen adsorption at −196° C.;
PXRD patterns of the synthesized materials; and
Thermogravimetric analysis of the synthesized materials.
2.1 Nitrogen adsorption at −196° C.: Nitrogen (Air Liquid, 99.999%) adsorption-desorption isotherms were measured at −196° C. using a liquid nitrogen cryogenic bath, in a volumetric automatic apparatus (Micromeritics, ASAP 2010). Prior to the measurement the samples were outgassed at 150° C. for 8 h at a pressure lower than 0.133 Pa.
2.2 PXRD patterns of the synthesized materials: The X-ray powder diffraction patterns were obtained with a high resolution D5000 Siemens X'Pert MDP diffractometer (λCu, Kα1, Kα2) from 5 to 20° (2θ) using a step of 0.02° and 10 s of accumulation per step in continuous mode.
2.3 Thermogravimetric analysis of the synthesized materials: In order to get the TGA profile of each material synthesized, the sample (about 10 mg) were analysed with a gravimetric analyser (Model Perkin Elmer STA 6000) in air at a constant rate of 2° C./min.

All results of these analyses confirmed the obtention of the various materials synthetized in example 1.

Example 3: MOF Shaping

Shaped bodies were prepared via a wet granulation method. The solid Al-3,5-PDA obtained in Example 1.1 above was mixed with 2 wt % of polyvinyl butyral (PVB). The wetting process was done using ethanol that was sprayed into the mixture. The mixture was then manually processed to obtained pellets with an average diameter between 1.4 and 2 mm. Finally, the shaped bodies were placed in vacuum oven at 130° C. for 4 hours.

Note: In the last step (vacuum drying), increasing the temperature up to 250° C.-400° C. may help increase mechanical strength and water resistance of the shaped body.

The same protocol was repeated by varying the weight of the binder, and the binder itself, see Table A below: Water stability of the body (MOF+binder) was achieved by using polymer binder with wt % between 1 and 10 wt %. An acceptable specific surface area was achieved by using wt % polymer binder between 1.5 and 3 wt %. Using a polymer binder in higher wt % probably leads to a partial locking (or obstruction) of the porosity. No structural changes were observed from FT-IR and PXRD spectra.

TABLE A

| Binder | Wt % Binder | Shaped body stability in water | BET surface area (m$^2$/g) |
|---|---|---|---|
| None | — | — | 1160 |
| Polyvinyl butyral (PVB) | 10 | stable | nd |
| Polyvinyl butyral (PVB) | 5 | stable | 204 |
| Polyvinyl butyral (PVB) | 3 | stable | 980 |
| Polyvinyl butyral (PVB) | 2 | stable | 1070 |
| Polyvinyl butyral (PVB) | 1.5 | stable | 1080 |
| Polyvinylacetate (PVAc) | 10 | stable | nd |
| Polyvinyl acetate (PVAc) | 5 | stable | 470 |
| Polyvinyl acetate (PVAc) | 3 | stable | 708 | nd: not determined

Example 4: Air Filter

Honeycomb filters 17×16.3×1 cm$^3$ were filled with the shaped material prepared in Example 3, and were tested modus operandi.

Example 5: Experiments on Aldehyde Adsorption Capacity of the Different Test Adsorbent Materials The shaped MOF materials (pellets) were tested using a synthetic gas bench equipped with advanced analytical equipment, constituting a set of operando analyses. The term "operando" refers to the study of a catalyst (or adsorber) in operation, that is, that the study is carried out in an environment similar to the real environment of the material under working conditions [23], by coupling spectroscopic techniques with tools for quantifying the functional efficiency of the material.

Figure 8:
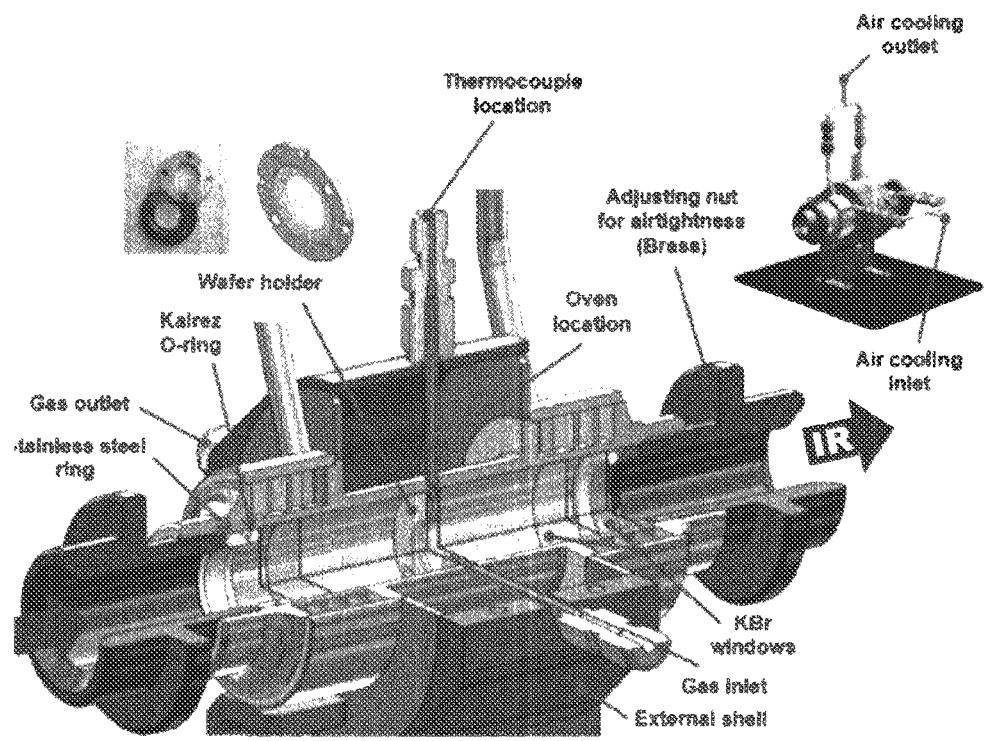
FIG. 8: shows a schematic illustration of the operando system used in the Examples.
Figure 9:
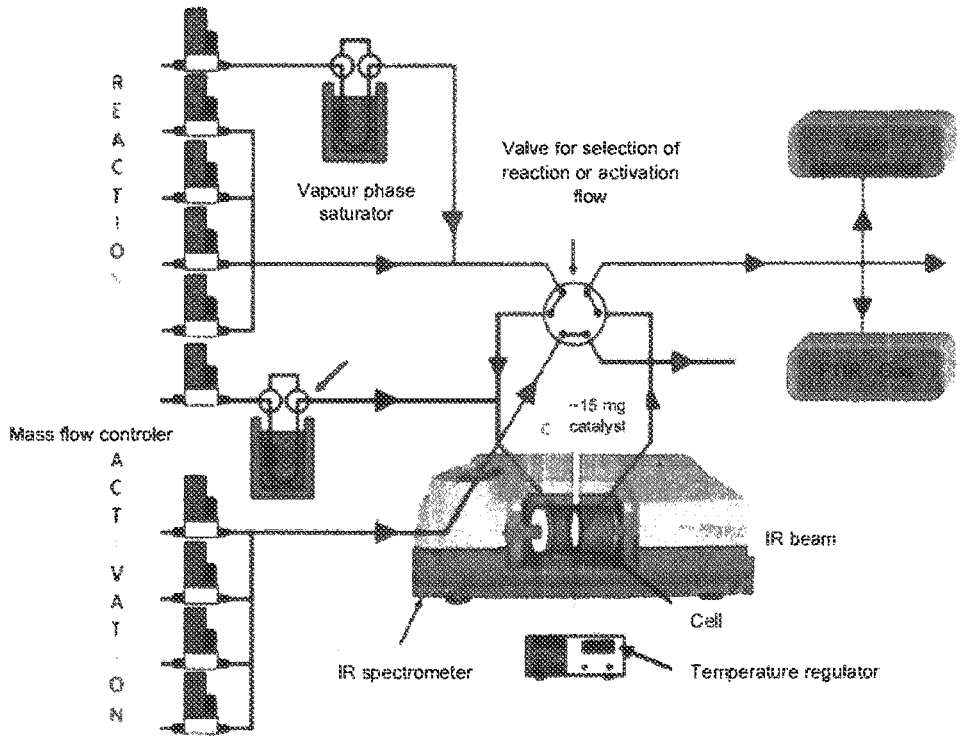
FIG. 9: shows a schematic illustration of an operando cell used in the Examples.

The operando system used comprises:

A rack for the supply of different gases, which allow the flow of reagents to be established. A set of mass flow meters accurately control each gas flow forming the reaction mixture. All mass flow meters are controlled by a user interface. Thermostatic baths, in which saturators are located, allow water to be sent in the vapour phase to the system (FIGS. 8 & 9).

An operando cell, consisting of a sample holder, several stainless steel metal parts, thermal resistance, cooling system, potassium bromide (KBr) windows and a thermocouple. The sample is placed in the cell via a sample holder. KBr windows ensure the tightness of the whole and allow the acquisition of infrared spectra of the material surface thanks to their transparency in the IR.

The reaction flow arrives on the wafer edge, perpendicular to the infrared beam, passes over the tested wafer, then is sent to all the analyzers. The thermal resistance allows a temperature increase of the cell (from rt. to 600-800° C. *maximum* depending on the model). The temperature is monitored by means of a thermocouple. Finally, the cooling system avoids the risk of overheating, which can cause irreparable damage to the external parts of the cell and to the samples (FIG. 9).

A mass spectrometer (OmniStar GSD 320). The latter allows the real-time quantification of different reactive species or products by measuring different previously selected representative masses.

An infrared spectrometer (Nexus Thermo-Nicolet-6700), controlled by the OMNIC FTIR Software, whose MACRO Basic function allows the alternate acquisition of surface and gas phase infrared spectra.

5.1. Experimental Protocol

The objective of the operando protocol was to study the efficiency of the adsorption of the various tested MOFs according to the invention under flow, in operation, in different cases approaching a real operation of a purification/filtration/filter system.

Self-supported pellets of about 20 mg and a surface area of 2 cm$^2$ were prepared from the MOFs initially in powder form. The shaped material is inserted into the operando cell.

Two gas flows were used: an activation flow (total flow: 20 cc/min, 20% O$_2$+Ar) used for the study of formaldehyde release, and a reaction flow (total flow: 20 cc/min, 20% O$_2$+415 ppm formaldehyde+N$_2$) used for formaldehyde adsorption/absorption.

Formaldehyde was generated from a liquid mixture of formaldehyde and water (formaldehyde 16% by weight), placed in a saturator. The system allowed one of the two flows to be sent to the cell while the other flow was sent directly to the analysers to have an internal standard in the system for a precise quantification. The flow change was carried out by means of a six-way valve allowing a rapid alternation between the activation and reaction flow in order to observe the adsorption phenomenon of the sample without the disturbances that can be caused by the stabilization of the different MOF materials. Thus, in this example, the sum of the two flows (activation and reaction) were simultaneously analyzed by gas phase IR spectroscopy and mass spectroscopy. This makes it possible to check the stability of the various MOF materials at the beginning of the reaction and also to have a reference level of formaldehyde at each moment.

The shaped MOF sample was previously placed under activation flow, which stabilizes the reaction flow. After stabilization, the sample was placed under reaction flow (total flow: 20 cc/min, 20% O$_2$, +415 ppm of formaldehyde diluted in $N_2$): this is the step of adsorption of the material. The MOF was left under reaction flow until it was completely saturated.

In mass spectroscopy, the formaldehyde content is followed by the variation of mass 29 (28 and 30). During adsorption, the amount of formaldehyde present in the stream decreases, which corresponds to the decrease in mass 29 (28 and 30). Gradually, when the MOF material begins to be saturated, the amount of formaldehyde present in the reaction flow increases, as does the mass 29 (28 and 30). Finally, the quantity of formaldehyde present in the lines and the mass 29 (28 and 30) return to the initial introduction level, the material is then saturated. Variations in the amount of formaldehyde are also monitored by gas-phase FTIR spectroscopy in the elongation vibration range of the C—H bond 2781-2778 $cm^{-1}$. During adsorption, the characteristic peak of formaldehyde initially decreases, then increases to its initial intensity. Thanks to a previously performed calibration, it is also possible to correlate the quantity of formaldehyde present in the gas phase at each moment, by considering the air of the formaldehyde peak in FTIR spectroscopy of the gas phase. The maximum adsorption capacity was determined by analysis of the mass spectrometry pattern, more specifically, by integrating the curve into the negative of mass 29 corresponding to the total amount of formaldehyde adsorbed by the sample.

After saturation, the desorption step was performed. The sample was placed under activation flow (total flow: 20 cc/min, 20% $O_2$+Ar). If the MOF material releases formaldehyde at room temperature, an increase in the base level of line 29 in mass spectroscopy and an increase in the peak characteristic of formaldehyde in infrared gas phase spectroscopy should be observed. The end of desorption is noted by a return to the initial state of mass 29 in mass spectroscopy and the characteristic peak of formaldehyde in infrared gas phase spectroscopy.

Still under activation flow, desorption was studied at different temperatures representative of conditions in dwellings or representative of conditions during thermal regeneration: 23° C., 25° C., 30° C., 35° C., 45° C., 50° C., 75° C., 100° C., 150° C., 200° C. The temperature ramps were 3° C./min. The sample was left at different temperatures for the time necessary for a return to equilibrium. Following the first reactivation, the MOF material was again saturated with formaldehyde and then placed under activation flow, which is this time loaded with 90% relative humidity. The second adsorption was used as a check.

5.2. Results

During the various operando studies, the different material parameters that explained formaldehyde adsorption were looked at, with the aim of subsequently looking for other potential adsorbents. Thus, a number of MOF samples were tested with various properties (cf. FIG. 1). Two commercial reference materials were also included in the study, as comparative examples: a Blue Air® brand activated carbon, and an activated carbon/acetoacetamide formulation from the Blooow® brand.

The results are illustrated in FIG. 10, in which «Al-3,5-PDA 1st» corresponds to the results obtained with the Al-3,5-PDA material of a first synthesis having a specific surface area BET of 980 $m^2$/g, while "Al-3,5-PDA optimized" corresponds to the results obtained after optimization of the synthesis, as detailed in Example 1.1 (BET of 1300 $m^2$/g).

The shade of the background color in FIG. 10 varies depending on the MOF hydrophobic/hydrophilic character. Lighter background denotes MOFs with hydrophobic character, while darker background denotes MOFs that are more hydrophilic.

Tables 1A-D (collectively "Table 1") present the different results obtained during the co-adsorption of formaldehyde and water under the conditions described above.

Table 1: Co-adsorbing formaldehyde and water under a flow of 20 cc/min composed of 20% $O_2$, 90% RH and 415 ppm formaldehyde at 23° C. (the leakage-free adsorption capacity corresponds to the amount of formaldehyde adsorbed by the sample during a 100% filtering action in formaldehyde).

TABLE 1A

|  | Al-3,5-PDA optimized | MIL-125(Ti)-$NH_2$ | DUT-67(Zr)-PZDC | Al-3,5-PDA 1st | UiO-66-$NH_2$ | MIL-100(Fe) | Basolite® A520/ MIL-53(Al)-FA | MIL-127(Fe) |
|---|---|---|---|---|---|---|---|---|
| leak-free adsorption capacity of formaldehyde (mmol/g) | 3.05 | 1.9 | 1.69 | 1.42 | 1.04 | 0.58 | 0.36 | 0.36 |
| maximum adsorption capacity of formaldehyde (mmol/g) | 4.96 | 3.54 | 2.76 | 2.90 | 1.88 | 3.37 | 1.62 | 2.41 |
| maximum adsorption capacity of water (mmol/g) | 25.95 | 15.23 | 31.8 | 14.07 | 11.26 | 10.34 | 17.58 | 15.96 |
| number of days of operation (day) | 50 | 36 | 28 | 29.56 | 19.20 | 34.38 | 16.49 | 24.57 |

TABLE 1B

|  | MIL-101(Cr) | Basolite® F-300/ Fe-BTC | MOF-808(Zr) | MIL-125(Ti) | UiO-66-COOH | MIL-160(Al) | UiO-66(Zr) | Basolite® A100/ MIL-53(Al) |
|---|---|---|---|---|---|---|---|---|
| leak-free adsorption capacity of formaldehyde (mmol/g) | 0.35 | 0.31 | 0.29 | 0.25 | 0.26 | 0.26 | 0.20 | 0.15 |
| maximum adsorption capacity of formaldehyde (mmol/g) | 2.52 | 1.17 | 1.18 | 1.27 | 0.97 | 0.79 | 0.94 | 1.13 |
| maximum adsorption capacity of water (mmol/g) | 37.03 | 13.53 | 11.40 | 14.4 | 11.33 | 17.20 | 7.56 | 9.35 |
| number of days of operation (day) | 25.69 | 11.93 | 12.03 | 13 | 9.89 | 8.09 | 9.54 | 11.54 |

TABLE 1C

|  | MIL-53(Al)-$NH_2$ | MIL-140B(Zr) | Activated carbon Blue Air® | Activated carbon Blooow® | Basolite® Z1200/ ZIF-8 |
|---|---|---|---|---|---|
| leak-free adsorption capacity of formaldehyde (mmol/g) | 0.09 | 0.02 | 0.00 | 0.00 | 0.00 |
| maximum adsorption capacity of formaldehyde (mmol/g) | 0.38 | 0.21 | 2.62 | 1.58 | 0.17 |
| maximum adsorption capacity of water (mmol/g) | 4.84 | 2.79 | 8.43 | 7.07 | 0.36 |
| number of days of operation (day) | 3.89 | 2.12 | 26.74 | 16.11 | 1.72 |

TABLE 1D

|  | UiO-66(Zr)-$2(CF_3)$ [a] | CAU-10(Al)-$NH_2$ | Activated carbon Dyson® |
|---|---|---|---|
| leak-free adsorption capacity of formaldehyde (mmol/g) | 0.00 | 0.40 | 0.00 |
| maximum adsorption capacity of formaldehyde (mmol/g) | 0.30 | 1.06 | 0.40 |
| maximum adsorption capacity of water (mmol/g) | 0.92 | 6.43 | 1.60 |
| number of days of operation (day) | 3.10 | 10.80 | 4.00 |

[a] The comparative MOF UiO-66(Zr)-2(CF$_3$) was prepared according to the protocol described in reference [39].

In general, the adsorption of formaldehyde is favoured by a high specific surface area and pore volume of the adsorbent with microporosity. Nevertheless, the chemical properties of the adsorbent surface are the most important parameters. This graph, in particular, makes it possible to make the link between the hydrophilicity of the various materials and their maximum formaldehyde adsorption capacities. The hydrophobic materials used, ZIF-8, UiO-66(Zr)-2(CF$_3$) and MIL-140B, are ineffective for the adsorption of formaldehyde, unlike more hydrophilic materials. This can be explained by the chemical properties and in particular the hydrophilic nature of formaldehyde. However, Table 1 reveals that it is not only the hydrophilicity that is at stake, as shown by the experiments carried out on MIL-160(Al), which is a very hydrophilic material and adsorbs a moderate quantity of formaldehyde.

The adsorption of formaldehyde is promoted by the presence of amine groups, the performance of the materials MIL-125(Ti)—NH$_2$, UiO-66(Zr)—NH$_2$ for the adsorption of formaldehyde is at least a factor two higher than their non-functionalized samples respectively MIL-125(Ti), UiO-66(Zr). In our study, MIL-53(Al)—NH$_2$ presents an exception because its formaldehyde adsorption capacity is lower than MIL-53(Al), this can be explained by the fact that amine groups tend to block the structure of the material in "very narrow pore" conformation or pores closed by the interactions between amine groups and the infinite chains [AlO$_6$]$_\infty$ of MIL-53(Al), which has the double effect of making the amine bond unavailable and making the structure narrower with insufficient pore size to accommodate formaldehyde within the pores. Because the amine groups in MIL-53(Al)—NH$_2$ bind to the MOF metal sites, MIL-53 (Al)—NH$_2$ is not suitable for reducing to practice the present invention. As such, this MOF is not considered to fall within the scope of the present invention.

The Lewis and Brønsted acid sites appear to have a major role. In Lewis' view, an acid is a species with an electron gap, which makes it likely to accept an electron doublet, in the case of MOFs they are unsaturated coordination sites (CUS: Coordinatively Unsaturated Site). In Brønsted's sense, an acid is a species capable of yielding a proton typically of hydroxyl groups in MOF structures. Lewis acid sites are generally obtained after thermal activation of the sample at high temperature (100-200° C.) since the residual water must be removed to make them accessible.

This Example reveals little difference between the maximum formaldehyde adsorption capacity between a thermally activated and non-thermally activated material. The relative humidity in the reaction flow is sufficiently high to transform back the Lewis acid sites generated during thermal regeneration of the sample into Brønsted acid sites. The Brønsted acid sites have a role in the adsorption of formaldehyde. More specifically, amine groups and free pyrazoles, i.e. groups not connected to the metal ions of the MOF framework, as in the case of the most efficient materials Al-3,5-PDA and DUT-67(Zr)-PZDC two materials with different structures but synthesized using the same ligand (pyrazole-3,5-dicarboxylic acid).

Table 2 summarizes the adsorption capacities of selected MOF samples, which show great promise, as compared to conventional filter materials (Activated carbons).

Leak-free adsorption corresponds to an adsorption in which no formaldehyde particles are detected at the outlet of the operando cell (100% filtering action in formaldehyde). This could occur via the filling of specific sites with a high affinity for formaldehyde, interaction with pyrazole groups in the case of Al-3,5-PDA and DUT-67(Zr)-PZDC MOFs. It should also be noted that MIL-101(Cr) has a very low leak-free adsorption compared to its counterparts due to the absence of specific sites, except for Lewis acid sites which are competitively consumed by water, its rather high maximum adsorption is due to its large specific surface area (>3000 m$^2$/g). In addition, activated carbons have zero leak-free adsorption.

Table 3 shows the release of formaldehyde by the various samples by gradually increasing the temperature from the ambient temperature. There is no release of formaldehyde near ambient temperatures regarding Al-3.5-PDA and DUT-67(Zr)-PZDC.

TABLE 3

Quantities of formaldehyde released in percentage by each tested material by increasing the temperature in 30-minute increments under a 20 cc/min flow composed of argon gas and 20% oxygen gas.

| T° C. | Al-3,5-PDA optimized | DUT-67(Zr)-PZDC | MIL-101(Cr) | Activated carbon Blooow ® (comparative) | Activated carbon Blue Air ® (comparative) |
|---|---|---|---|---|---|
| 23° C. | 0 | 0 | 11.23 | 16.79 | 8.79 |
| 30° C. | 0 | 0 | 20.93 | 14.95 | 9.43 |
| 35° C. | 0 | 0 | 36.90 | 12.86 | 11.80 |
| 40° C. | 0 | 5.44 | 20.10 | 8.88 | 14.22 |
| 45° C. | 0.25 | 1.7 | 5.31 | 6.40 | 14.84 |
| 50° C. | 4.05 | 2.38 | 2.07 | 5.08 | 13.58 |
| 75° C. | 3.44 | 11.9 | 3.46 | 9.94 | 24.31 |

TABLE 2

Co-adsorption of formaldehyde and water at 23° C., under the conditions of a flow of 20 cc/min composed of 20% O$_2$, 90% RH and 415 ppm formaldehyde. From left to right for each adsorbent tested: (i) leak-free adsorption capacity of formaldehyde, (ii) maximum adsorption capacity of formaldehyde, (iii) maximum adsorption capacity of water, (iv) number of days of operation. To determine the number of days of operation, the results of the maximum formaldehyde adsorption were extrapolated to the case when a 100 g filter is used, the device sweeping a polluted 100 m$^3$/h flow with a concentration of 0.1 ppm formaldehyde.

| | Al-3,5-PDA 1st | Al-3,5-PDA optimized | DUT-67(Zr)-PZDC | MIL-101(Cr) | Activated carbon Blooow ® (comparative) | Activated carbon Blue Air ® (comparative) |
|---|---|---|---|---|---|---|
| leak-free adsorption capacity of formaldehyde (mmol/g) | 1.42 | 3.05 | 1.69 | 0.35 | 0.00 | 0.00 |
| maximum adsorption capacity of formaldehyde (mmol/g) | 2.90 | 4.96 | 2.76 | 2.52 | 1.58 | 2.62 |
| maximum adsorption capacity of water (mmol/g) | 14.07 | 25.95 | 31.80 | 37.03 | 7.07 | 8.43 |
| number of days of operation (day) | 30 | 50 | 28 | 26 | 16 | 27 |

TABLE 3-continued

Quantities of formaldehyde released in percentage by each tested material by increasing the temperature in 30-minute increments under a 20 cc/min flow composed of argon gas and 20% oxygen gas.

| T° C. | Al-3,5-PDA optimized | DUT-67(Zr)-PZDC | MIL-101(Cr) | Activated carbon Blooow ® (comparative) | Activated carbon Blue Air ® (comparative) |
|---|---|---|---|---|---|
| 100° C. | 6.74 | 24.49 | 0.00 | 7.56 | 2.74 |
| 125° C. | 6.96 | 37.07 | 0.00 | 4.67 | 0.27 |
| 150° C. | 13.66 | 17.01 | 0.00 | 3.67 | 0.02 |
| 175° C. | 45.86 | 0.00 | 0.00 | 2.38 | 0.00 |
| 200° C. | 19.03 | 0.00 | 0.00 | 6.81 | 0.00 |

TABLE 4

Acetaldehyde adsorption at 23° C., under the conditions of a flow of 20 cc/min composed of 20% $O_2$, 0% RH and 700 ppm acetaldehyde. From left to right for each adsorbent tested: (i) leak-free adsorption capacity of acetaldehyde, (ii) maximum adsorption capacity of acetaldehyde, (iii) maximum adsorption capacity of water, (iv) number of days of operation with 100% efficiency in pollutant removal.

| Conditions: no water | Al-3,5-PDA 1st | MIL-100(Fe) (comparative) | MIL-127(Fe) (comparative) | Activated carbon Blue Air ® (comparative) |
|---|---|---|---|---|
| leak-free adsorption capacity of acetaldehyde (mmol/g) | 1.16 | 0.50 | 0.98 | 0.00 |
| maximum adsorption capacity of acetaldehyde (mmol/g) | 2.39 | 0.99 | 1.84 | 1.31 |
| maximum adsorption capacity of water (mmol/g) | 0.00 | 0.00 | 0.00 | 0.00 |
| number of days of operation (day) | 16.57 | 6.88 | 12.79 | 9.10 |

Additional adsorption studies were carried out by subjecting the various samples to a flow composed of different pollutants (acetaldehyde, formaldehyde and toluene). Table 5 shows the different results obtained. Formaldehyde and acetaldehyde adsorption is preferential compared to toluene, formaldehyde being the most selectively adsorbed. We observe a decrease in formaldehyde adsorption performance probably caused by a very partial blocking of surface porosity by toluene, this effect being much more pronounced in the case of activated carbon whose total formaldehyde adsorption capacity is divided by 4 compared to the case of formaldehyde and water adsorption only. The results show that Al-3,5-PDA has very specific capture efficiency for formaldehyde thanks to the chemisorption process described in Example 7.

TABLE 5

Co-adsorption in the case of a mixture of pollutants. Flow rate of 20 cc/min composed of oxygen at 20% with 452 ppm formaldehyde, 300 ppm acetaldehyde, 300 ppm toluene and 70% relative humidity.

| | Al-3,5-PDA | DUT-67(Zr)-PZDC | UiO-66 (Zr)-$NH_2$ (comparative) | MIL-125(Ti) | MIL-160(Al) | Activated carbon Blue Air ® (comparative) |
|---|---|---|---|---|---|---|
| leak-free adsorption capacity of formaldehyde (mmol/g) | 1.29 | 0.91 | 0.55 | 0.45 | 0.00 | 0.00 |
| maximum adsorption capacity of formaldehyde (mmol/g) | 2.24 | 1.41 | 1.16 | 1.48 | 1.03 | 0.60 |
| maximum adsorption capacity of water (mmol/g) | 5.34 | 11.13 | 5.21 | 4.61 | 8.18 | 1.21 |
| maximum adsorption capacity of acetaldehyde (mmol/g) | 0.00 | 0.00 | 0.04 | 0.13 | 0.04 | 0.07 |
| maximum adsorption capacity of toluene (mmol/g) | 0.27 | 0.07 | 0.06 | 0.09 | 0.04 | 0.32 |

In Situ IR Analyses

Figure 11:
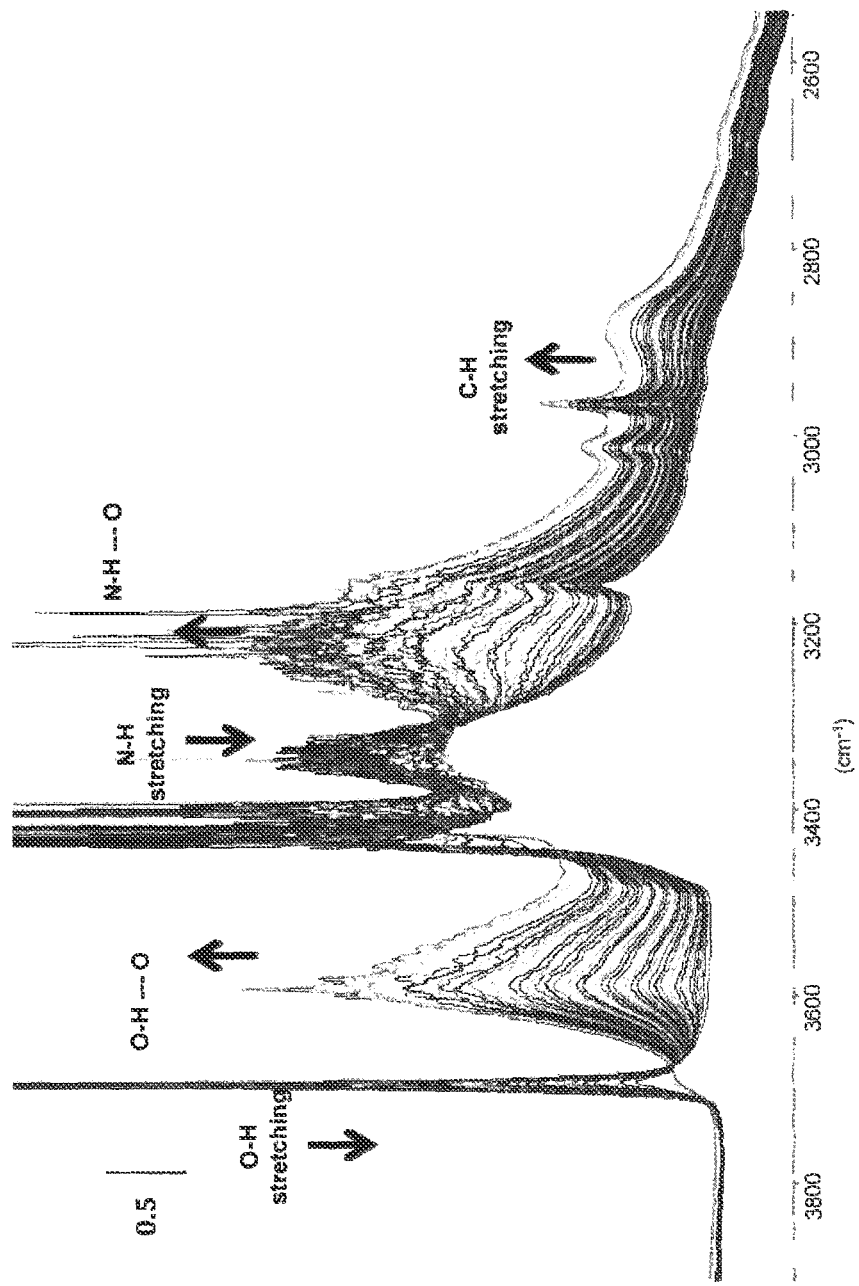
FIG. 11: shows FT-IR spectra obtained during the adsorption of formaldehyde doses on Al-3,5-PDA (the upper part of the spectra is cut off; this corresponds to the saturation of the MCT detector (Mercury-Cadmium-Telluride)). Each spectrum corresponds to an adsorbed molar amount of formaldehyde, including, from bottom to top: 0.001 mmol/g, 0.020 mmol/g, 0.03 mmol/g, 0.04 mmol/g, 0.058 mmol/g, 0.075 mmol/g, 0.093 mmol/g, 0.110 mmol/g, 0.132 mmol/g, 0.153 mmol/g, 0,174 mmol/g, 0.196 mmol/g, 0.217 mmol/g, 0.252 mmol/g, 0.287 mmol/g, 0.322 mmol/g, 0.357 mmol/g, 0.391 mmol/g, 0.425 mmol/g, 0.459 mmol/g, 0,492 mmol/g, 0.526 mmol/g, 0.558 mmol/g, 0.604 mmol/g, 0.649 mmol/g, 0.693 mmol/g, 0.737 mmol/g, 0.780 mmol/g, 0.824 mmol/g, 0.867 mmol/g, 0,909 mmol/g, 0.951 mmol/g, 0.993 mmol/g, 1.04 mmol/g, 1.09 mmol/g, 1.13 mmol/g, 1.19 mmol/g, 1.233 mmol/g, 1.28 mmol/g, 1.32 mmol/g, 1.37 mmol/g. (all being normalized to the mass of the Al-3,5-PDA pellet).
Figure 12A:
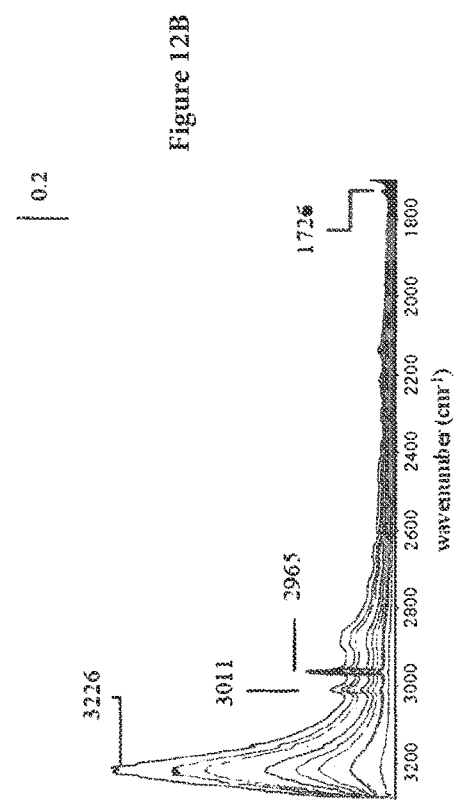
FIGS. 12A-E: shows a background subtracted FT-IR spectra obtained during the adsorption of formaldehyde on Al-3.5-PDA. 12a) in the range from 3675 to 3460 $cm^{-1}$, 12b) from 3292 to 1700 $cm^{-1}$ 12c) from 1320 to 1200 $cm^{-1}$, 12d) from 1150 to 1064 $cm^{-1}$, 12e) from 3773 to 2730 $cm^{-1}$.
Figure 12B:
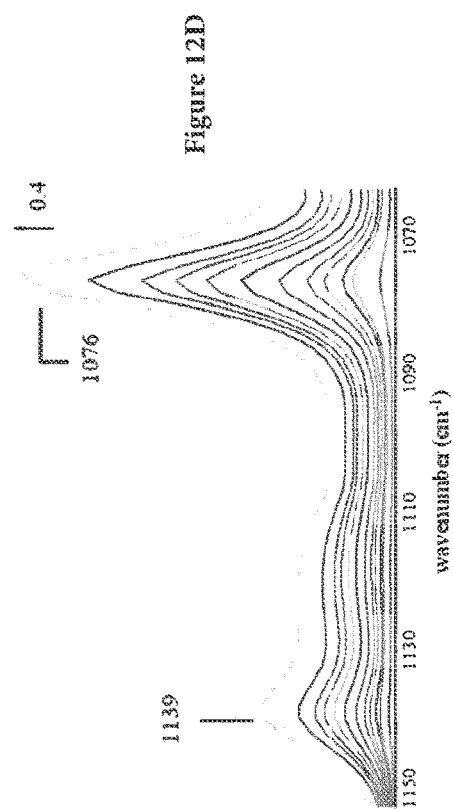
Figure 12C:
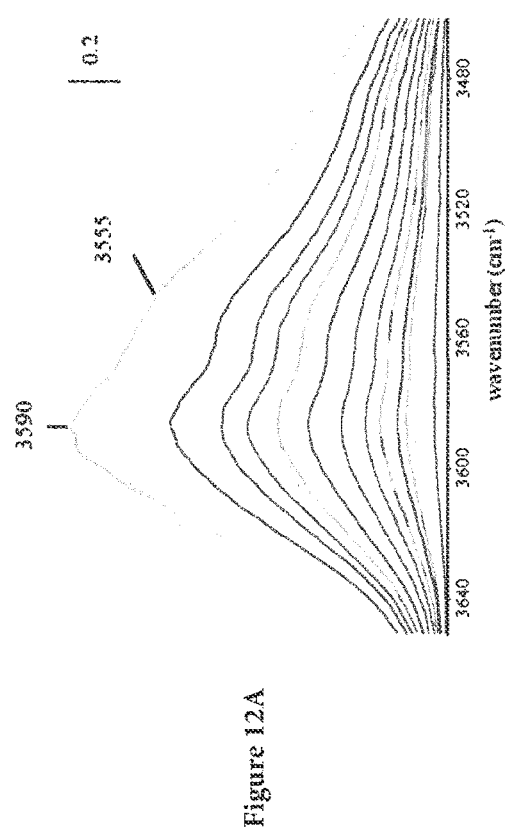
Figure 12D:
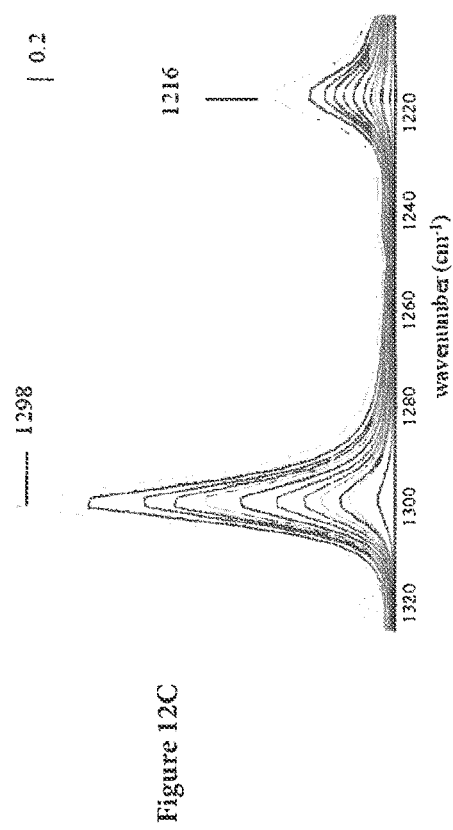
Figure 12E:
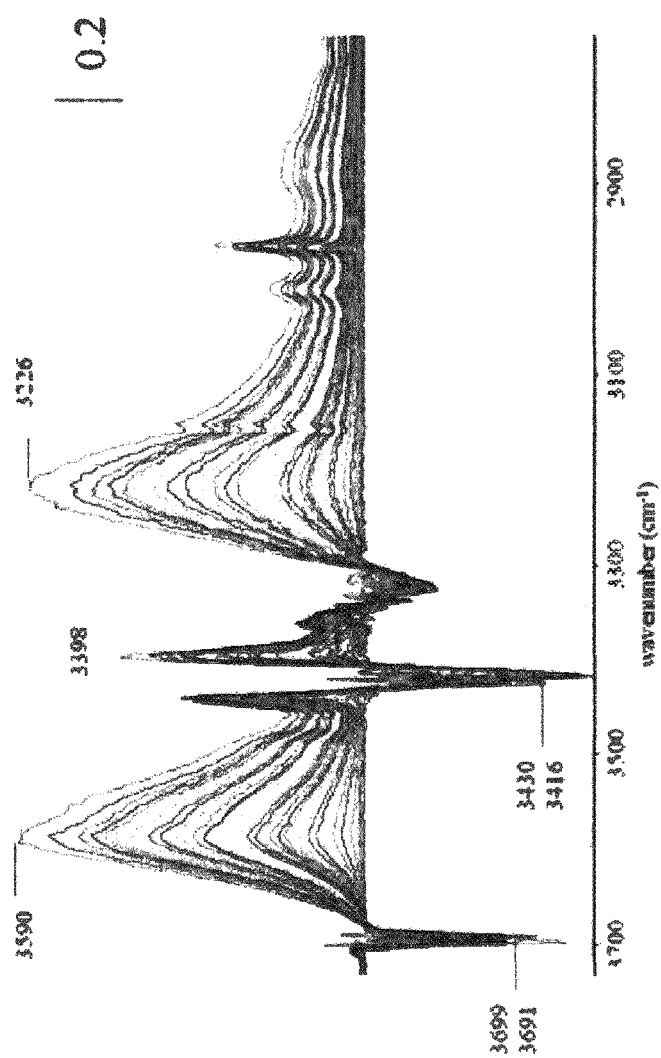

In situ IR analyses were carried out to assess the mode of absorption/adsorption of formaldehyde in porous solids, and in particular in Al-3,5-PDA, which is the most efficient. (cf. FIG. 11) When doses of formaldehyde are adsorbed onto the Al-3,5-PDA solid, the N—H and O—H bands of elongation vibration of the solid in the domains of 3368-3295 and 3724-3661 $cm^{-1}$ respectively gradually disappear, to the benefit of the creation of hydrogen bonds in the respective domains of 3295-3041 and 3659-3455 $cm^{-1}$ (FIG. 1). This may indicate an adsorption of the molecule via oxygen on the hydroxyl and amine protons of the ligand, and via hydrogen atoms on the electron free doublet of ligand nitrogen.

Example 6—MOF Regeneration by Water Washing

In order to test a new type of regeneration by immersion in water, formaldehyde adsorption and then regeneration by washing cycles were carried out. Formaldehyde adsorption was carried out as described in the previous protocol, with the exception of thermal reactivation. Instead, the MOF pellets were placed in a flask containing 100 mL of distilled water stirred at room temperature for one night. After this operation the solids were recovered in powder form, filtered on Büchner and dried at room temperature and pelletized again (shaped into pellets) to undergo formaldehyde adsorption. This step was repeated a second time.

Table 6 shows the comparative quantities of formaldehyde adsorbed by the Al-3,5-PDA material prepared in Example 1.1 and the activated carbon of Blue Air® during the saturation/wash cycles in water. The regeneration of samples after adsorption of formaldehyde by immersion in water may be explained by the solubility of formaldehyde in water. However, after the second wash, the formaldehyde adsorption capacity decreases by about 14% and 20% in the case of Al-3,5-PDA and activated carbon respectively. These values fall within the margin of error of the experimental results of +/−10%, however the adsorption capacities have a decreasing tendency, which could mean that the material is not completely regenerated. However, the MOF material performance in formaldehyde capture remains fundamentally intact and superior to references. Additional washing tests were carried out on 75 mg of Al-3,5-PDA with 2% PVB, using the following regeneration protocol: quenched in 500 mL of hot water (50° C.) during 3 hours then rinsed with 2 liters of hot water (50° C. No noticeable change in adsorption capacity (leak-free and maximum adsorption capacity of formaldehyde) was observed over 5 adsorption/regeneration cycles. This can be explained by the increase of the amount of sample used which does decrease the error on the measurements. Also the solubility of formaldehyde increases in hot water.

TABLE 6

Quantities of formaldehyde adsorbed during different adsorption/regeneration cycles by immersion in water.

|  | initial adsorption of formaldehyde (mmol/g) | adsorption of formaldehyde after the 1st wash (mmol/g) | adsorption of formaldehyde after the 2nd wash (mmol/g) |
|---|---|---|---|
| Al-3,5-PDA 1st | 3.36 | 3.25 | 2.88 |
| Activated carbon Blue Air ® (comparative) | 1.94 | 1.84 | 1.55 |

"Real-Life" Test with Air Filter

Full-scale tests were carried out. The analysis system comprised a test section, an injector controlled in ODC (opening duty cycle, "RCO" in French, for "rapport cyclique d'ouverture") allowing the injection of the pollutant previously placed in a hermetic container in liquid form. The latter was placed under a pressure of 3 bar, the lines connecting the test section and the container containing the pollutant were heated to 100° C. The gaseous pollutant was sent to a test section to achieve a stable operating flow rate and gas composition. The polluted air flow was successively brought into contact with different filters, the dimensions of which were 17×16.3 cm². The concentrations of the various pollutants at the output of the system were measured by Fourier Transform infrared spectroscopy and resolved over time.

The full-scale experiments are carried out as follows:

A pre-adsorption of toluene and xylene was carried out over a period of 15 minutes, then after changing the liquid in the sealed chamber the adsorption of formaldehyde and acetaldehyde was carried out for 15 minutes. The adsorbent material was then placed in water for the regeneration step, after which time it was placed again under a flow of toluene and xylene, then aldehydes, then in water and so on until results were obtained after a third wash. The concentrations used are summarized in the following table:

The full-scale experiments suggest that the Blue Air® activated carbon filter is deactivated after the first adsorption of aromatics (toluene and xylene). After being saturated with toluene and xylene, the activated carbon is no longer able to adsorb other VOCs or to be regenerated by immersion in water (Tables 8 and 9). On the other hand, the filter with Al-3,5-PDA does not adsorb aromatics, would preferentially adsorb formaldehyde from the formaldehyde and acetaldehyde mixture and seems to regenerate by immersion in water. The affinity of activated carbon for hydrophobic molecules such as aromatics may explain this behaviour. In addition, the adsorbed aromatics will probably tend to accentuate the hydrophobicity of the system and thus prevent the diffusion of water into the porosity, which probably prevents regeneration.

TABLE 8

Quantities of toluene and xylene adsorbed on an activated carbon filter and an Al-3,5-PDA filter, after "full-scale" adsorption and washing by immersion in water.

|  | initial adsorption (mmol/g) | adsorption after the 1st wash (mmol/g) | adsorption after the 2nd wash (mmol/g) | adsorption after the 3rd wash (mmol/g) |
|---|---|---|---|---|
| Activated carbon filter Blue Air ® adsorption of toluene (comparative) | 1.60 | 0.00 | 0.00 | 0.00 |
| Activated carbon filter Blue Air ® adsorption of xylene (comparative) | 0.46 | 0.00 | 0.00 | 0.00 |
| Al-3,5-PDA filter adsorption of toluene | 0.00 | 0.00 | 0.00 | 0.00 |
| Al-3,5-PDA filter adsorption of xylene | 0.00 | 0.00 | 0.00 | 0.00 |

TABLE 9

Quantities of formaldehyde adsorbed on an activated carbon filter and an Al-3,5-PDA filter, after "full-scale" adsorption and washing by immersion in water.

|  | initial adsorption (mmol/g) | adsorption after the 1st wash (mmol/g) | adsorption after the 2nd wash (mmol/g) | adsorption after the 3rd wash (mmol/g) |
|---|---|---|---|---|
| Activated carbon filter Blue Air ® adsorption of formaldehyde (comparative) | 0.00 | 0.00 | 0.00 | 0.00 |
| Al-3,5-pda filter adsorption of formaldehyde | 0.13 | 0.20 | 0.30 | 0.26 |

TABLE 7

| Total flow ($m^3/h$) | Formaldehyde Concentration (ppm) | Acetaldehyde Concentration (ppm) | Toluene Concentration (ppm) | o-Xylene Concentration (ppm) | p-Xylene Concentration (ppm) | Relative Humidity (%) | Temperature (° C.) |
|---|---|---|---|---|---|---|---|
| 50 | 200 | 100 | 550 | 90 | 130 | 32 | 23 |

Example 7

7.1 Introduction

The aim of the following example is to investigate and understand the interaction modes occurring during adsorption of gaseous formaldehyde on a pyrazolate based Metal-organic frameworks, where the embedded basic groups (—HN or —N) groups are accessible.

The results below demonstrate that the adsorption of formaldehyde is occurring via chemisorption of formaldehyde. Host-guest interaction takes place trough the formation of a covalent bond between pyrazolate linker and formaldehyde; with a further stabilization via hydrogen bond, resulting in the formation of stable oxy-methyl species. Same type of interactions takes place in the case of the two MOFs that bear free accessible pyrazole groups within their pores, i.e. Al-3.5-PDA and DUT-67(Zr)-PZDC, and with imidazole species (ligand only, no MOF so far). Desorption energy, characterizing that type of interactions was estimated using Redhead method [42], and found to be in range of 86 kJ/mol, offering a sufficient stability to provide low release of formaldehyde under humid air. This is a significant improving step as compared to amino-aromatic metal carboxylate MOFs such as UiO-66(Zr)—$NH_2$/MIL-125(Ti)—$NH_2$/MIL-101(Cr)-ED, which tend to release some formaldehyde at close-to ambient temperatures due to the formation of some instable adsorbed species, and in the case of MIL-101(Cr)-ED, to be degraded by moisture.

Moreover, it is also shown that the material can be regenerated at room temperature in aqueous phase, due to the complete reversibility of the interaction in the presence of liquid water while maintaining the MOF structure and active sites.

7.2 Spectroscopic Characterization

Samples were pressed ($10^2$ MPa) into self-supported disks (2 $cm^2$ area) and placed in a quartz homemade in-situ cell equipped with KBr windows for FTIR measurements during formaldehyde adsorption. A movable quartz sample holder allows adjusting the pellet in the infrared beam for spectra acquisition and displacing it into a heater at the top of the cell for thermal treatments. The cell was connected to a vacuum line for evacuation, calcination steps ($P_{residual}=10^{-6}$-$10^{-9}$ bar) and for the introduction of formaldehyde into the infrared cell.

Gaseous formaldehyde was obtained by thermal depolymerization of paraformaldehyde in a quartz reactor by using a heat-gun at 70° C.

Formaldehyde was adsorbed at room temperature and the pressure of formaldehyde inside the FTIR cell was measured by a pressure gauge ($10^{-4}$-$10^{-1}$ bar range). Transmission FTIR spectra were recorded after introduction of formaldehyde in the 400-5500 $cm^{-1}$ range, at 4 $cm^{-1}$ resolution, 64 scans, on a Nicolet Nexus spectrometer equipped with an extended KBr beam splitter and a deuterated triglycine sulfate detector (DTGS).

7.3 Results and Discussion a) Interaction Between Formaldehyde and Al-3.5-PDA Upon Adsorption The full FTIR spectrum of the Al-3.5-PDA shows two bands at 3699-3691 $cm^{-1}$ which corresponds to the O—H stretching modes of $\mu_2$-OH hydroxyl groups of inorganic infinite chains of the framework, a band at 3424 $cm^{-1}$ which corresponds to the N—H stretching modes of pyrazole linker, while the C—H stretching mode of pyrazole linker is present at 3153 $cm^{-1}$, in agreement with theoretical and experimental studies of pyrazole derivates.

Formaldehyde adsorption on Al-3.5-PDA was performed at room temperature, by sending small doses of formaldehyde. The FTIR spectra recorded after each dose are presented in FIG. 12. By considering main bands formed, it was possible to characterize the transformation of formaldehyde upon adsorption, which results in the formation of a primary alcohol.

That is characterized by the gradual appearance of the band at 1076 $cm^{-1}$, which is assigned to a $v$(C—O) mode [FIG. 12.d)]. Bands at 1298 $cm^{-1}$ are assigned to O—H deformation mode and $CH_2$ wagging [FIG. 12.c)]. The band at 1216 $cm^{-1}$ is assigned to O—H bending in plan vibration, and that at 1139 $cm^{-1}$ is assigned to CH rocking [FIG. 12.c) and FIG. 12.d)]. These bands are characteristic of a primary alcohol formed upon chemisorption of formaldehyde and subsequent opening of its C=O double bond. This clearly demonstrates the interaction between the internal pores of Al-3.5-PDA and the carbon of formaldehyde through the creation of a covalent bond.

In addition, the adsorbed formaldehyde interacts by hydrogen bond with $\mu_2$-OH hydroxyl groups of Al-3.5-PDA. This is shown [FIGS. 12a) and 12e)] by the progressive decline of the band at 3694 $cm^{-1}$ with the increase of formaldehyde equilibrium pressure, the appearance of an isosbestic point at 3673 $cm^{-1}$, and the appearance of a new complex broad band between 3640 and 3480 $cm^{-1}$, which corresponds to a typical hydrogen OH—O bond.

There is a second hydrogen-bonded compound formed between formaldehyde and the N—H group of pyrazole carboxylate linker, as it is main shown [FIG. 12.b) 12.e)] by a progressive decline of bands at 3425, 3417 and 3336 $cm^{-1}$, the appearance of an isosbestic point at 3301 $cm^{-1}$ and the appearance of a complex broad band between 3289 and 3034 $cm^{-1}$, which corresponds to the N—HO hydrogen bond (3226 and 3153 $cm^{-1}$) formation through the lone pair of oxygen from formaldehyde.

Bands at 3031-2965 $cm^{-1}$ [FIG. 12.b)] might be assigned to —CH modes of chemisorbed formaldehyde (i.e. to the so formed methanol group).

Without wishing to be bound by any particular theory, it is believed that the reaction between pyrazole linker and formaldehyde takes place through the lone pair of the imine nitrogen, reacting on the carbon of formaldehyde and forming a covalent bond, followed by the loss of proton from the other nitrogen, forming pyrazole-1-yl-methanol (also known as 1-oxymethyl pyrazole). The so-formed oxymethyl group is stabilized through hydrogen bonding occurring between the O—H groups from the formed oxymethyl and oxygen from $\mu_2$-OH hydroxyl groups of inorganic infinite chains of the framework and through the hydrogen bonding OH—N between the hydrogen from oxymethyl [FIG. 13a)] and the remaining nitrogen from pyrazolate linker [FIG. 13 b)].

b) Interaction Between Formaldehyde and DUT-67(Zr)-PZDC Upon Adsorption

It has been observed that these interactions are not only limited to Al-3.5-PDA. Indeed same kind of interactions takes place upon formaldehyde adsorption with the porous Zr pyrazole carboxylate MOF denoted DUT-67(Zr)-PZDC (made with the same linker as AL-3.5-PDA (ie) 3.5 pyrazoledicarboxylic acid).

The formation of oxymethyl group is mainly shown [FIG. 14b) and c)], by the appearance of bands at 1131, 1076, 1280 and 1202 $cm^{-1}$ assigned respectively to (i) CH rocking; (ii) $v$(C—O) mode; (iii) O—H deformation mode and $CH_2$ waging; (vi) O—H bending in plan vibration, the stabilization of the formed oxymethyl group on —OH/—NH groups, shown [FIG. 14.a)] is shown by a progressive decline of characteristic bands of Brøndsted acid sites —OH at 3669, 3654 cm$^{-1}$ and basic groups —NH at 3463 cm$^{-1}$ respectively, the appearance of isosbestic points at 3633 and 3433 cm$^{-1}$ and the formation of broad bands at 3523 and 3336 cm$^{-1}$.

c) Regeneration of Al-3.5-PDA at Room Temperature in Water Solution

Figure 15:
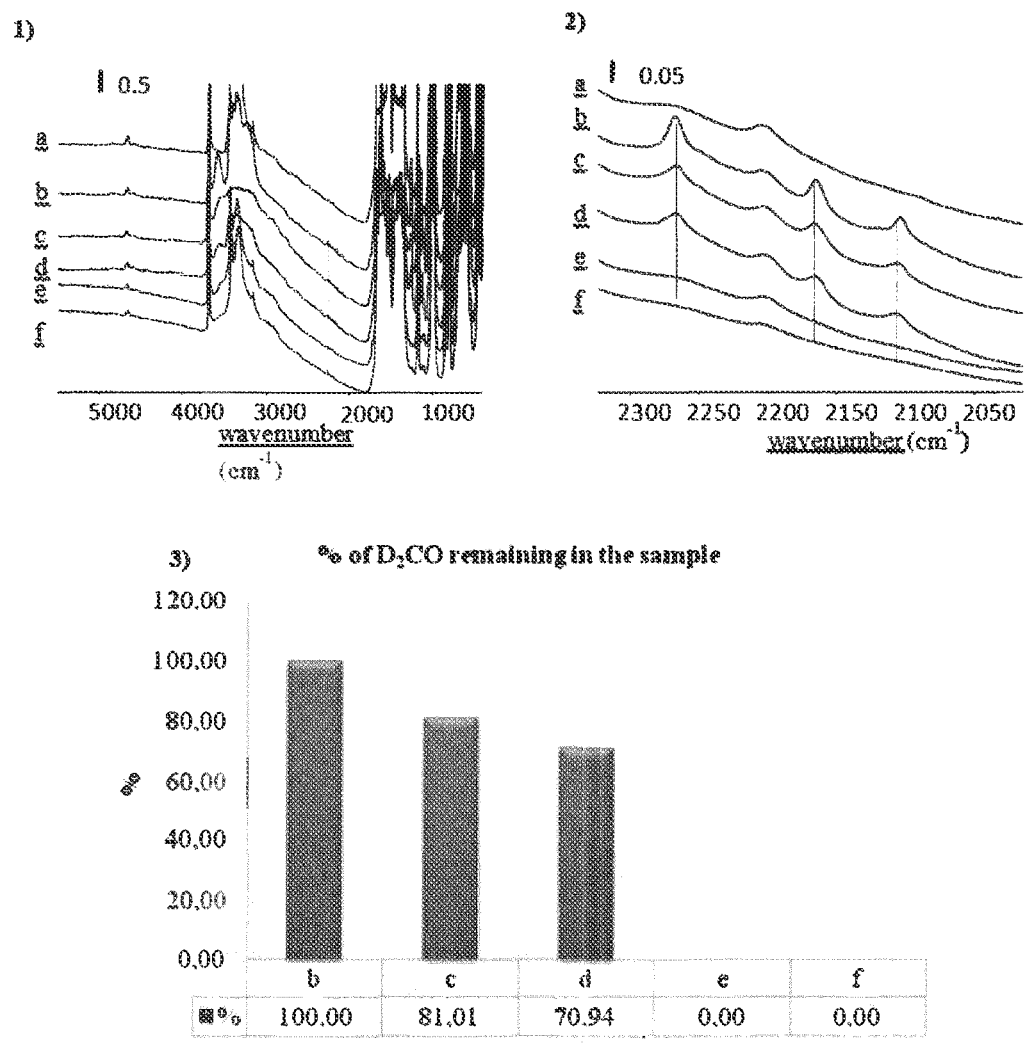
FIG. 15: shows the regeneration in water solution after $D_2CO$ (labeled formaldehyde) adsorption (Al-3.5-PDA): 1) FT-IR spectra in the spectral range of 4000-500 $cm^{-1}$. 2) FT-IR spectra in the spectral range of 2300-2050 $cm^{-1}$ 3) % of $D_2CO$ present in the sample a) FT-IR-spectra obtained after thermal treatment of Al-3,5-PDA. b) IR spectra obtained after saturation with $D_2CO$ c) FT-IR-spectra obtained after rinsing the sample with 100 mL of water. d) FT-IR-spectra obtained after cumulative rinsing of the sample with 100 mL of water. e) FT-IR-spectra obtained after quenching the sample in 100 mL of water during 3 h. f) FT-IR-spectra obtained after quenching the sample in 100 mL of water during 3 h. All steps are cumulative and were performed at room temperature (23° C.). 3) Percentage of formaldehyde remaining in the sample after each treatment, respect to the initial concentration after saturation. After e) and f) treatments the sample is totally free from formaldehyde.

The regeneration of the material upon formaldehyde adsorption was accomplished by placing the pellet of 20 mg of Al-3.5-PDA after saturation with deuterated formaldehyde in a beaker, slowly filled with 100 mL distilled water and left for 3 hours at room temperature. Finally the material was replaced in the FTIR cell and placed under secondary vacuum to remove residual water. FIG. 15 is showing FTIR spectra obtained at various steps upon regeneration, precisely the absence of characteristics pics of chemisorbed deuterated formaldehyde v(CD) (at 2300-2050 cm$^{-1}$) in the porosity, fully regeneration of $\mu_2$—OH groups and NH groups after cumulative quenching and rinsing of the sample in 100 mL of water at room temperature.

This is indicating a successful regeneration of the material at room temperature in aqueous phase. Chemisorption of formaldehyde is reversible and the material is fully regenerated at room temperature.

Applying a mechanical washing in water or specific solvent can totally or partially regenerate the material after adsorption of pollutants at R.T. even though main interaction are occurring through covalent bonding.

Figure 16:
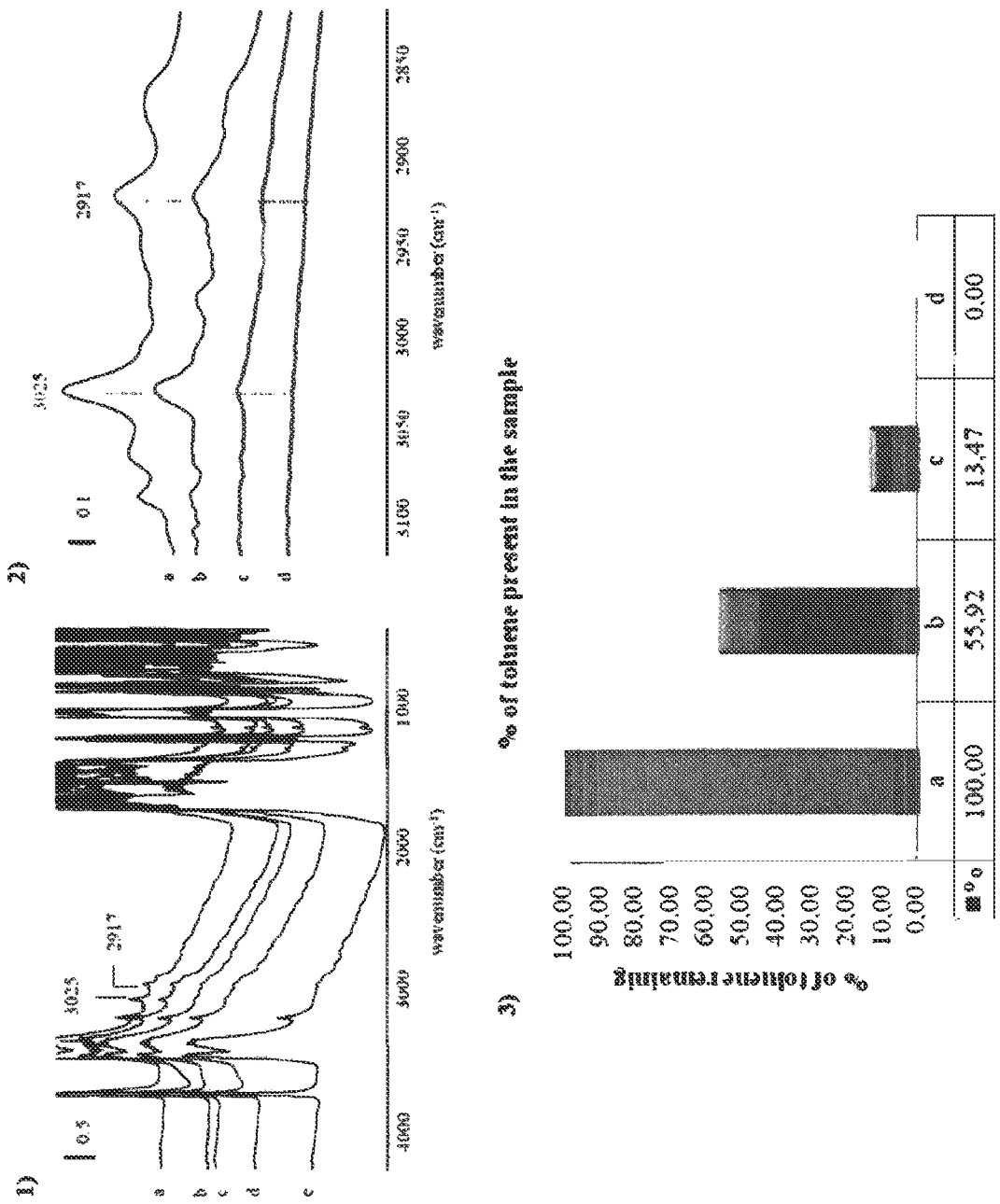
FIG. 16: shows the regeneration in EtOH solution after toluene adsorption (Al-3.5-PDA): 1) FT-IR spectra in the spectral range of 4000-500 $cm^{-1}$. 2) FT-IR spectra in the spectral range of 3100-2850 $cm^{-1}$. 3) % of toluene present in the sample. a) FT-IR spectra obtained after saturation with toluene (equilibrium pressure of 8 mbar) b) FT-IR-spectra obtained after rinsing the sample with few drops of EtOH. c) FT-IR-spectra obtained after rinsing the sample with 100 mL EtOH. d) FT-IR-spectra obtained after quenching the sample in 100 mL of EtOH during 3 h. All steps are cumulative and were performed at room temperature (23° C.). 3) Percentage of toluene remaining in the sample after each treatment, respect to the initial concentration after saturation. After d) treatment the sample is totally free from toluene.
Figure 17:
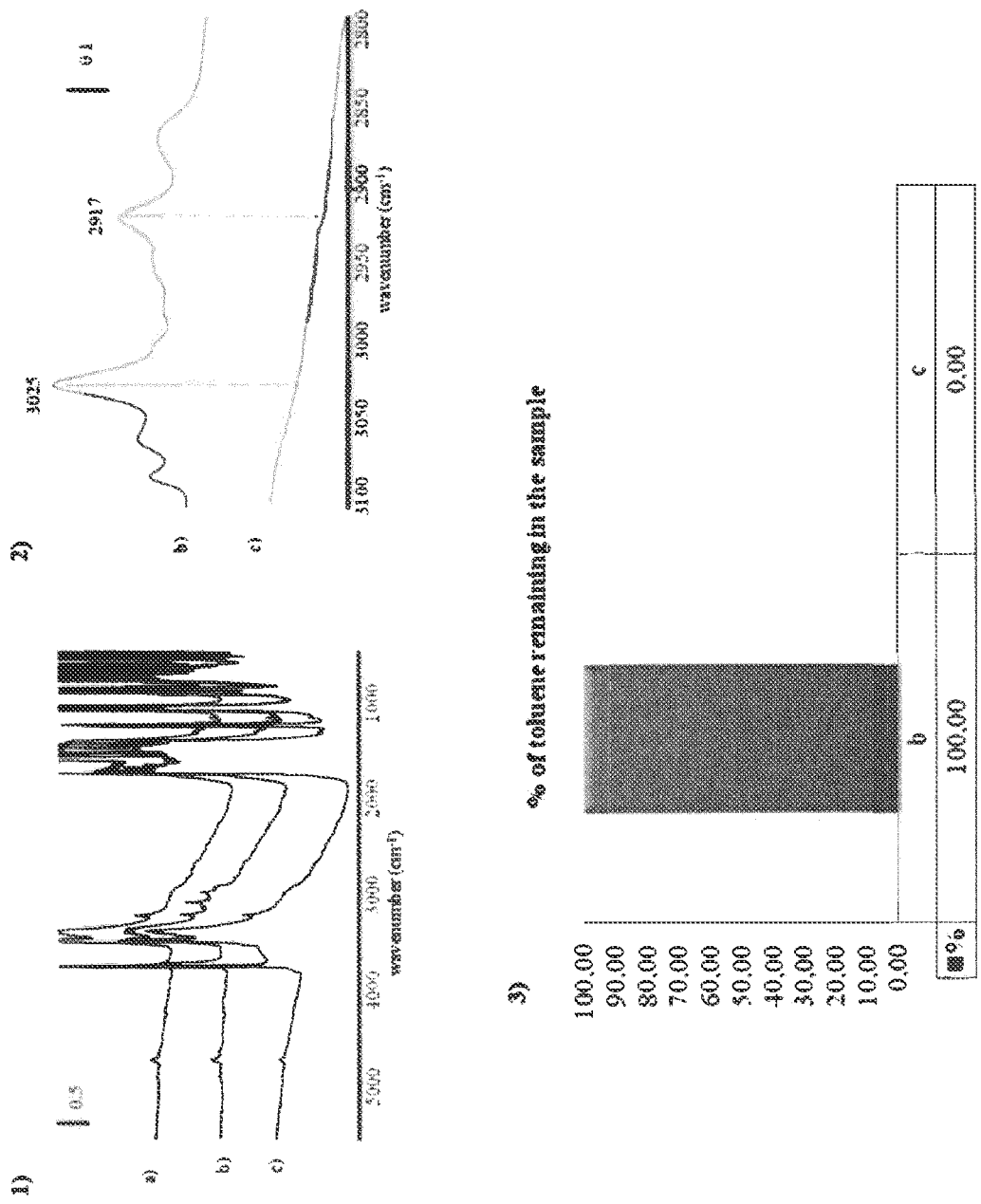
FIG. 17: shows the regeneration in water solution after toluene adsorption (Al-3.5-PDA): 1) FT-IR spectra in the spectral range of 4000-500 $cm^{-1}$. 2) FT-IR spectra in the spectral range of 3100-2800 $cm^{-1}$. 3) % of toluene present in the sample. a) IR spectra obtained after thermal activation of Al-3.5-PDA at 200° C. 1 h b) FT-IR-spectra obtained after saturation with toluene at equilibrium pressure of 8 mbar. c) FT-IR-spectra obtained after quenching the sample in 100 mL of water during 3 h. All steps are cumulative and were performed at room temperature (23° C.).

The material can be regenerated even after the adsorption of some gaseous toluene (at an equilibrium pressure of 8 mbar). It is shown FIG. 16-17, the complete disappearance of characteristic pics of adsorbed toluene (v(C—H) at 3025 and 2917 cm$^{-1}$) after quenching the sample in water (also mixed with EtOH) indicates a successful regeneration at room temperature.

d) Interaction Between Formaldehyde and UIO-66(Zr)—NH$_2$ (Comparative Example Provided for Reference Purpose Only)

Figure 18:
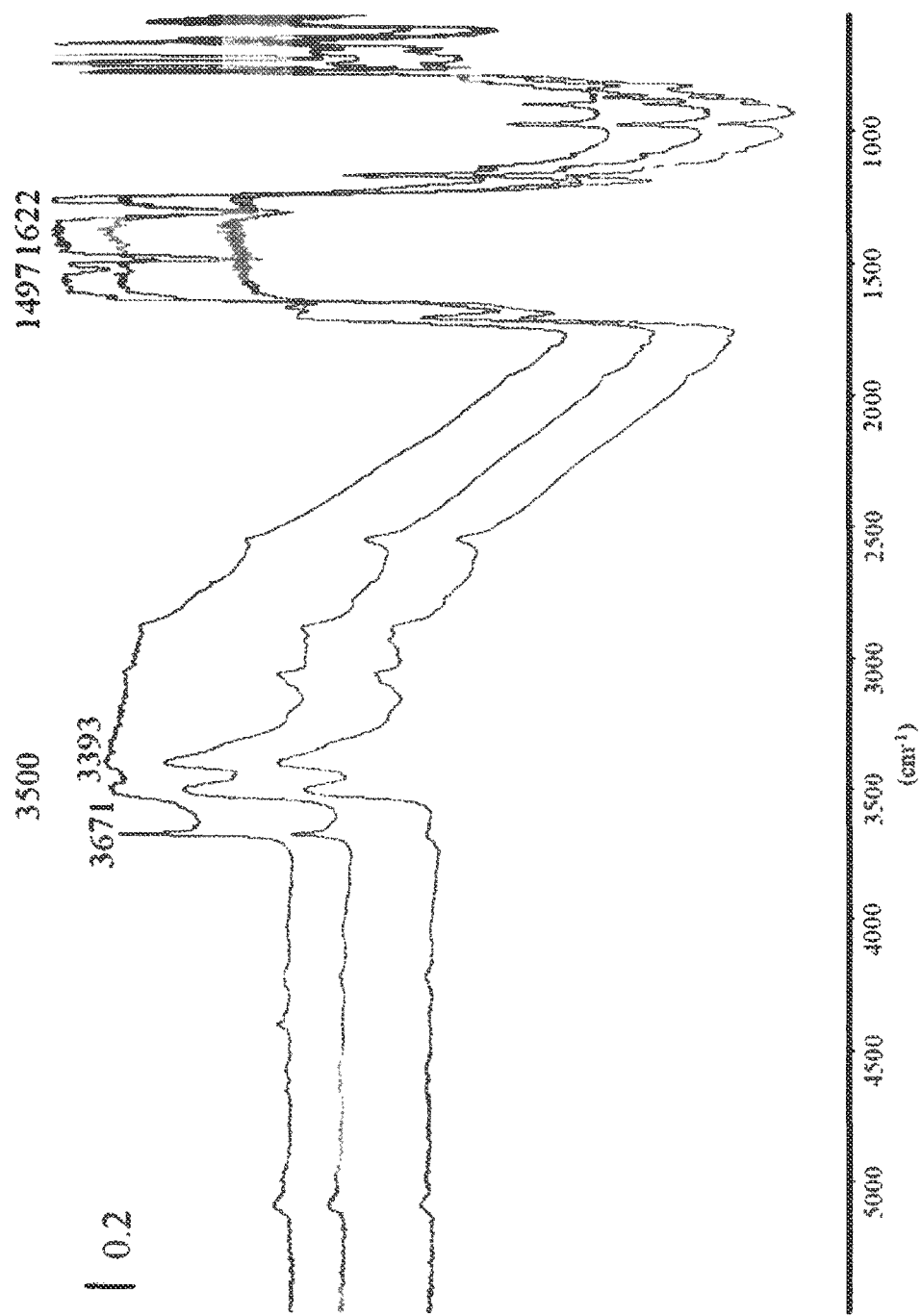
FIG. 18: shows the FT-IR spectra recorded upon thermal activation of UiO-66-$NH_2$. From top to bottom, FTIR spectra recorded at RT, at 100° C. at 200° C.
Figures 21A, 21B:
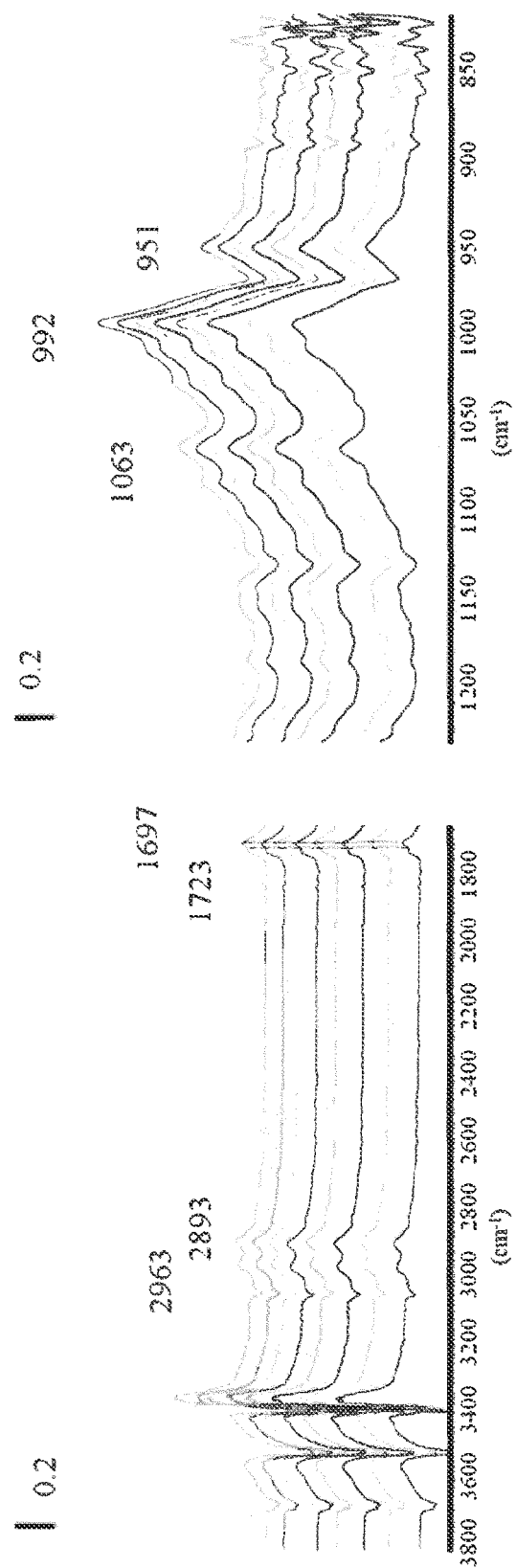
FIGS. 21A and 21B: shows the adsorption of formaldehyde on MIL-125(Ti)—$NH_2$. 21a) Background subtracted FT-IR spectra recorded upon formaldehyde adsorption on MIL-125(Ti)—$NH_2$ in the spectral region of 3800-1600 $cm^{-1}$; 21b) background subtracted FTIR spectra recorded upon formaldehyde adsorption on MIL-125(Ti)—$NH_2$ in the spectral region of 1200-850 $cm^{-1}$.

FTIR spectra of UiO-66(Zr)—NH$_2$ during some activation steps can be found FIG. 18), where the weak band at 5250 cm$^{-1}$ is characteristic of molecular H$_2$O (v+δ(OH)). Bands at 3671 cm$^{-1}$ are assigned to the v(OH) stretching modes of $\mu_3$-OH hydroxyl groups. Bands at 3500-3393 cm$^{-1}$ correspond to v$_{as}$(NH$_2$) and v$_s$(NH$_2$) stretching frequencies of amino groups; bands at 3100-2800 cm$^{-1}$ correspond to some C—H modes; v(COO$^-$) stretching frequencies characteristic of structural carboxylic acid are visible at 1497 and 1622 cm$^{-1}$; bands at 1337 and 1258 cm$^{-1}$ are attributed to v(C—N) modes.

FTIR spectra obtained upon formaldehyde adsorption on UiO-66(Zr)—NH$_2$ sample can be found FIG. 19. During adsorption of formaldehyde there is a progressive decline of bands at 3502 and 3388 cm$^{-1}$, due to v$_{as}$(N—H) and v$_s$(N—H) modes characteristic of the amino linker present in the structure, which suggests that amino groups are bonded to formaldehyde, by covalent (as suggested in the literature) or hydrogen bond. There is an appearance of a feature at 1745 cm$^{-1}$ (a carbonyl stretching frequency) in range with the position of v(C=O) from gaseous formaldehyde, suggesting that some formaldehyde might be physisorbed or weakly H— bonded. Some features are visible at 1724 and 1683 cm$^{-1}$, due to the complex nature of these bands (and mainly because they have a positive/negative nature) the interpretation is difficult and ambiguous. The positive/negative shape of these bands suggests that they could be due to some minor structural changes. The band at 1724 cm$^{-1}$ is in the range of stretching frequency of carbonyl compounds and could be due to some formaldehyde molecularly interacting through the lone pair of electrons. Chemisorbed formaldehyde, via the coordination bond on Lewis acid sites, is characterized by a stretching vibration at around 1620 cm$^{-1}$, with corresponding CH stretching vibrations near 2870 and 2770 cm$^{-1}$ (similar to gaseous formaldehyde) (6), therefore the observed band at 1683 cm$^{-1}$ is more likely due to some v(C=O) stretching frequency of adsorbed formaldehyde on Zr$^{4+}$ Lewis acid sites or due to some structural changes.

Some intense features are visible at 1103, 1000 and 942 cm$^{-1}$. This is indicating the presence of some poly(oxymethylene) species in the porosity, indicating that formaldehyde polymerize inside the porosity upon formaldehyde adsorption. This is mainly shown during thermal activation, when the difference between FTIR spectrum at 50° C. and the one taken after saturation reveals the departure of poly(oxymethylene) species characterized by some strong bands at 1110 cm$^{-1}$ and a superimposed band at about 927 cm$^{-1}$ (see FIG. 20).

FTIR spectra obtained upon thermal regeneration of UiO-66-NH$_2$ can be found FIG. 19.c); interestingly it can be seen that the shape of bands at 3502-3388 cm$^{-1}$ doesn't go back to its original state (dashed black spectra, taken before the adsorption of formaldehyde), indicating that after a thermal treatment at 250° C. amino groups of the material are not fully regenerated.

These results illustrate why amino-aromatic MOF materials (i.e., MOF materials with aromatic ligands bearing NH$_2$ groups covalently grafted on the ligands) such as UiO-66-NH$_2$ and MIL-125(Ti)—NH$_2$, are a less preferred variant of the present disclosure, insofar as the adsorption of formaldehyde by these materials leads to the formation of unstable species (polyoxymethylene), which tend to be re-emitted at room temperature.

e) Comparative Analysis: Formaldehyde Release in the Presence of Water.

Figure 22:
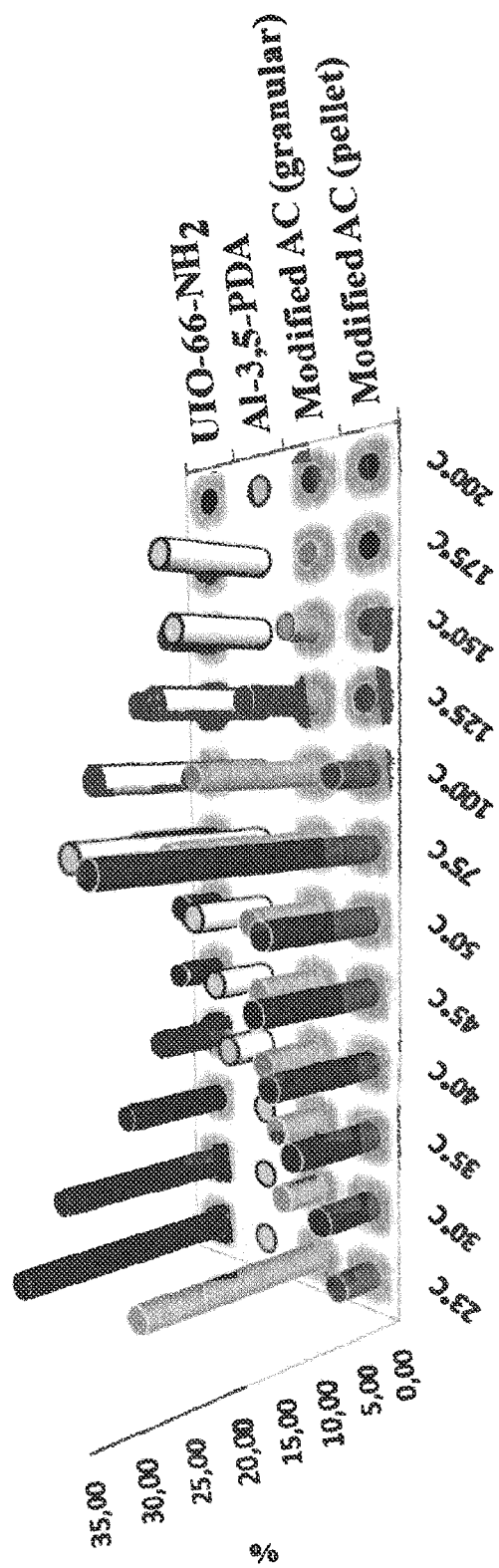
FIG. 22: shows the thermal desorption of HCHO (in %) under humid air. Experiments performed under a flow of 20 mL/min, composed by Ar, 20% $O_2$ (90% R.H.).

Comparative analysis of desorption of formaldehyde under humid air (90% R.H.) was performed on Al-3.5-PDA, UiO-66-NH$_2$ and some commercial modified activated charcoals (purchased from Blueair®) as described in the previous protocol. Desorption profiles are presented FIG. 22. Results demonstrate that pyrazoles based MOFs are much more efficient to retain FA upon increase of temperature, especially in the presence of humidity. There is no release of formaldehyde upon evacuation under humid flow near room temperature [23° C.-35° C.]. On the other hand amino based MOFs release some formaldehyde starting from room temperature due to the formation of some unstable species as discussed previously.

f) Thermal Regeneration.

Figures 23A, 23B:
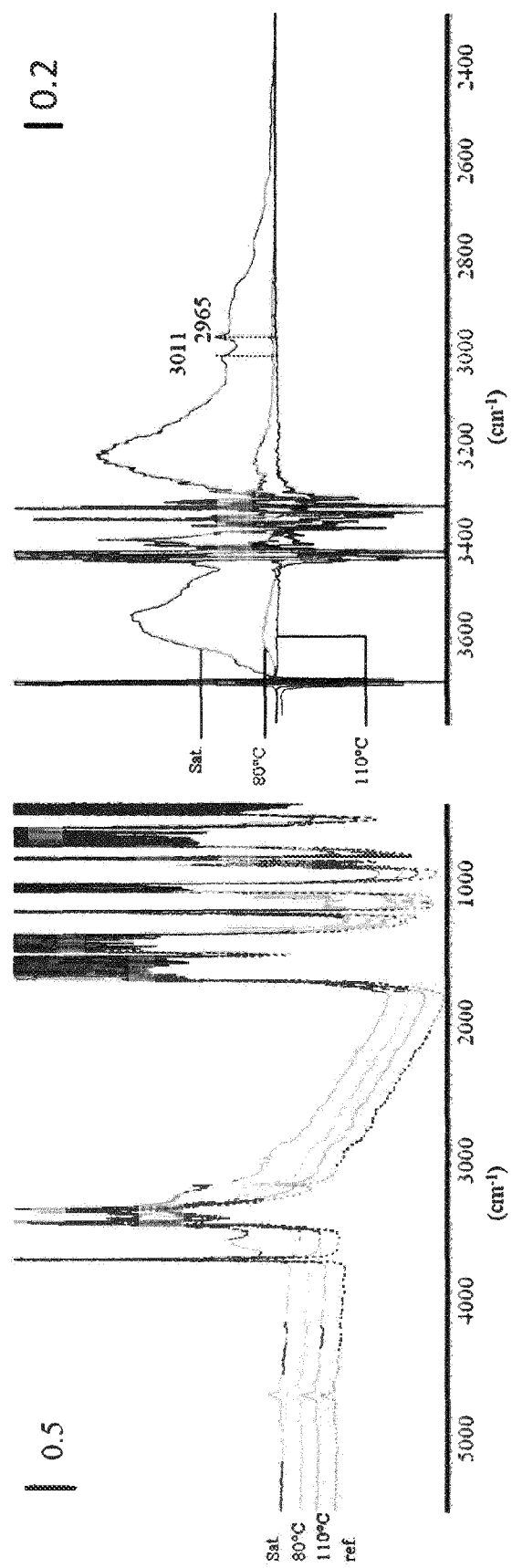
FIGS. 23A and 23B: shows the 23a) FT-IR spectra upon thermal regeneration, from top to bottom, Sat.: saturated with formaldehyde at eq. pressure of 0.1 mbar, 80° C.: FT-IR spectra taken after a plateau (48 h) at 80° C., 110° C.: cumulative FT-IR spectra taken after a plateau (2 h) at 110° C., ref.: Reference spectra taken before adsorption of formaldehyde 23b) Background subtracted FT-IR spectra in the spectral region of 3780-2280 $cm^{-1}$ upon thermal regeneration.

Thermal regeneration of the material was investigated as follows: (i) the material was saturated with gaseous formaldehyde at an equilibrium pressure of 0.1 mbar, (ii) the material was let at a temperature of 80° C. 48 h under dynamic vacuum (iii) the temperature was raised at 110° C. and the material was let during 4 h. FTIR spectra taken after each step are presented FIG. 23.

Based on the integration of characteristics bands of formed oxy methyl groups (v(C—H) at 3011 2965 cm$^{-1}$) it can be deduced that a thermal regeneration at 80° C. leads to 90% desorption of formaldehyde and at 110° C. the material is fully regenerated.

This is confirming the full regeneration of Al-3.5-PDA in between 75° C. and 110° C.

g) Adsorption of Formaldehyde on Imidazole/Al$_2$O$_3$

Figure 24:
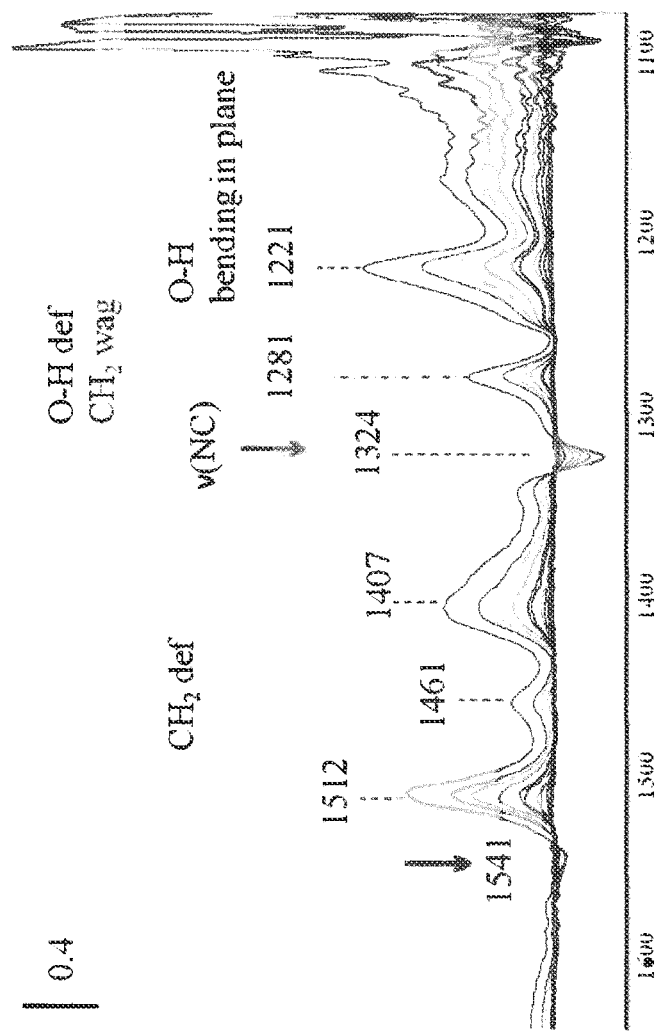
FIG. 24: shows the background subtracted FT-IR spectra obtained upon adsorption of formaldehyde on a mixture of imidazole/$Al_2O_3$ (mass ratio 1/10) in the spectral range of 1700-1000 $cm^{-1}$
Figures 25A, 25B, 25C, 25D:
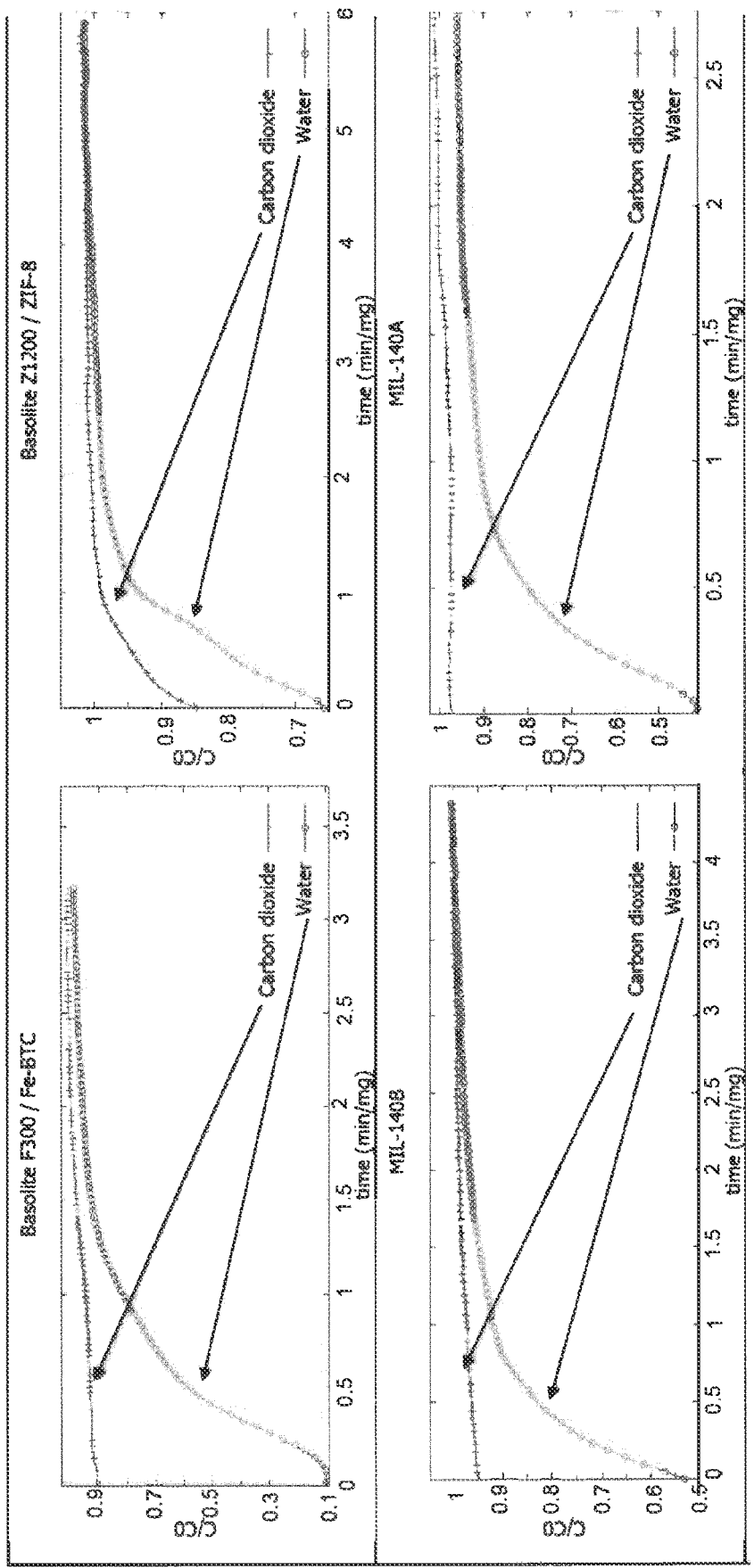
FIGS. 25A-H: shows the breakthrough curves of co-adsorption of $CO_2$ (3000 ppm) and water (R.H. 50%) under dynamic flow of 20 mL/min.
Figure 25E:
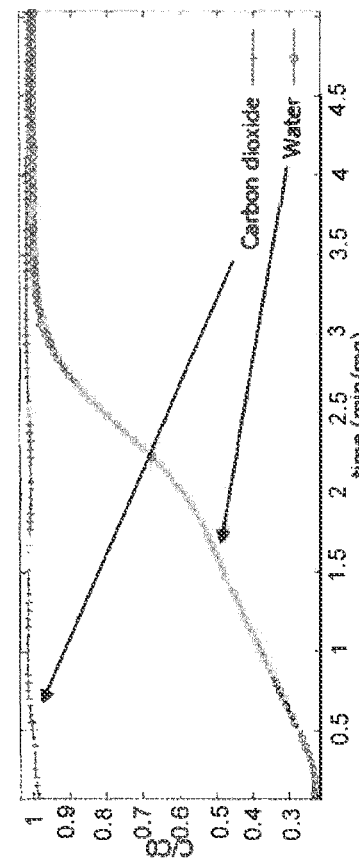
Figure 25F:
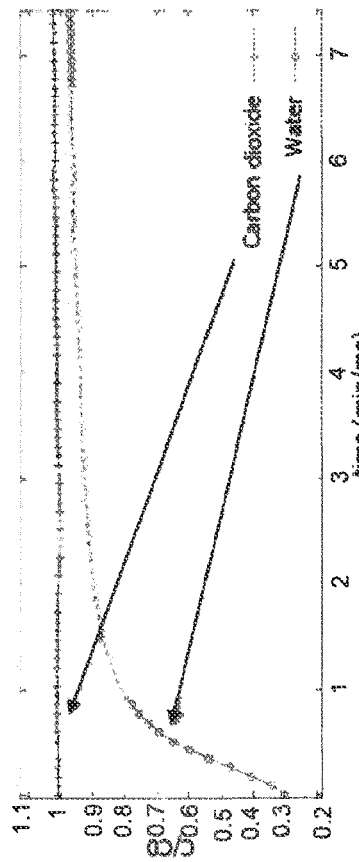
Figure 25G:
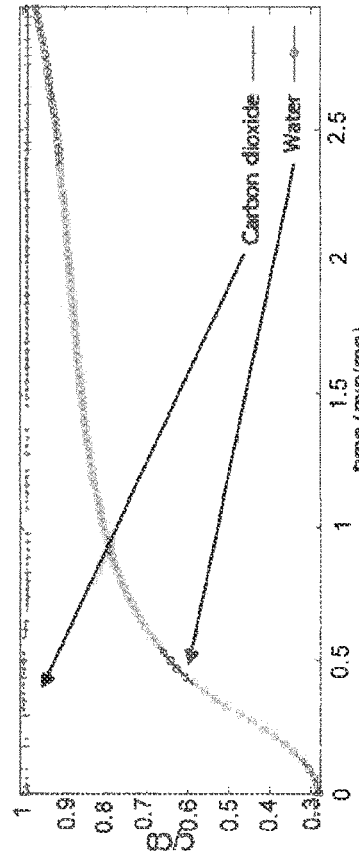
Figure 25H:
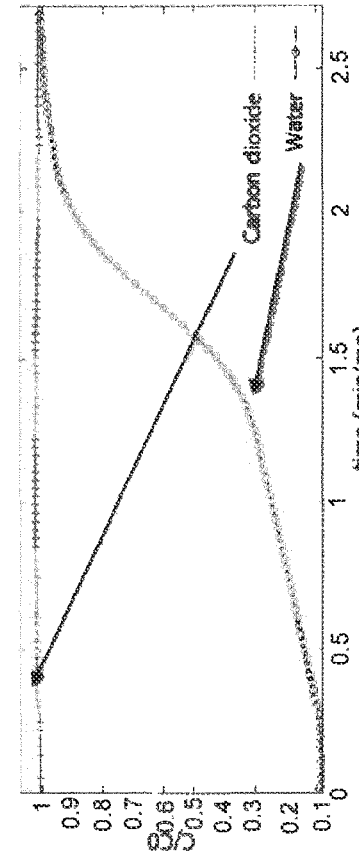

FTIR spectra obtained upon formaldehyde adsorption on imidazole mixed with Al$_2$O$_3$ (mass ratio of 1/10) are presented FIG. 24. There is a progressive decline of the band at 1324 cm$^{-1}$ (v(NC)), and also a progressive decrease of bands at 1541 and 1575 cm$^{-1}$ (in-plan bending modes of imidazole); no strong bands are visible near 1700 cm$^{-1}$, all that is suggesting that there is a modification of the v(C=O) of the formaldehyde upon adsorption on imidazole, involving a chemical reaction. Moreover, similar to the adsorption of formaldehyde on pyrazole linker, some features arise at 1281 and 1221 cm$^{-1}$, which could be tentatively assigned to OH deformation mode and CH$_2$ waging and O—H bending in plan vibrations, suggesting that the adsorption mode of formaldehyde with imidazole is similar to that with pyrazole.

This demonstrates that imidazole groups, with accessible pyridic and pyrrolic nitrogen, are useful for the purpose of this application (once combined with carboxylic acids to construct the MOF but leaving fully accessible to interact with aldehydes).

h) Co-Adsorption of CO$_2$/Water

Figure 26:
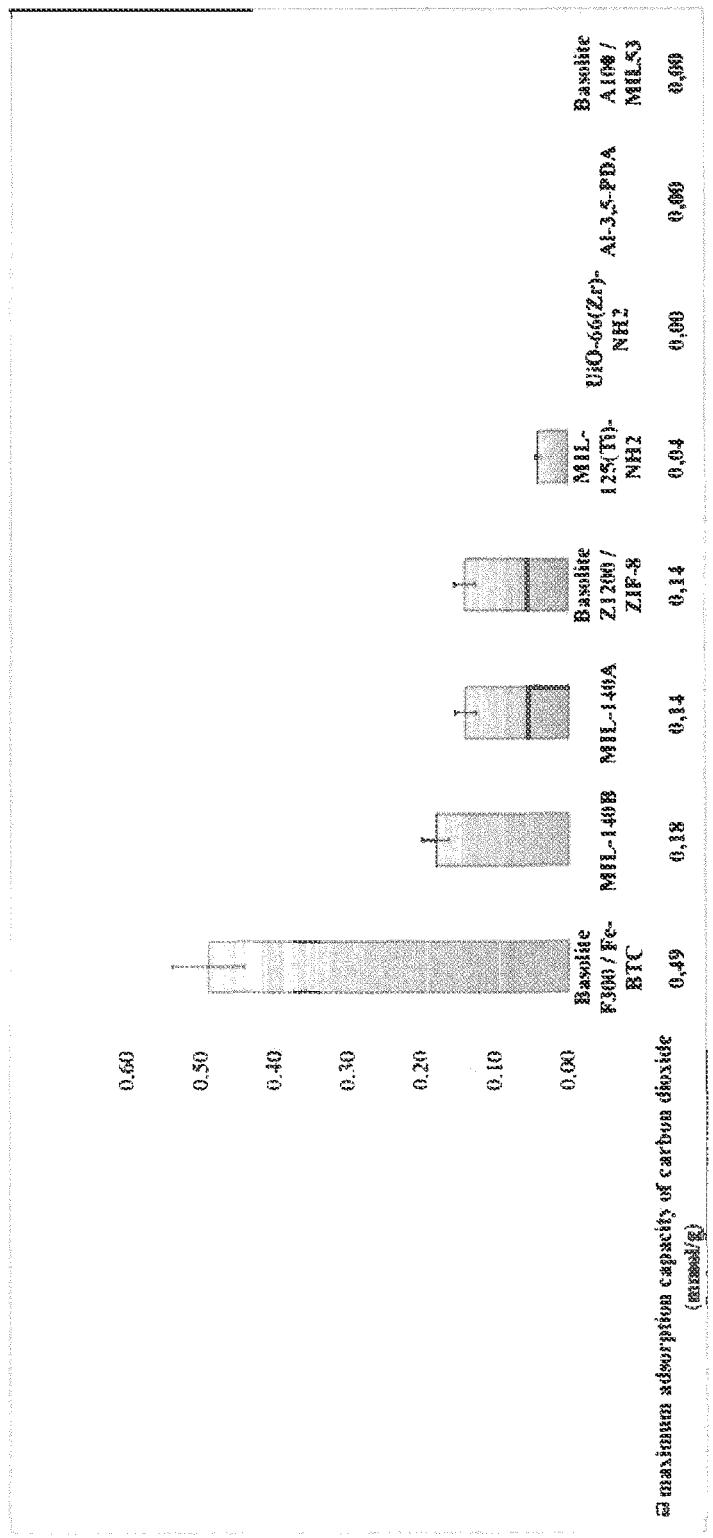
FIG. 26: shows the maximum adsorption capacity of $CO_2$ (mmol/g) obtained with experimental conditions below, in example 7.

In order to verify whether the presence of CO$_2$ could possibly affect the absorption of other pollutants, CO$_2$ adsorption at a high concentration, around 3000 ppm, thus largely exceeding the normal air concentration (400 ppm), in the presence of 50% relative humidity was carried out. FIG. 25 shows the breakthrough curves in the case of water and CO$_2$ co-absorption, FIG. 26 summarizes the maximum CO$_2$ absorption capacities in the presence of 50% relative humidity. Amino-functionalized MOFs present low or no adsorption capacities of CO$_2$ in the presence of 50% relative humidity. The reason is probably an interaction of water occurring by hydrogen bonding, opposed to probably physisorption in the case of CO$_2$.

Al-3.5-PDA with accessible —N—N—H— groups exhibits negligible adsorption capacity for CO$_2$ in the presence of water. The affinity in the presence of 50% R.H. is unambiguously much higher for water compared to CO$_2$; the reason is probably that in the case of amino-functionalized MOFs, an interaction occurs by hydrogen bonding with water versus a simple physisorption in the case of CO$_2$. MIL-140A, MIL-140B and ZIF-8 hydrophobic MOFs exhibit relatively low adsorption capacities, with spontaneous CO$_2$ leaks, which also indicates a higher affinity for water compared to CO$_2$.

Basolite F-300/Fe-BTC exhibits the best maximum amount of adsorbed CO$_2$, however the shape of the breakthrough curve does not exhibit a leak-free domain, and is quite flatted, indicating an unfavorable or linear isotherm, or else kinetic limitations in the presence of 50% relative humidity. Several studies have focused on the description of the adsorption of water and CO$_2$ on a variety of adsorbents. The binary CO$_2$-water adsorption data available in the literature show very different behavior; for diluted systems, the presence of a low amount of moisture improves CO$_2$ sorption at low partial pressures, but in the presence of higher CO$_2$ and water concentrations, it has been shown that the water inhibits the adsorption of CO$_2$, the second case being consistent with our experimental results.

Thus, the above analyses demonstrate that the presence of CO$_2$ during the filtration of indoor air with a relative humidity of 50% does not affect the adsorption/filtration of target VOCs such as formaldehyde in the case of MOFs suitable for that application. This contrasts sharply with traditional amine grafted porous solids that have been shown to capture well formaldehyde from air but also CO$_2$, thus highlighting a strong competition between CO$_2$ and formaldehyde adsorption.

i) Co-Adsorption of CO$_2$ and Formaldehyde on Al-3.5-PDA

Co-adsorption of CO$_2$ and formaldehyde on Al-3.5-PDA sample was performed as follows: (i) the material was saturated with gaseous CO$_2$ at an equilibrium pressure of 5 mbar, (ii) formaldehyde was progressively send into the in situ cell [FIG. 27a)b)] (iii) after reaching formaldehyde saturation (full consumption of Brønsted acid sites) the in situ cell was let under vacuum to remove gas phase and (iv) finally some gaseous CO$_2$ at an equilibrium pressure of 5 mbar was sanded again.

Figure 27A:
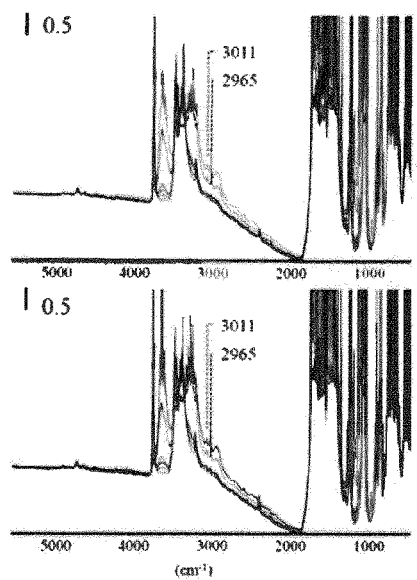
FIGS. 27A-E: shows 27a) FT-IR spectra taken upon formaldehyde adsorption on a prostrated Al-3.5-PDA with $CO_2$, from bottom to top: progressive increase of chemisorbed formaldehyde 27b) FTIR spectra taken upon formaldehyde adsorption on a saturated Al-3.5-PDA with $CO_2$, 27c) from top to bottom: increase of chemisorbed formaldehyde (decrease of physisorbed $CO_2$) in the spectral range of 2355-2320 $cm^{-1}$ 27d) (bottom part) FTIR spectra taken upon formaldehyde adsorption on a saturated Al-3.5-PDA with $CO_2$; (top part) adsorption of $CO_2$ on a saturated Al-3.5-PDA with formaldehyde (top blue spectra) follow by evacuation (top red spectra) 27e) adsorption of formaldehyde on a saturated with $CO_2$ Al-3.5-PDA (from bottom to top green spectra) follow by the adsorption of $CO_2$ on a saturated with formaldehyde Al-3.5-PDA (top blue spectra) follow by evacuation under dynamic vacuum (top red spectra). In the spectral range of 3100-2800 $cm^{-1}$ (offset scale). c) previous d) and e) figures full investigated FTIR range.
Figure 27B:
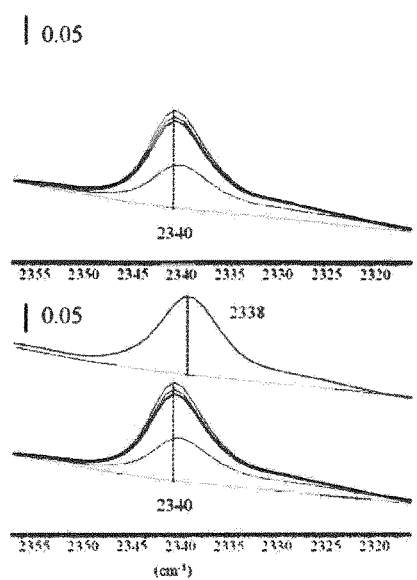
Figure 27C:
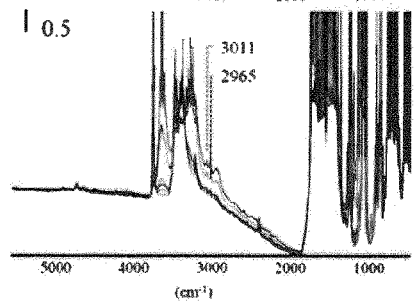
Figure 27D:
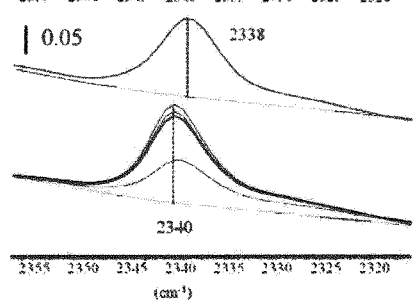
Figure 27E:
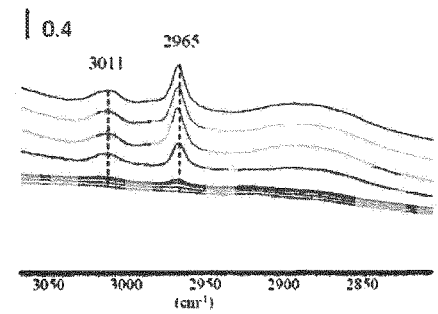
Figure 28:
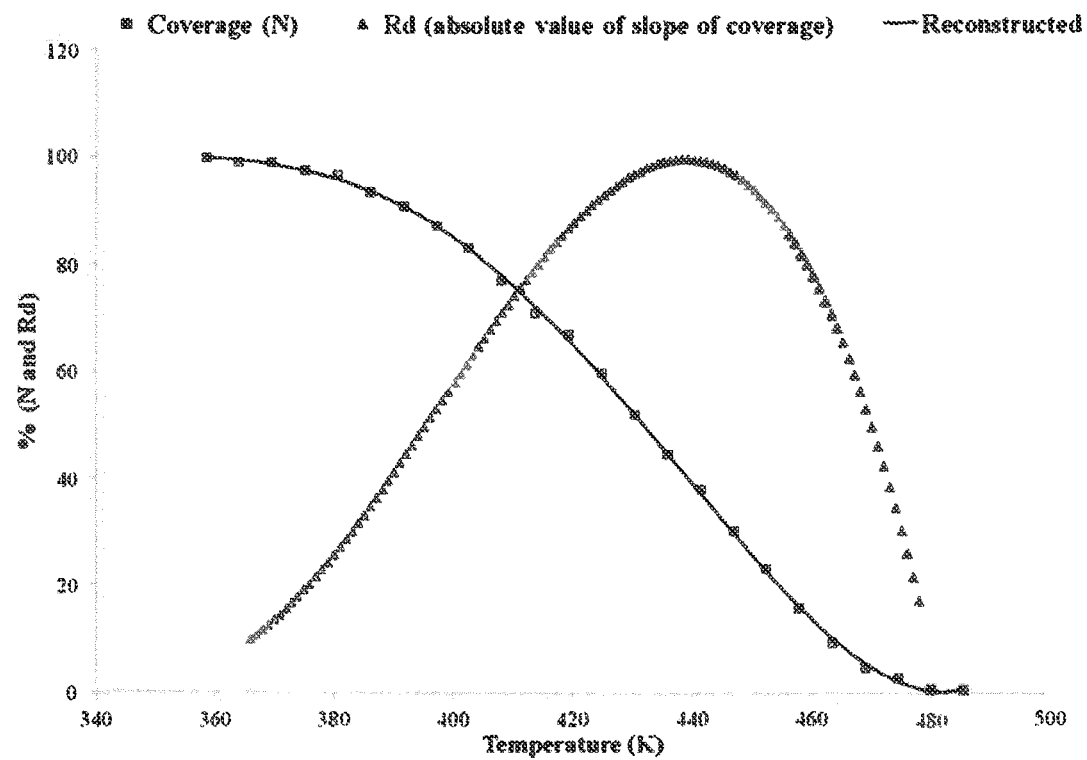
FIG. 28: shows the Coverage and absolute value of desorption rate function of temperature. Obtained during linear heating of Al-3.5-PDA saturated with deuterated formaldehyde with a heating rate of 3° C./min. Data are presented in % for sake of clarity.

Briefly, based on spectroscopic data [FIG. 27] chemisorption of formaldehyde causes desorption of physisorbed CO$_2$ (see decrease of the v$_s$(CO$_2$) band at 2340 cm$^{-1}$ [FIG. 27b)] with the progressive increase of all characteristic bands of oxy methyl groups [FIG. 27a)). Sending CO$_2$ on a saturated material with formaldehyde do not influences the shape of chemisorbed formaldehyde characteristic bands nor their intensity, indicating the absence of formaldehyde desorption [FIG. 27c)d)e)].

j) Determination of Desorption Energy in the Case of Al-3.5-PDA/Formaldehyde.

Estimating desorption energy can be achieved using Redhead method. [42], [43]).

Several flash desorption, with linear variation of +a temperature consistent for 1$^{st}$ order desorption (when adsorption/desorption are not dissociative) are performed.

Using Polanyi-Wigner expression (1) with the kinetic expression of desorption rate R$_d$ given by equation (2), considering a linear heating of the sample with temperature dependency equation (3), it is possible to express the desorption rate as a function of the temperature (4). Therefore a linear heating of the sample leads to a temperature T$_m$ for which the desorption rate admits a maximum and 1$^{st}$ derivative of expression (4) is nullified (5). Injecting expression (2) into the derivative of equation (5) leads, after simplification rearrangement and linearization, to expression (6).

$$R_d = NA \exp\left(-\frac{E_d}{RT}\right) \quad (1)$$

$$-\frac{dN}{dt} = R_d = k_d N^x \quad (2)$$

$$T(t) = T_0 + \beta t \quad (3)$$

$$-\frac{dN}{dT} = \frac{NA}{\beta} \exp\left(-\frac{E_d}{RT}\right) \quad (4)$$

$$\frac{d\left(\frac{NA}{\beta} \exp\left(-\frac{E_d}{RT_m}\right)\right)}{dT} = 0 \quad (5)$$

$$\ln \frac{T_m^2}{\beta} = \frac{E_d}{RT_m} + \ln \frac{E_d}{AR} \quad (6)$$

With R$_d$, desorption rate; N number (or concentration) of adsorbed species; Ed, desorption energy; A, pre-exponential factor; k$_d$, kinetic constant for desorption; x kinetic order (x=1 if non dissociative adsorption/desorption); T, temperature; T$_0$, initial temperature; R, gas constant; β heating rate (K/min).

Figure 29:
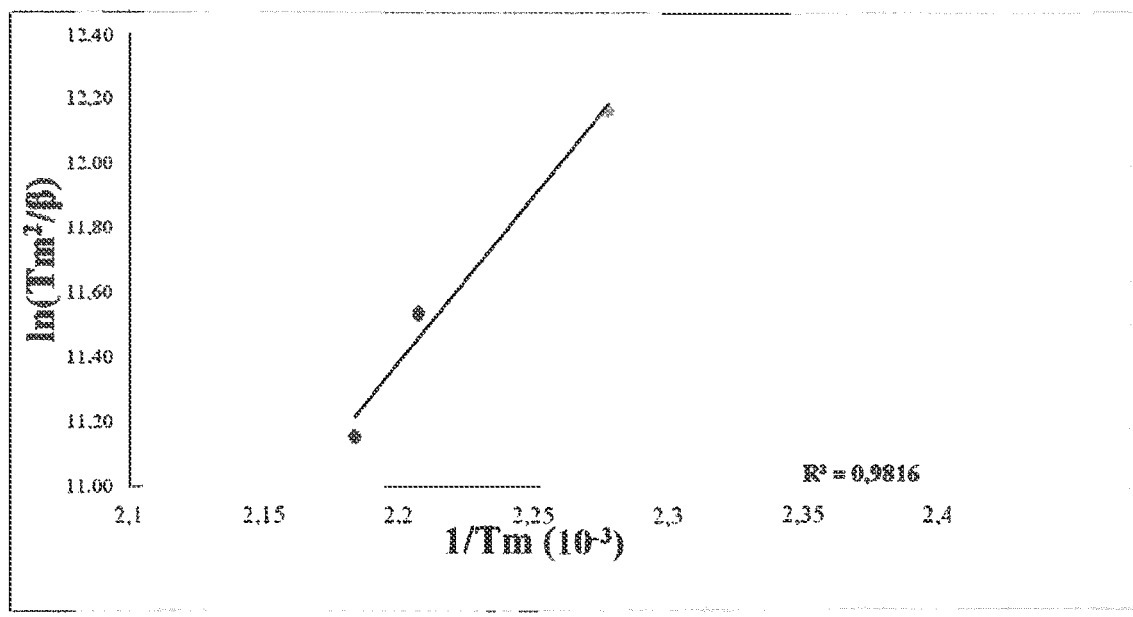
FIG. 29: shows the ln $$\frac{T_m^2}{\beta}$$

Therefore, by plotting ln $$\frac{T_m^2}{\beta}$$

function of $$\frac{1}{T_m}$$

it is possible to estimate the desorption energy (FIG. 29).

Using this method, the desorption energy for formaldehyde from Al-3.5-PDA is estimated at about 85.9 kJ/mol. This value is compatible with the retention rate of formaldehyde shown by Al-3.5-PDA.

Conclusions

As illustrated via the Examples that precede, we have succeeded in producing a porous material (typically based on Metal Organic Frameworks) capable of effectively capturing volatile organic products present in the air, with or without moisture, in a confined space (a room in a dwelling, a work room, an office, a workshop, the passenger compartment of a vehicle, etc.), shaped and arranged inside an air filtration device. More specifically, a particular selection of hybrid organic/inorganic crystallized materials (MOFs) has been identified, the MOFs having a high affinity for indoor air pollutants such as formaldehyde, capable of selectively and effectively retaining these pollutants during dry or humid air filtration, between 20 and 50° C., without allowing the target molecule(s) retained during the operating or rest phases to leak.

The device will be easily recyclable by washing in water and durable over a high number of cycles. It will not produce harmful degradation compounds.

It has been further demonstrated that the interaction between formaldehyde and Al-3.5-PDA is occurring by creation of covalent bonds between the lone pair of electrons of the "pyridine" nitrogen from pyrazole (dicarboxylate) linker and the carbon from formaldehyde, leading to the formation of oxymethyl groups which are stabilized by hydrogen bonding with the remaining nitrogen and/or with the oxygen coming from $\mu_2$-OH hydroxyl groups. Those interaction modes are stable even in the presence of ambient humidity, which is a crucial point in order to avoid release of formaldehyde under normal conditions when the material is saturated.

It was further evidenced that a room temperature water quenching is sufficient to fully regenerate Al-3.5-PDA after formaldehyde saturation, which adsorption performances are almost unchanged after several cycles.

Finally, these results demonstrate that Metal-organic-frameworks exhibiting accessible pyrazole-N—NH groups and Brønsted sites (this includes pyrazole and imidazoles as we have shown) are promising and sustainable materials towards formaldehyde removal from indoor air, leading to reusable filters.

The present invention makes it possible to:

Increase the capture and storage capacity of typical indoor air pollutants such as formaldehyde and, more generally, VOCs Filter and retain these air pollutants more efficiently, with leak-free storage (which allows an air mass to be purified through a single passage through the filter)

Reuse the filter a high number of times, via a simple and economical regeneration process, set up by the user himself Prevent generating additional pollutants The field of air quality has gained more attention in recent years, due to high levels of pollution in large cities. As discussed previously, air pollution has significant impacts on the health of the population, such as an increase in the risk of stroke, cardiovascular disease and, above all, respiratory diseases . . . Air quality is undeniably a major health issue of the twenty-first century. The present invention provides a new solution to this problem. As described throughout the present document and illustrated in the Examples, a selection of porous MOF materials have been identified, which are more effective in removing formaldehyde (adsorption capacity, stability and regenerability) than commercial absorbents on the market. Prototype filters with the identified MOFs with the best performance have been built, and their efficiency has been tested and validated in real conditions ("full-scale experiments").

In summary, the present invention provides an effective tool to improve indoor air quality.

LIST OF REFERENCES

[1] "Depollution product for trapping volatile organic compounds, particularly formaldehyde, and method for the production thereof," August 2016.

[2] "Purificateur d'air: maison, voiture, poussiere & cigarette—Blooow." [Online]. Available: https://www.blooow.com/le-fonctionnement/. [Accessed: 1 May 2019].

[3] Ashrae Fundamentals Handbook, SI Edition, 2001, p. 24.5

[4] Rouquérol, F.; Rouquérol, J.; Sing, K. Adsorption by powders and porous solids; Academic Press: San Diego, 1999.

[5] L. Sarkisov and A. Harrison, Mol. Simul., 2011, 37, 1248-1257.

[6] WO 2019/053048

[7] Permyakova, A.; Wang, S.; Courbon, E.; Nouar, F.; Heymans, N.; D'Ans, P.; Barrier, N.; Billemont, P.; De Weireld, G.; Steunou, N.; Frère, M.; Serre, C. Design of salt-metal organic framework composites for seasonal heat storage applications. J. Mater. Chem. A, 5, 12889-12898, 2017a.

[8] Cadiau, A.; Lee, J. S.; Damasceno Borges, D.; Fabry, P.; Devic, T.; Wharmby, M. T.; Martineau, C.; Foucher, D.; Taulelle, F.; Jun, C.-H.; Hwang, Y. K.; Stock, N.; De Lange, M. F.; Kapteijn, F.; Gascon, J.; Maurin, G.; Chang, J.-S.; Serre, C. Design of Hydrophilic Metal Organic Framework Water Adsorbents for Heat Reallocation. Adv. Mater., 27, 4775-4780, 2015.

[9] Permyakova, A.; Skrylnyk, O.; Courbon, E.; Affram, M.; Wang, S.; Lee, U.-H.; Valekar, A. H.; Nouar, F.; Mouchaham, G.; Devic, T.; De Weireld, G.; Chang, J.-S.; Steunou, N.; Frère, M.; Serre, C. Synthesis Optimization, Shaping, and Heat Reallocation Evaluation of the Hydrophilic Metal-Organic Framework MIL-160(Al). Chem. Sus. Chem., 10, 1419-1426, 2017b.

[10] WO02009/123484

[11] M. Rose et al. Adv. Eng. Mater. 2011, 13, 356-360.

[12] R. Ostermann at al. Chem. Commun. 2011, 47, 442-444.

[13] J. Ren et al. Int. J. Hydrogen Energy 2015, 40, 9382-9387.

[14] M. R. Khan et al. J. Mater. Eng. Perform. 2016, 25, 1276-1283.

[15] WO 2009/07767

[16] US 2014/0213832

[17] Kim, P.-J.; You, Y.-W.; Park, H.; Chang, J.-S.; Bae, Y.-S.; Lee, C.-H.; Suh, J.-K. Separation of SF6 from SF6/N-2 mixture using metal-organic framework MIL-100(Fe) granule Chem. Eng. J. 262, 683-690, 2015.

[18] Farhad Fathieh et al., Sci. Adv. 2018; 4: eaat3198, pages 1-9.
[19]. G. Férey, et al. Science 2005, 309, 2040-2042.
[20] Y. K. Hwang, et al. Angew. Chem. Int. Ed. Engl. 2008, 47, 4144-4148.
[21] A. Demessence et al., Adsorption properties in high optical quality nanoZIF-8 thin films with tunable thickness, *J. Mater. Chem.*, 2010, 20, 7676-7681.
[22] C. Gomes Silva, et al. Chem. Eur. J. 2010, 16, 11133-11138.
[23] M. A. Banares and I. E. Wachs, *J. Raman Spectrosc.*, 2002, 33, 359-380; T. Lesage, C. Verrier, P. Bazin, J. Saussey, M. Daturi, Phys. Chem. Chem. Phys. 5 (2003) 4435-4440.; S. Thomas, O. Mane, P. Bazin, L. Lietti, C. G. Visconti, M. Corbetta, F. Manenti and M. Daturi, *Catal. Today*, 2017, 283, 176-184.
[24] Thommes et al., IUPAC Technical Report, Pure Appl. Chem., 2015, 87(9-10), 1051-1069.
[25] K. Y. Cho et al., "Synthesis of amine-functionalized ZIF-8 with 3-amino-1,2,4-triazole by postsynthetic modification for efficient $CO_2$-selective adsorbents and beyond," *J. Mater. Chem. A*, vol. 6, no. 39, pp. 18912-18919, 2018
[26] H. Reinsch et al., "Structures, sorption characteristics, and nonlinear optical properties of a new series of highly stable aluminum MOFs," *Chem. Mater.*, vol. 25, no. 1, pp. 17-26, 2013.
[27] Y. Fu et al., "An amine-functionalized titanium metal-organic framework photocatalyst with visible-light-induced activity for $CO_2$ reduction," *Angew. Chemie—Int. Ed.*, vol. 51, no. 14, pp. 3364-3367, 2012;
[28] S.-N. Kim, J. Kim, H.-Y. Kim, H.-Y. Cho, and W.-S. Ahn, "Adsorption/catalytic properties of MIL-125 and NH2-MIL-125," *Catal. Today*, vol. 204, pp. 85-93, April 2013.
[29] S. Bernt, V. Guillerm, C. Serre, and N. Stock, "Direct covalent post-synthetic chemical modification of Cr-MIL-101 using nitrating acid," *Chem. Commun.*, vol. 47, no. 10, pp. 2838-2840, 2011.
[30] J. Jacobsen, H. Reinsch, and N. Stock, "Systematic Investigations of the Transition between Framework Topologies in Ce/Zr-MOFs," *Inorg. Chem.*, vol. 57, no. 20, pp. 12820-12826, 2018.
[31] C. Wang, X. Lui, N. Keser Demir, J. P. Chen, and K. Li, "Applications of Water Stable Metal-Organic Frameworks," Chem. Soc. Rev., vol. 45, no. 18, pp. 5107-5134, 2016.
[32] D. De Recherches, R. D. D. Scientifiques, and D. De Recherches, "'UNIVERSITE VERSAILLES S AINT-Q UENTIN' E COLE D OCTORALE N ° 571 Sciences chimiques: molécules, matériaux, instrumentation et biosystèmes Chimie Par Mr Paul Rouschmeyer Nouveaux solides hybrides poreux luminescents à base de tétrazine," 2015.
[33] E. Alvarez, "Traitement de l'air par des matériaux hybrides de type Metal Organic Frameworks," p. 230, 2016.
[34] S. Patra et al., "Design of metal organic framework-enzyme based bioelectrodes as a novel and highly sensitive biosensing platform," *J. Mater. Chem. B*, vol. 3, no. 46, pp. 8983-8992, November 2015.
[35] S. Biswas et al., "Enhanced selectivity of $CO_2$ over $CH_4$ in sulphonate-, carboxylate- and iodo-functionalized UiO-66 frameworks," *Daft. Trans.*, vol. 42, no. 13, p. 4730, March 2013.
[36] B. Van de Voorde et al., "Isolation of Renewable Phenolics by Adsorption on Ultrastable Hydrophobic MIL-140 Metal-Organic Frameworks," *ChemSusChem*, vol. 8, no. 18, pp. 3159-3166, September 2015.
[37] E. Plessers et al., "Zr-Based MOF-808 as Meerwein-Ponndorf-Verley Reduction Catalyst for Challenging Carbonyl Compounds," *Catalysts*, vol. 6, no. 7, p. 104, July 2016.
[38] A. Permyakova et al., "Design of salt-metal organic framework composites for seasonal heat storage applications," *J. Mater. Chem. A*, vol. 5, no. 25, pp. 12889-12898, June 2017.
[39] Dedecker, K. et al. Metal-Organic Frameworks for Cultural Heritage Preservation: The Case of Acetic Acid Removal. *ACS Appl. Mater. Interfaces* 10, 13886-13894 (2018).
[40] Cadiau, Amandine; Lee, Ji Sun; Borges, Daiane Damasceno; et al., "Design of Hydrophilic Metal Organic Framework Water Adsorbents for Heat Reallocation", ADVANCED MATERIALS 2015, Vol. 27, No. 32, pp. 4775-4780).
[41] Y.-R. Lee, M.-S. Jang, H.-Y. Cho, H.-J. Kwon, S. Kim, and W.-S. Ahn, "ZIF-8: A comparison of synthesis methods," *Chem. Eng. J.*, vol. 271, pp. 276-280, July 2015.
[42] Redhead P A. Thermal desorption of gases. Vacuum. 1962; 12(5):274.
[43] Webb P A. Introduction to Chemical Adsorption Analytical Techniques and their Applications to Catalysis. MIC Tech Publ. 2003; 13 (January):1-4.

The invention claimed is:

1. Process for purifying a gaseous environment, by selective adsorption of aldehyde volatile organic compounds (VOCs) from the gaseous environment over non-aldehyde VOCs, comprising the step of contacting the gaseous environment to be purified with a porous water-stable Metal-Organic Framework (MOF) material, wherein the MOF material comprising an average pore size <40 Å and a hydrophilic core formed by basic groups and hydrogen-bond accepting or donating oxygenated species in the MOF material, wherein the basic groups are covalently bound to the MOF material without binding to the metal sites of the MOF material, wherein the ligands in the MOF material are N-containing heterocyclic ligands having available at least one of the basic groups embedded within the ligand itself not involved in binding to the metal sites of the MOF material and wherein the crystal structure of the MOF material, as measured by X-Ray diffraction pattern or IR spectroscopy, and average pore size, as calculated by the nitrogen adsorption/desorption isotherm method at −196° C. under 105 Pa, remain unchanged within experimental error, after being exposed to a gaseous environment with 50% relative humidity (RH) for 24 hours at 100° C. and atmospheric pressure, or after being placed in water at 100° C. for 12 hours.

2. The process according to claim 1, wherein the MOF material is alone or mixed with other porous materials such as other MOFs, zeolites, and/or activated carbon.

3. The process according to claim 1, wherein the MOF material is comprised in a filter for air purification.

4. The process according to claim 3, wherein the filter is leak-free with respect to aldehyde volatile organic compounds present in air at a concentration in the order of 1 ppb and 500 ppm when the contaminated air flow through the filter at a space velocity≤60000 h-1 and retains 100% of the aldehyde(s) adsorbed under atmospheric pressure and under a working temperature in the range 10 to 50° C.

5. The process according to claim 4, wherein the filter is regenerable by thermodesorption at low temperature of the filter to ≥75% of its adsorption/filtering capacity, wherein the process comprises at least one regeneration cycle, by heating said filter to a temperature ≥70° C.

6. The process according to claim 4, wherein the filter is regenerable to ≥75% of its adsorption/filtering capacity, wherein the process comprises at least one regeneration cycle, by cleaning with water and/or a hydroalcoholic solution at room temperature.

7. The process according to claim 1, wherein the metal atom of the MOF material is selected from Sc, Y, Tb, Gd, Ce, Ln, La, Ti, Zr, Fe, Al or Cr.

8. The process according to claim 1, wherein N-containing heterocyclic ligands are present in the MOF material in the form of N-heterocyclic polycarboxylate ligands.

9. The process according to claim 1, wherein the hydrogen-bond accepting or donating oxygenated species in the MOF material are present in the form of oxo-clusters, oxo-hydroxo clusters, and/or OH.

10. The process according to claim 1, wherein the MOF material has a crystalline structure selected from UiO-66, MIL-53, MIL-68, MIL-125, MIL-101, CAU-10, MIL-160, PDA-type MOF materials.

11. The process according to claim 1, wherein the MOF material is selected from Al-3,5-PDA ("MOF-303"), DUT-67 (Zr)-PZDC, CAU-10 (Al)-pyridine, CAU-10 (Al)-pyrazine or a mixture of two or more of the above.

12. The process according to claim 4, wherein the filter is comprised in a system for air purification.

13. The process according to claim 1, wherein the MOF material has been coated on a support in the form of a plate, a honeycomb shaped support, a grid, or any shape used in air purification filters, or on a support with filtering capacities.

14. The process according to claim 13, wherein the MOF material is in the form of a shaped body.

15. The process according to claim 14, wherein the MOF material is made into a shaped body using binders, lubricants or other additives conventionally used in the preparation of adsorbent shaped bodies.

16. The process according to claim 14, wherein the shaped MOF material is contained in the cavities of a hollow support.

17. The process according to claim 13, further comprising a step of soaking the MOF material in water and/or a hydro alcoholic solution at room temperature for a suitable amount of time.

18. The process according to claim 13, wherein the air is an indoor air.

* * * * *